United States Patent [19]
Kato et al.

[11] Patent Number: 5,351,137
[45] Date of Patent: Sep. 27, 1994

[54] PIXEL DENSITY CONVERTING APPARATUS

[75] Inventors: Masami Kato, Sagamihara; Takao Kato; Yasunori Hashimoto, both of Yokohama, all of Japan

[73] Assignee: Canon Kabushiki Kaisha, Tokyo, Japan

[21] Appl. No.: 159,206

[22] Filed: Nov. 30, 1993

Related U.S. Application Data

[62] Division of Ser. No. 492,490, Mar. 12, 1990, Pat. No. 5,289,293.

[30] Foreign Application Priority Data

| Mar. 14, 1989 | [JP] | Japan | 1-059601 |
| Mar. 14, 1989 | [JP] | Japan | 1-059608 |
| Jun. 8, 1989 | [JP] | Japan | 1-145479 |
| Jun. 8, 1989 | [JP] | Japan | 1-145480 |
| Jun. 9, 1989 | [JP] | Japan | 1-145471 |
| Jun. 9, 1989 | [JP] | Japan | 1-145472 |
| Jun. 9, 1989 | [JP] | Japan | 1-145473 |
| Jun. 9, 1989 | [JP] | Japan | 1-145474 |
| Jun. 9, 1989 | [JP] | Japan | 1-145475 |
| Jun. 9, 1989 | [JP] | Japan | 1-145476 |
| Jun. 9, 1989 | [JP] | Japan | 1-145477 |
| Jun. 9, 1989 | [JP] | Japan | 1-145478 |

[51] Int. Cl.$^5$ ............................................. G06K 9/00
[52] U.S. Cl. ....................................... 358/457; 358/456
[58] Field of Search .................... 358/462, 456–457, 358/458, 465, 466, 454–455, 428, 298, 296, 262.1; 382/46–47

[56] References Cited

U.S. PATENT DOCUMENTS

| 4,389,677 | 6/1983 | Rushby et al. | 358/280 |
| 4,633,326 | 12/1986 | Endoh et al. | 358/280 |
| 5,008,950 | 4/1991 | Katayama et al. | 358/455 |
| 5,050,000 | 9/1991 | Ng | 358/457 |
| 5,068,746 | 11/1991 | Ohsawa et al. | 358/443 |
| 5,077,810 | 12/1991 | D'Luna | 358/443 |

FOREIGN PATENT DOCUMENTS

| 0255949 | 2/1988 | European Pat. Off. |
| 62-157468 | 7/1987 | Japan |
| 62-281673 | 12/1987 | Japan |
| 2102240A | 1/1983 | United Kingdom |
| 216142A | 1/1986 | United Kingdom |

OTHER PUBLICATIONS

"Digital Halftoning of Images" IBM Journal of Research & Development, vol. 26, No. 6, pp. 687–697.

*Primary Examiner*—Stephen Brinich
*Attorney, Agent, or Firm*—Fitzpatrick, Cella, Harper & Scinto

[57] ABSTRACT

In a pixel density converting apparatus according to the present invention, a pixel density conversion element for converting a pixel density by a factor of an arbitrary value, such as an element of the projection method or the linear interpolation method, a pixel density conversion element for increasing or decreasing a pixel density by a factor of an integer, such as an element of the majority or logical OR method, and a binarization element for conducting binarization while correcting quantizing errors, such as an element of the error diffusion method or the average error minimizing method, are combined with each other with the advantages and disadvantages of the respective elements taken into consideration, so as to achieve excellent conversion whether or not the image on which pixel density conversion is conducted or an image area is a pseudo half-tone processed image. In consequence, excellent pixel density conversion is achieved on a binary image in which a pseudo half-tone processed image and characters or line drawings are present in a mixed state.

27 Claims, 63 Drawing Sheets

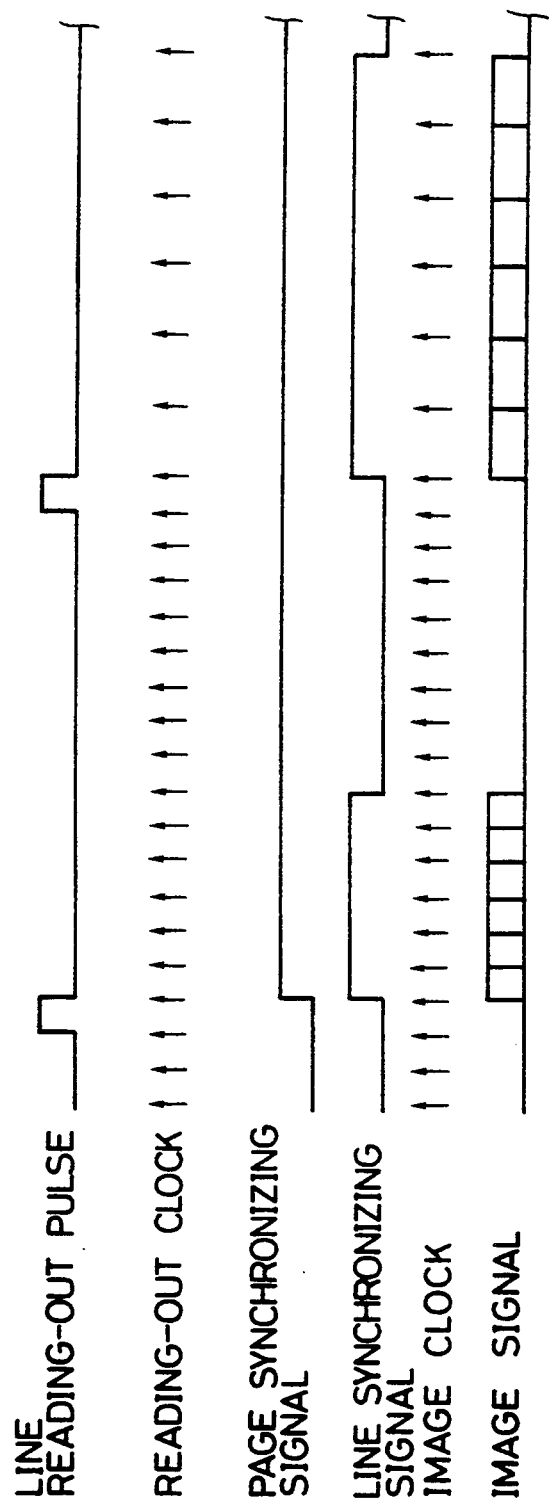

○ : ORIGINAL PIXEL
● : CONVERTED PIXEL
$1/\alpha$ : CONVERSION RATE FOR THE HORIZONTAL SCANNING DIRECTION
$1/\beta$ : CONVERSION RATE FOR THE VERTICAL SCANNING DIRECTION

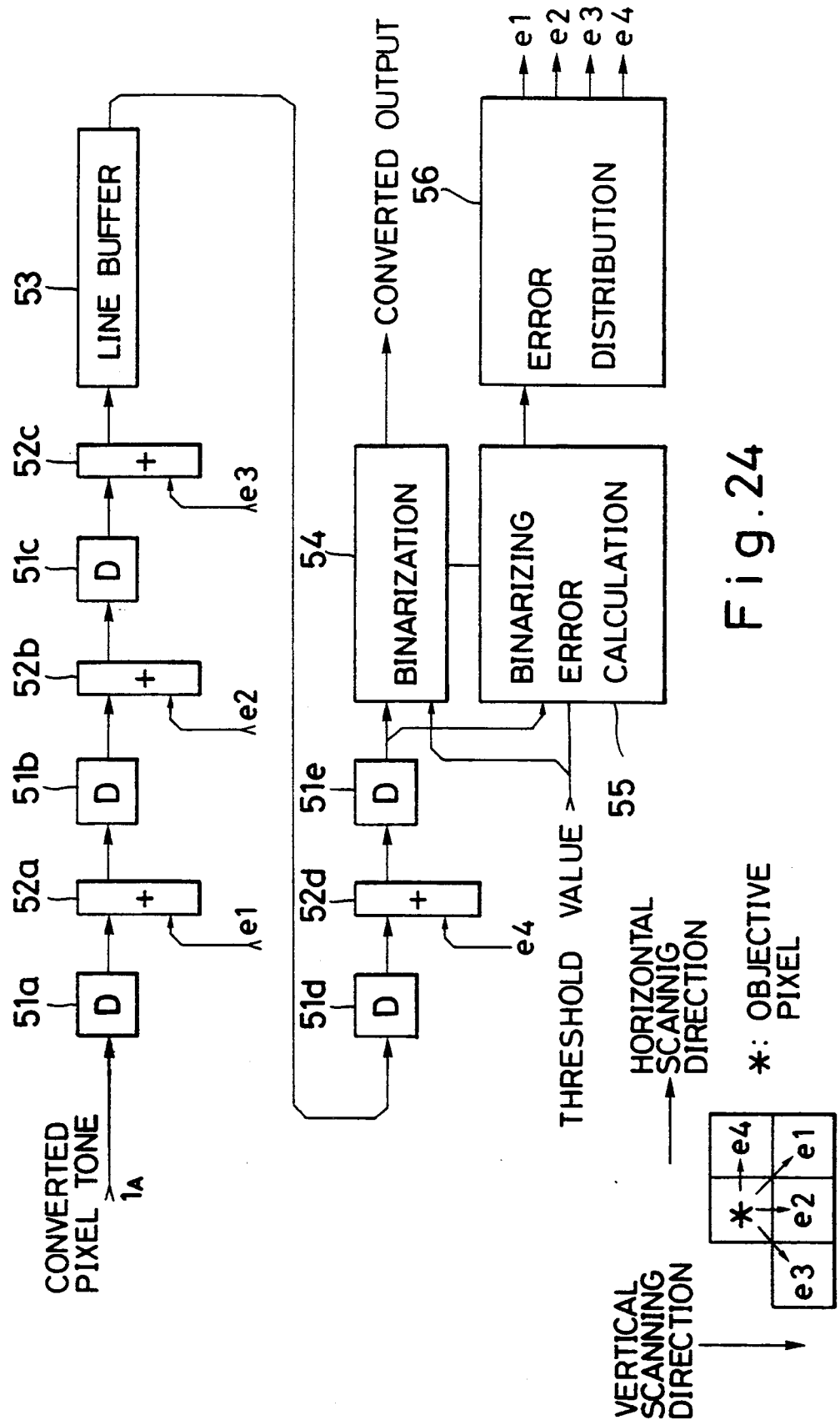

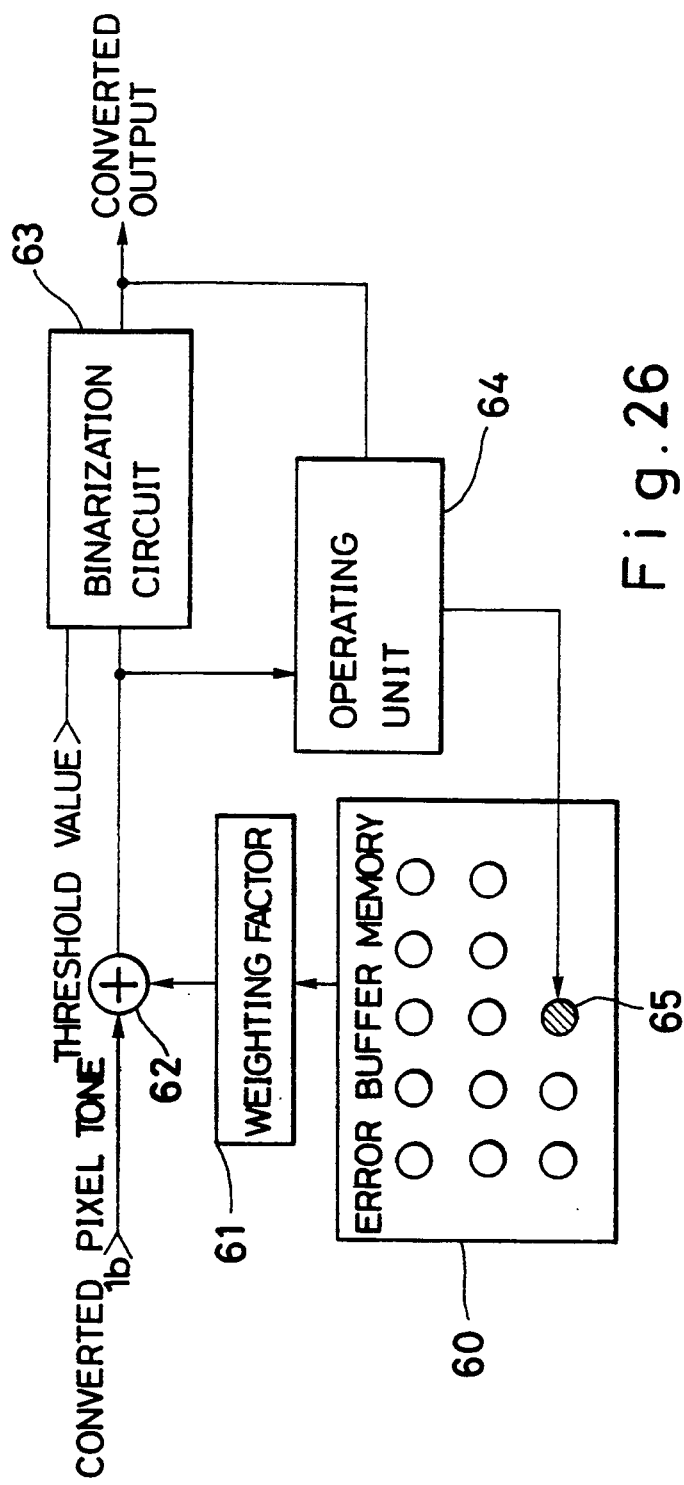

BASIC BLOCK
(ROM ADDRESS)
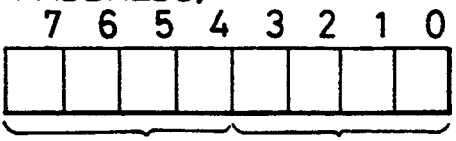
```
UPPER      LOWER
ADRESSES   ADRESSES
```
DATA
(ROM DATA)
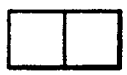
└─ TONE DETERMINATION BLACK:1
　　　　　　　　　　　　　WHITE:0
└─ PSEUDO HALF-TONE IMAGE:1
　 CHARACTER, LINE DRAWING:0
Fig.34A
⇨ DETERMINATION RESULT
{ PSEUDO HALF-TONE IMAGE
{ TONE : BLACK
Fig.34B
⇨ DETERMINATION RESULT
{ CHARACTER, LINE DRAWING
{ TONE : WHITE
Fig.34C

| ADDRESS LOWER / UPPER | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 0 | 2 | 2 | 0 | 2 | 2 | 0 | 0 | 2 | 2 | 2 | 2 | 0 | 2 | 0 | 0 |
| 1 | 2 | 2 | 2 | 2 | 2 | 2 | 2 | 2 | 0 | 2 | 2 | 2 | 0 | 2 | 0 | 1 |
| 2 | 2 | 2 | 2 | 2 | 2 | 2 | 2 | 2 | 2 | 2 | 2 | 2 | 2 | 2 | 2 | 3 |
| 3 | 0 | 2 | 2 | 2 | 2 | 2 | 2 | 3 | 0 | 2 | 2 | 3 | 0 | 3 | 1 | 1 |
| 4 | 2 | 2 | 2 | 2 | 2 | 2 | 2 | 2 | 2 | 2 | 2 | 2 | 2 | 2 | 2 | 3 |
| 5 | 2 | 2 | 2 | 2 | 2 | 2 | 2 | 3 | 2 | 2 | 2 | 3 | 2 | 3 | 3 | 3 |
| 6 | 0 | 2 | 2 | 2 | 2 | 2 | 2 | 3 | 2 | 2 | 2 | 3 | 2 | 3 | 3 | 3 |
| 7 | 0 | 2 | 2 | 3 | 2 | 3 | 3 | 3 | 0 | 3 | 3 | 3 | 1 | 3 | 1 | 1 |
| 8 | 2 | 2 | 2 | 2 | 2 | 2 | 2 | 2 | 2 | 2 | 2 | 2 | 2 | 2 | 2 | 3 |
| 9 | 2 | 2 | 2 | 2 | 2 | 2 | 2 | 3 | 2 | 2 | 2 | 3 | 2 | 3 | 3 | 3 |
| A | 2 | 2 | 2 | 2 | 2 | 2 | 2 | 3 | 2 | 2 | 2 | 3 | 2 | 3 | 3 | 3 |
| B | 2 | 2 | 2 | 3 | 2 | 3 | 3 | 3 | 2 | 3 | 3 | 3 | 3 | 3 | 3 | 3 |
| C | 0 | 2 | 2 | 2 | 2 | 2 | 2 | 3 | 2 | 2 | 2 | 3 | 2 | 3 | 3 | 3 |
| D | 2 | 2 | 2 | 3 | 2 | 3 | 3 | 3 | 2 | 3 | 3 | 3 | 3 | 3 | 3 | 3 |
| E | 0 | 2 | 2 | 3 | 2 | 3 | 3 | 3 | 2 | 3 | 3 | 3 | 3 | 3 | 3 | 3 |
| F | 0 | 3 | 3 | 3 | 3 | 3 | 3 | 3 | 1 | 3 | 3 | 3 | 1 | 3 | 1 | 1 |

Fig.35

| ADDRESS LINES<br>A15 A14 A13 A12 A11 A10 A9 A8 A7 A6 A5 A4 A3 A2 A1 A0 | OUTPUT DATA |
|---|---|
| 0 0 0 0 0 0 0 0 0 0 0 0 0 0 0 0 | 0 |
| 0 0 0 0 0 0 0 0 0 0 0 0 0 0 0 1 | 0 |
| 0 0 0 0 0 0 0 0 0 0 0 0 0 0 1 0 | 1 |
| 0 0 0 0 0 0 0 0 0 0 0 0 0 0 1 1 | 0 |
| 0 0 0 0 0 0 0 0 0 0 0 0 0 1 0 0 | 1 |
| 0 0 0 0 0 0 0 0 0 0 0 0 0 1 0 1 | 1 |
| 0 0 0 0 0 0 0 0 0 0 0 0 0 1 1 0 | 0 |
| 0 0 0 0 0 0 0 0 0 0 0 0 0 1 1 1 | 0 |
| ... | ... |
| 0 0 0 0 0 0 0 0 0 0 1 1 0 0 0 0 | 1 |
| 0 0 0 0 0 0 0 0 0 0 1 1 0 0 0 1 | 1 (CASE OF FIG. 43A) |
| | 0 (CASE OF FIG. 43B) |
| 1 1 1 1 1 1 1 1 1 1 1 1 1 1 1 1 | 0 |

Fig. 42

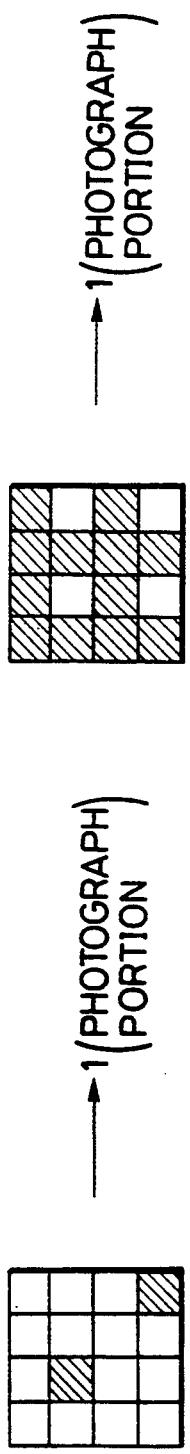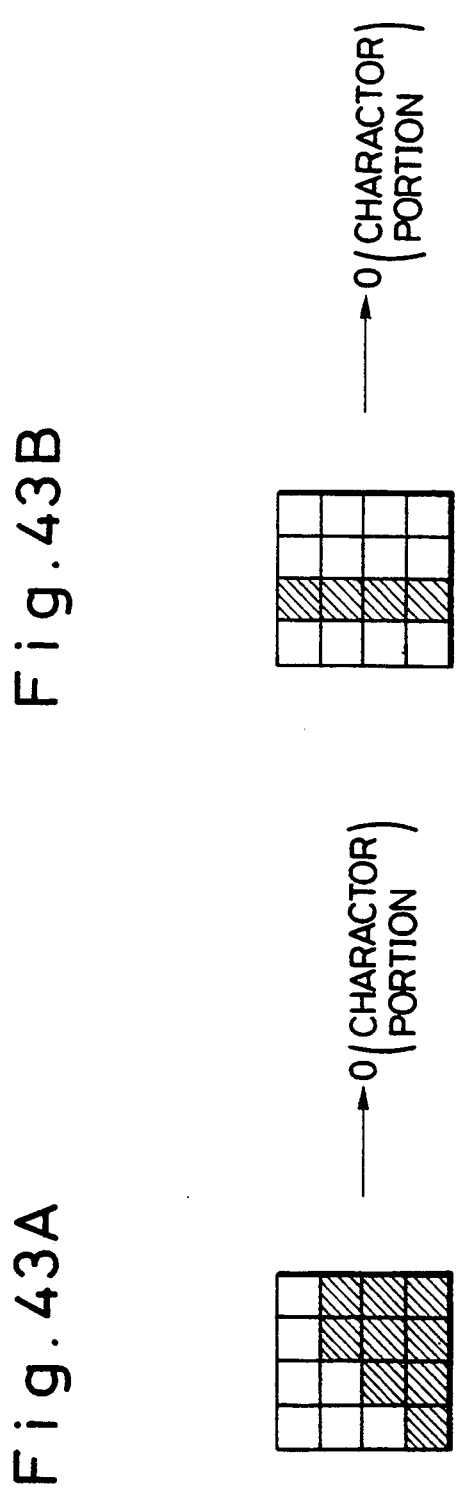
Fig.43A Fig.43B Fig.43C Fig.43D

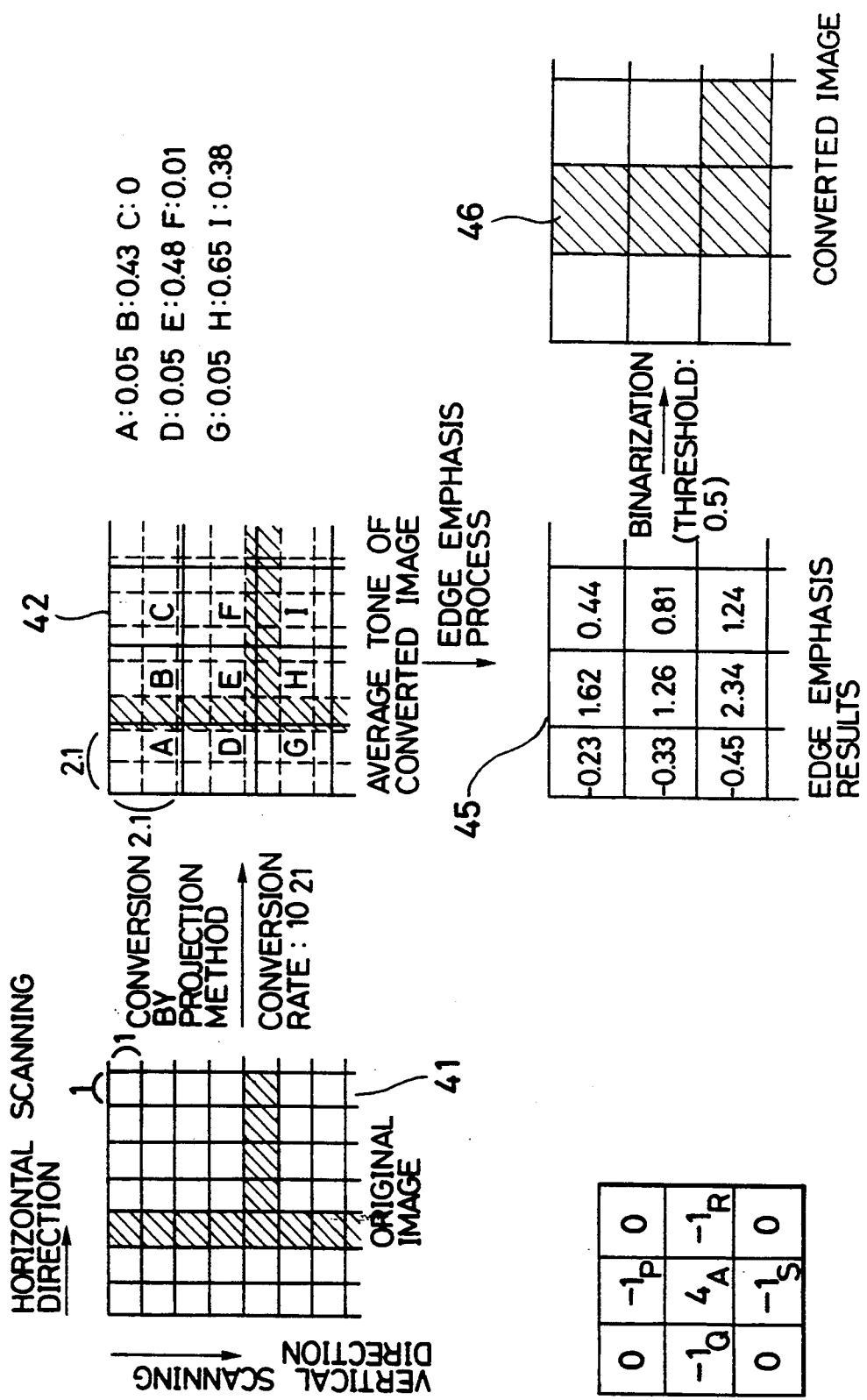

PIXEL DENSITY CONVERTING APPARATUS

This application is a division of application Ser. No. 07/492,490, filed Mar. 12, 1990, now U.S. Pat. No. 5,289,293, issued Feb. 22, 1994.

BACKGROUND OF THE INVENTION

1. Field of the Invention

The present invention relates to a picture element density converting apparatus, and more particularly, to a picture element density converting apparatus for binary images in which a pseudo half-tone processed image and characters or line drawings are present in a mixed state.

2. Description of the Prior Arts

In a case where the resolution of an image reading device or an image printing image differs from that employed on communications in a facsimile system or the like, or in a case where enlargement or reduction of image data is performed by means of an image editing device or the like, the density of the picture elements of an image must be converted.

Conventionally, various methods, such as the SPC method, the logical OR method, the 9 division method, the projection method, the linear interpolation method and the distance inverse proportion method, have been proposed as pixel density conversion methods for such binary images. These methods are mainly employed for characters or line drawings.

In the case of reduction in the density of picture elements of information represented by a binary signal, the thinning out method is used. In this method, the original pixels are thinned out at a fixed ratio so as to reduce the number of original pixels.

In the case of reduction in the pixel density, the logical OR method is also employed. In this method, for example, a total of 4 pixels, 2 pixels in the vertical direction and 2 pixels in the horizontal direction, are referred to, and, if the number of black pixels is 1 or above, these 4 pixels are replaced by 1 black pixel while, if all 4 pixels are white pixels, they are replaced by 1 white pixel.

However, the thinning out method has a disadvantage in that thin lines drawn on an original at a width corresponding to one pixel may disappear or be broken due to loss of the pictorial information held by the discarded pixels. The logical OR method has a drawback that it is not suited to pseudo half-tone processed images which have been processed by the dither method, the error diffusion method or the like, because the half-tone of these images is expressed by a ratio of the area of the black area to that of the white area, but this logical OR method increases the ratio of the area of the black area in a converted image.

Japanese Patent Laid-Open No. 281673/1987 discloses the conversion method suitable for binary images obtained by the dither method. In this method, multilevel data which is to be subjected to the dither process is estimated using an average value filter or the like. Pixel density conversion is conducted on the obtained multi-level data, and the converted data is binarized again. However, it is difficult to estimate multi-level data which is to be subjected to the quantization process with a high degree of accuracy. Filtering may reduce the resolution or change a tone. Furthermore, this process cannot be applied to an image which contains characters or figures.

In a facsimile system or the like, since disappearance of thin lines is a more serious problem than blurring thereof, the logical OR method is mainly employed. However, in this method, blurring occurs and lines are thereby thickened when the conversion factor is in the vicinity of 1 or in the case of enlargement.

Among the above-described conversion methods, the interpolation method, such as the linear interpolation method, and the projection method are known as the conversion method in which blurring or disappearance of the thin lines is little.

However, in both the interpolation method and the projection method, disappearance or blurring of the thin lines occurs in the case where the conversion factor is low.

More specifically, when the conventional conversion methods mainly used for characters or line drawings are applied to images which have been subjected to the psuedo half-tone process, such as the dither method, moire or cyclic lines are generated and the quality of images therefore deteriorates in either of these methods and particularly in the case of conversion by a factor other than an integer. When the conventional conversion methods mainly used for images which have been subjected to the pseudo half-tone process are adopted to characters or line drawings, degradation of the image quality, including reduction in the resolution and disappearance of thin lines, is great.

In the case of the image processed by the organized dither technique method and in a case where the dither matrix is known, it has been proposed to process an image in which pseudo half-tone processed images and characters or figures are present in a mixed state by excellently estimating an original multi-level image (Japanese Patent Laid-Open No. 157468/1987). However, this method cannot be applied to images which have been subjected to the pseudo half-tone process by an unspecified method and whose dither matrix is unknown or to those which have been binarized by the conditional determination dither method.

Thus, the conventionally proposed conversion methods do not assure excellent conversion of the pixel density of an image in which images which have been subjected to the pseudo half-tone process by an unspecified method and characters or figures are present in a mixed state.

SUMMARY OF THE INVENTION

In view of the aforementioned problems and drawbacks of the conventional conversion techniques, an object of the present invention is to provide a pixel density conversion apparatus which is capable of excellently converting the pixel density of an image in which pseudo half-tone processed images and characters or line drawings are present in a mixed state by a conversion factor of an arbitrary value.

Another object of the present invention is to provide a pixel density conversion apparatus which enables moire, generated when the density of pseudo half-tone processed images is converted, to be alleviated.

Another object of the present invention is to provide a pixel density conversion apparatus which enables disappearance or blurring of thin lines, which occurs when the density of simply binarized images is converted, to be eliminated.

In order to achieve these objects, the present invention provides a pixel density conversion apparatus in which a pixel density conversion means is combined with a tone storage binarization means.

A conversion means which performs conversion by the projection method or the linear interpolation method is preferably employed as the pixel density conversion means.

A binarization means which adopts the error diffusion method or the average error minimizing method is preferably selected as the tone storage binarization means.

The pixel density conversion means is a combination of an integral conversion means suitable for use in converting the density by a factor of an integer and a fractional conversion means capable of converting the density by a factor of a fraction.

The integral conversion means includes a means suitably used for a pseudo half-tone processed image, and a means suitably used for a simple binarized image, which are selectively used according to the results of determination of an image area.

In addition to the tone storage binarization means, a simple binarization means is provided. Selection of these tone storage binarization means and the simple binarization means depends on the results of determination of an image area.

An edge intensification means is provided between the pixel density conversion means and the binarization means so as to achieve excellent pixel density conversion.

Another object of the present invention is to provide a structure which achieves increases in the processing speed and simplification of the hardware in the projection method and the linear interpolation method which are employed in the pixel density conversion means.

In order to achieve this, in the projection method employed in the present invention, the number of pixels referred to is limited or one side of an-area of a converted pixel is made $2^n$.

In the linear interpolation method according to the present invention, area division is conducted so as to allow only the logical operations to be performed.

The above and other objects of the present invention will become apparent from the following description taken in connection with the accompanying drawings.

BRIEF DESCRIPTION OF THE DRAWINGS

FIG. 2 is a timing chart of an input/output signal representing an image;

FIG. 24 is a block diagram showing the configuration of the error diffusion process;

FIG. 25 shows an example of a diffusion matrix in the error diffusion process;

FIG. 26 is a block diagram showing the configuration of a binarization process by the average error minimizing method;

FIG. 27 shows an example of a weighting matrix for the average error minimizing method;

FIG. 34A shows an example of the configuration of a basic block and output data;

FIGS. 34B and 34C show examples of the image area determinations made by means of the ROM data shown in FIG. 35;

FIG. 35 shows an example of data in a ROM 82;

FIG. 42 shows an example of data in a ROM 143;

FIGS. 43A to 43D show examples of image area determination conducted by the ROM shown in FIG. 42;

FIG. 52 shows an example of a differential filter factor;

FIG. 53 explains an example of conversion by the edge emphasis unit of FIG. 51;

DESCRIPTION OF THE PREFERRED EMBODIMENTS

Embodiments of the present invention will now be described with reference to the accompanying drawings.

Figure 1A:
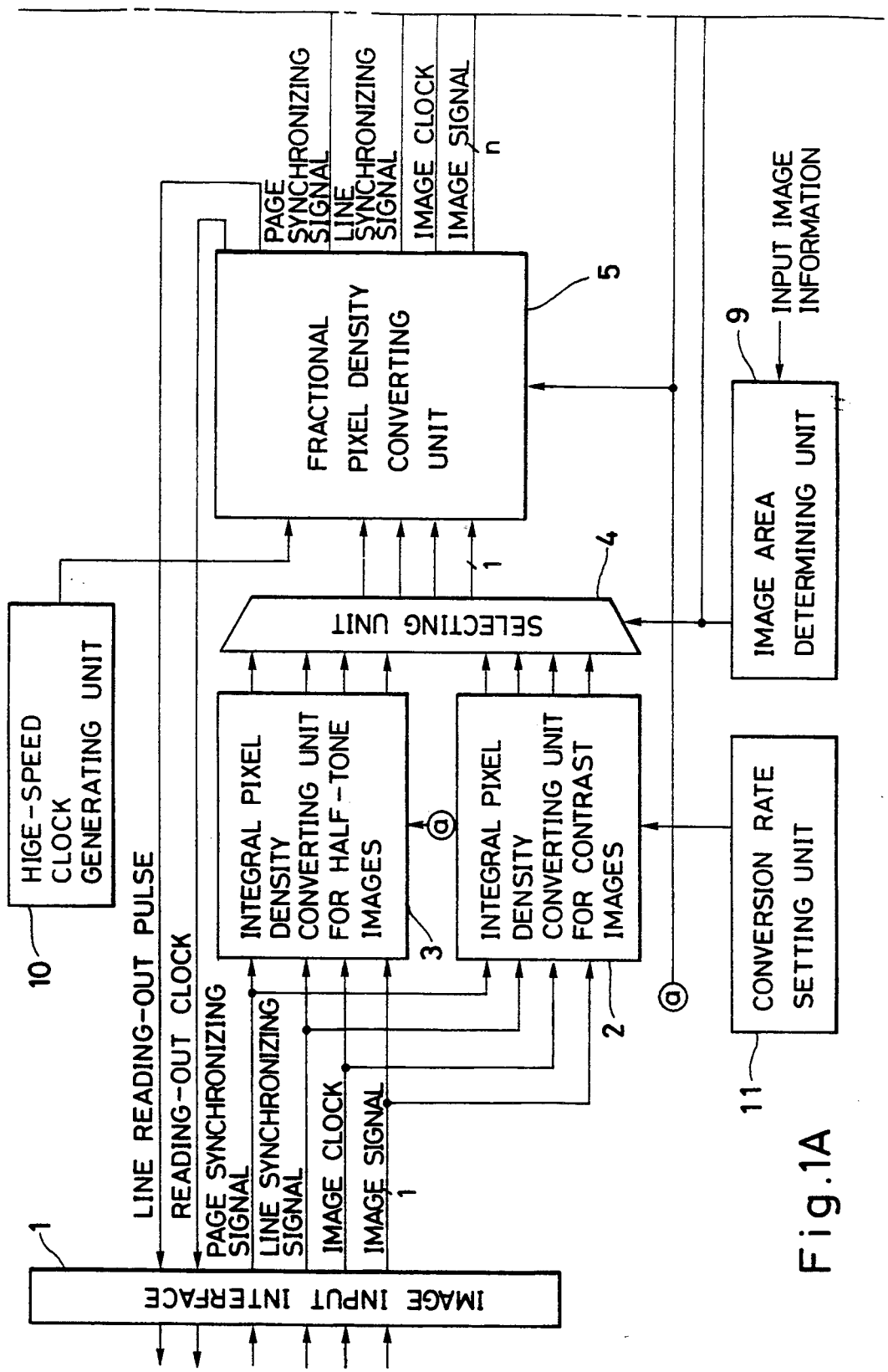
FIG. 1 comprises FIGS. 1A and 1B which are block diagrams of an embodiment of a pixel density conversion apparatus according to the present invention.
Figure 1B:
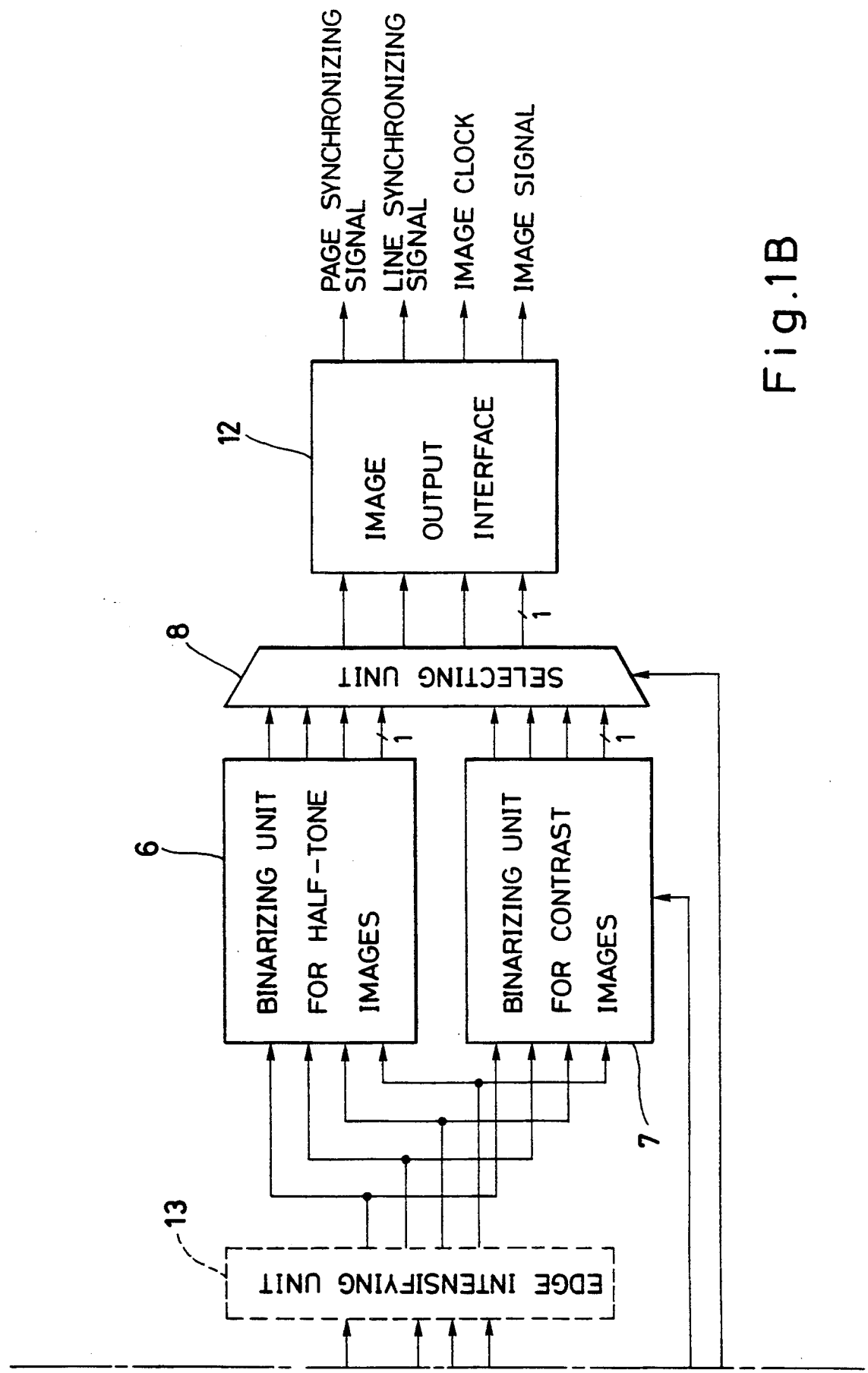

FIG. 1 is a block diagram of an embodiment of a pixel density conversion apparatus according to the present invention.

In FIG. 1, a reference numeral 1 denotes an image input interface which is connected to an image storage device (hereinafter referred to as an image outputting device) (not shown) for inputting image data, and a reference numeral 2 denotes a pixel density converting unit for contrast images (hereinafter referred to as "an integral converting unit for contrast images") which is suitably used to enlarge or reduce contrast images by a factor of an integer. In this embodiment, the integral converting unit performs conversion by the majority method, the average value method or the logical OR method.

A reference numeral 3 denotes a pixel density converting unit for half-tone images (hereinafter referred to as "an integral converting unit for half-tone images") which is suitably used to enlarge or reduce half-tone images by a factor of an integer. In this embodiment, the conversion performed in the integral converting unit for half-tone images is the thinning out method. A reference numeral 4 designates a selecting unit for selecting the output of the two integral multipliers 2 and 3 on the basis of the image area of an input image. A reference numeral 5 denotes a pixel density converting unit (hereinafter referred to as "a fractional converting unit) which is suitably used to enlarge or reduce images by a factor of an arbitrary value other than those employed in the integral converting units 2 and 3. In this embodiment, the fractional converting unit 5 performs the conversion by the projection method or the linear interpolation method.

A reference numeral 6 denotes a binarizing unit for half-tone images which performs binarization of half-tone images by the error diffusion method or the average error minimizing method. A reference numeral 7 denotes a binarizing unit for contrast images which performs simple binarization on contrast images. A reference numeral 8 denotes a selecting unit for selecting the binarization by the binarizing units 6 and 7 on the basis of the image area of an input image.

A reference numeral 9 denotes an image area determining unit for causing the selecting units 4 and 8 to select an image signal on the basis of the image area of the image signal. In this embodiment, the image area determining unit 9 is a concept which includes a switch circuit, a circuit for determining an image area from input image data or from the image data output from the binarizing units, and a circuit for designating an image area by the designation of an image area by means of a mouse or the like. A reference numeral 10 denotes a high-speed clock generator, such as a quartz-crystal oscillator, for generating a clock which achieves synchronization of the operation of the fractional converting unit 5 at a high speed, and a reference numeral 11 denotes a conversion setting unit which sets the conversion factor for the integral converting units 2 and 3 and the conversion factor for the fractional converting unit 5 and which changes the threshold value for the binarizing units on the basis of the set conversion factor. A reference numeral 12 denotes an image output interface through which the image data whose pixel density has been converted is output to an external circuit.

A reference numeral 13 denotes an edge emphasizing unit for performing edge emphasis on multi-level data output from the fractional converting unit 5.

Now, the above-described components shown in FIG. 1 will be described in detail one by one. Modifications of the pixel density conversion apparatus shown in FIG. 1 will also be described.

Image Data Inputting Timing

An image outputting device, which is connected to the image input interface 1, outputs image data stored in it at a timing shown in FIG. 2. The image data stored in the image outputting device may be that read by an image reading device or that received externally. The operation of the image outputting device is in synchronism with the rising edges of an input signal which is a reading-out clock. As a first line reading-out pulse is input, the level of a page synchronizing signal rises, and concurrently with this, an image signal corresponding to one line is output. After the first line reading-out pulse, an image signal corresponding to one line is output each time the line reading-out pulse is input. Once output of the image signal corresponding to one page is completed, the level of the page synchronizing signal falls at a subsequent line reading-out pulse. The output of the image signal corresponding to one line is in synchronism with image clocks which are the reading-out clock and a line synchronizing signal.

Example of the Integral Converter for Contract Images

Conversion by the Majority

Figure 3:
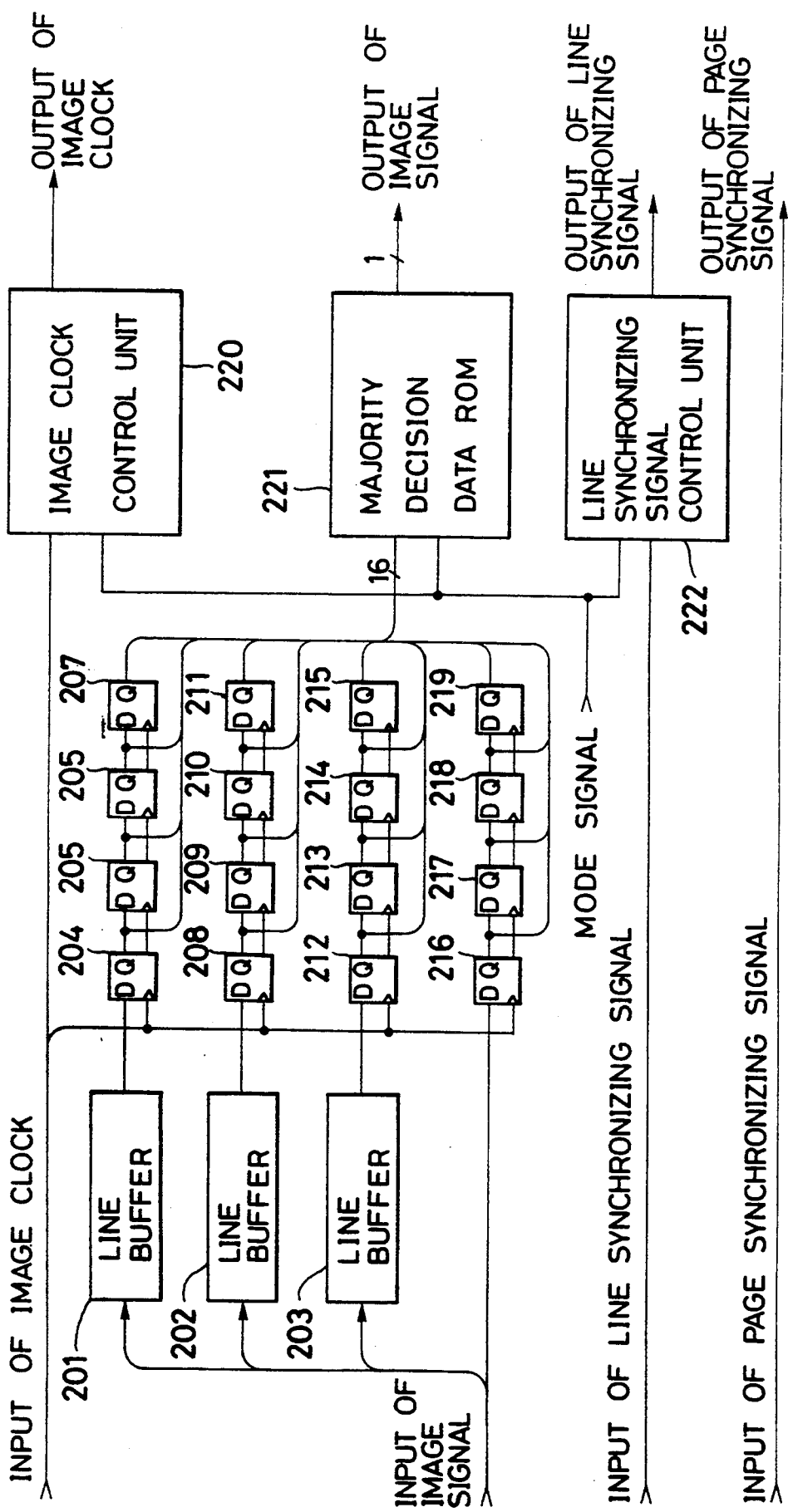
FIG. 3 is a block diagram showing an example of the configuration of the majority process.

The majority process involves decrease in the number of pixels by a factor of an integer in both the horizontal and vertical directions. FIG. 3 is a block diagram of an example of the configuration of the majority process. The majority structure shown FIG. 3 includes line buffers 201, 202 and 203, D flip-flops 204 to 219, an image clock control unit 220, a majority data ROM 221, and a line synchronizing signal control unit 222.

In this majority process, buffering-of image data corresponding 3 lines is first performed by the line buffers 201 to 203 so that image data corresponding to a total of 4 lines including the line which is being input can be referred to. Next, the obtained data are shifted by the respective D flip-flops 204 to 219 so that 4×4−16 pixels can be referred to. The data corresponding to 16 pixels are input to the majority data ROM 221 which outputs an image signal. The contents of the ROM data are written such that the ROM 221 outputs a signal having a logical "1" level when the number of pixels in the 16 pixels which have a logical "1" level is equal to or greater than that which has a logical "0" level and a signal having a logical "0" level when the number of pixels in the 16 pixels which have a logical "1" level is less than that which has a logical "0" level. A mode signal is also input to the address lines of the ROM 221. In consequence, data can be converted in the same ROM at various conversion factors by switching over the mode signal. The image clock control unit 220 reduces the number of image clocks in accordance with the conversion factor in the horizontal scanning direction which is selected by the mode signal. If the conversion ratio is, for example, ½, the image clocks are discarded one for each two clocks. If the conversion ratio is ¼, three clocks are discarded for each four clocks, allowing one out of four clocks to be output. The line synchronizing signal control unit 222 reduces the number of line synchronizing signals in accordance with the conversion factor for the vertical scanning direction which is selected by the mode signal.

In the above-described majority structure, conversion of the pixel density at a ratio down to ¼ is possible in both the horizontal and vertical directions. However, the decreasing factor may be increased by increasing the number of line buffers and that of D flip-flops employed. Furthermore, the majority data ROM 221 may be constructed by a logical circuit.

Conversion by the Average Value

The averaging process involves decrease in the pixel density by a factor of an integer in both the horizontal and vertical scanning directions.

Figure 4:
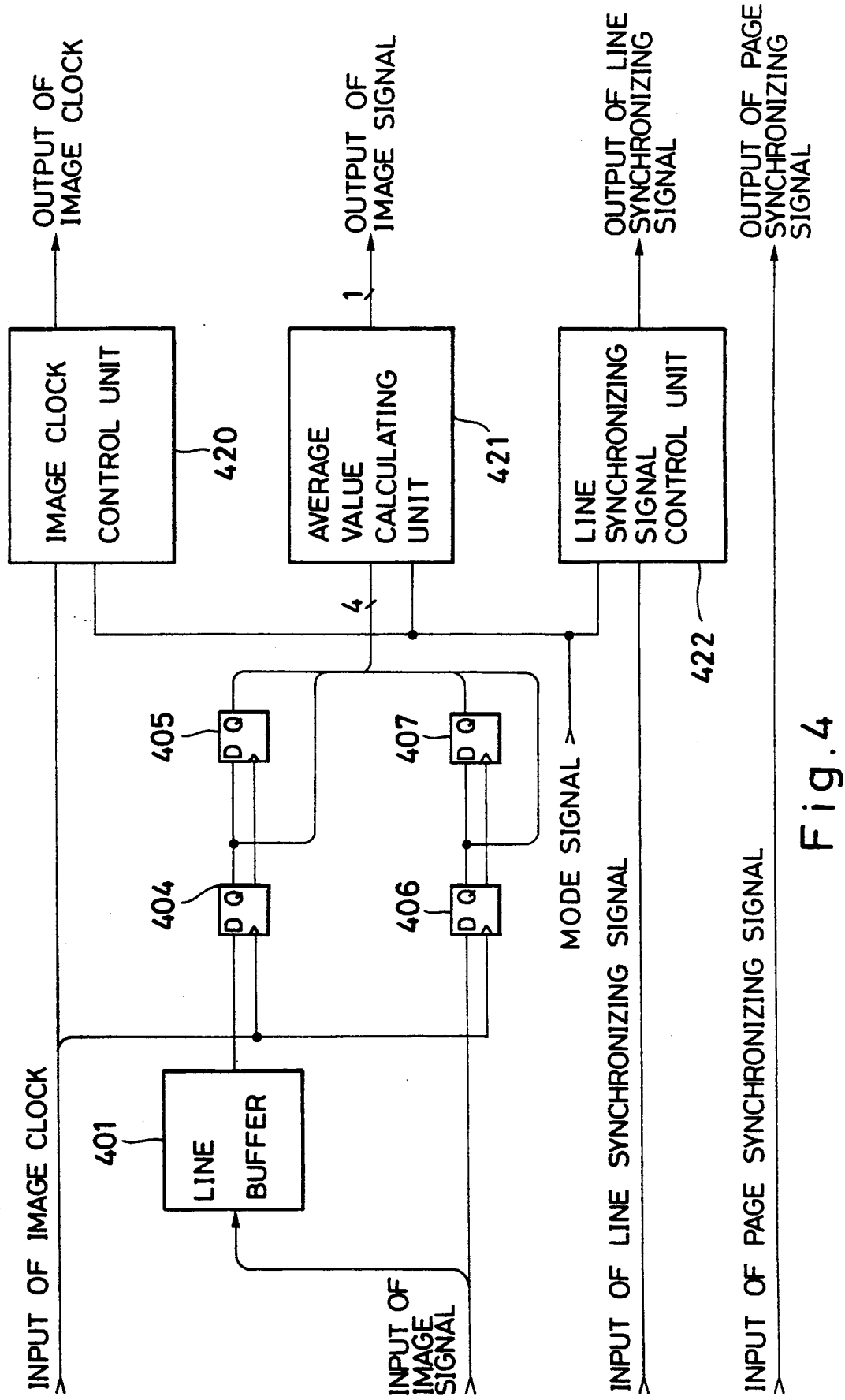
FIG. 4 is a block diagram showing an example of the configuration of the averaging process.

FIG. 4 is a block diagram of an example of the configuration of the averaging process. This averaging structure includes a line buffer 401, N-bit D flip-flops 404 to 407, an image clock control unit 420, an average value calculating unit 421, and a line synchronizing signal control unit 422. In this averaging process, buffering of image data corresponding to 1 line is first performed by the line buffer 401 so that image data corresponding to a total of 2 lines including the line which is being input can be referred to. Next, the obtained data are shifted by the respective D flip-flops 404 to 407 so that 2×2=4 pixels can be referred to. The data corresponding to 4 pixels are input to the average value calculating unit 421 which outputs an image signal. Also, a mode signal is input to the address lines of the calculating unit 421 so as to allow the conversion factor to be changed by the switch-over of the mode signal. The image clock control unit 410 reduces the number of image clocks in accordance with the conversion factor for the horizontal scanning direction which is selected by the mode signal. The line synchronizing signal control unit 422 reduces the number of line synchronizing signals in accordance with the conversion factor for the vertical scanning direction which is selected by the mode signal.

In the above-described averaging process, a reduction by a factor of 2 in both the horizontal and vertical directions is possible. However, the reduction factor can be increased by increasing the number of line buffers and that of the D flip-flops which are employed.

Example of Integral Pixel Density Converting Unit for Half-tone Images

Conversion by the Thinning Out

Figure 5:
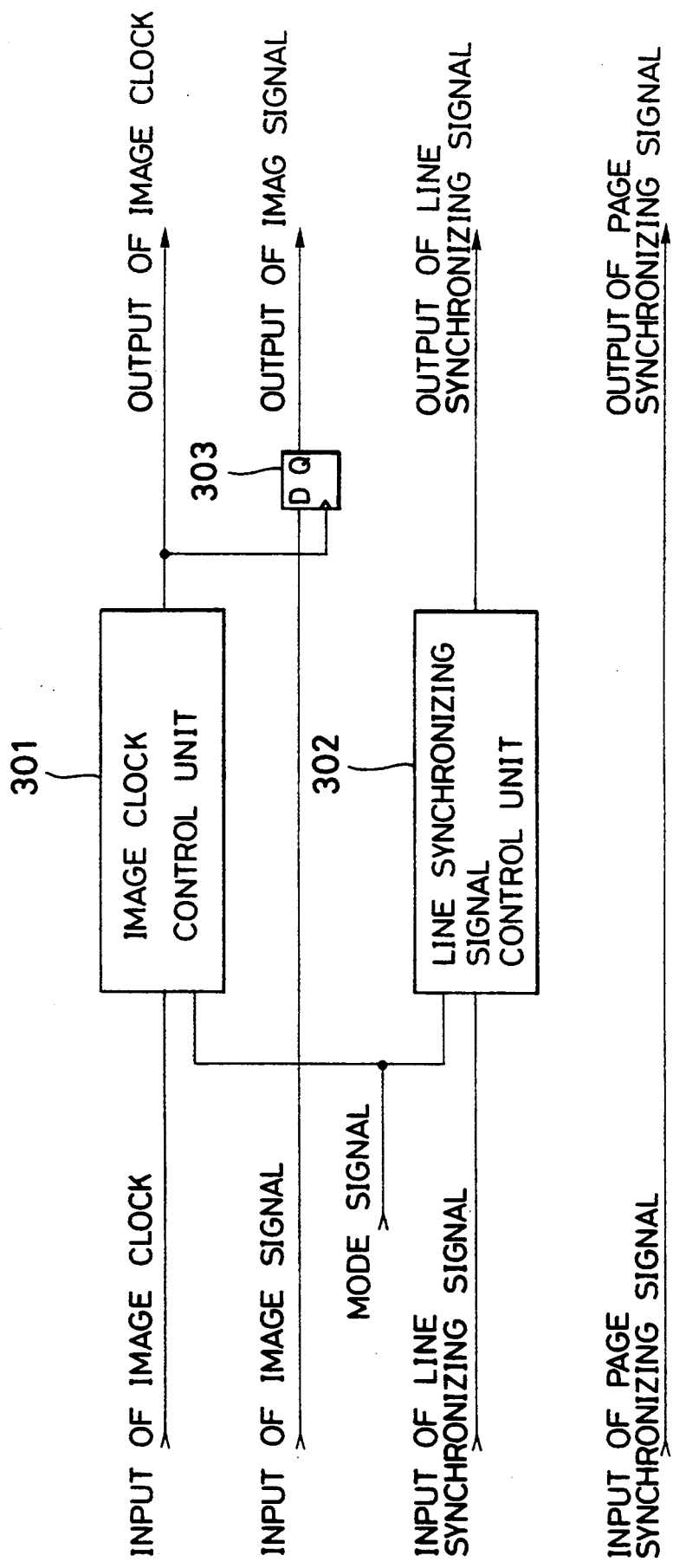
FIG. 5 is a block diagram showing an example the configuration of the thinning out process.

FIG. 5 is a block diagram of an example of the configuration of the thinning out process. This thinning out structure includes an image clock control unit 301, a line synchronizing signal control unit 302, and a D flip-flop 303. The image clock control unit 301 reduces the number of image clocks in accordance with a mode signal. The image clocks output from the image clock control unit 301 are input to the D flip-flops 303 to achieve synchronization of an image signal. The line synchronizing signal control unit 302 reduces the number of line synchronizing signal in accordance with the mode signal.

Figure 6:
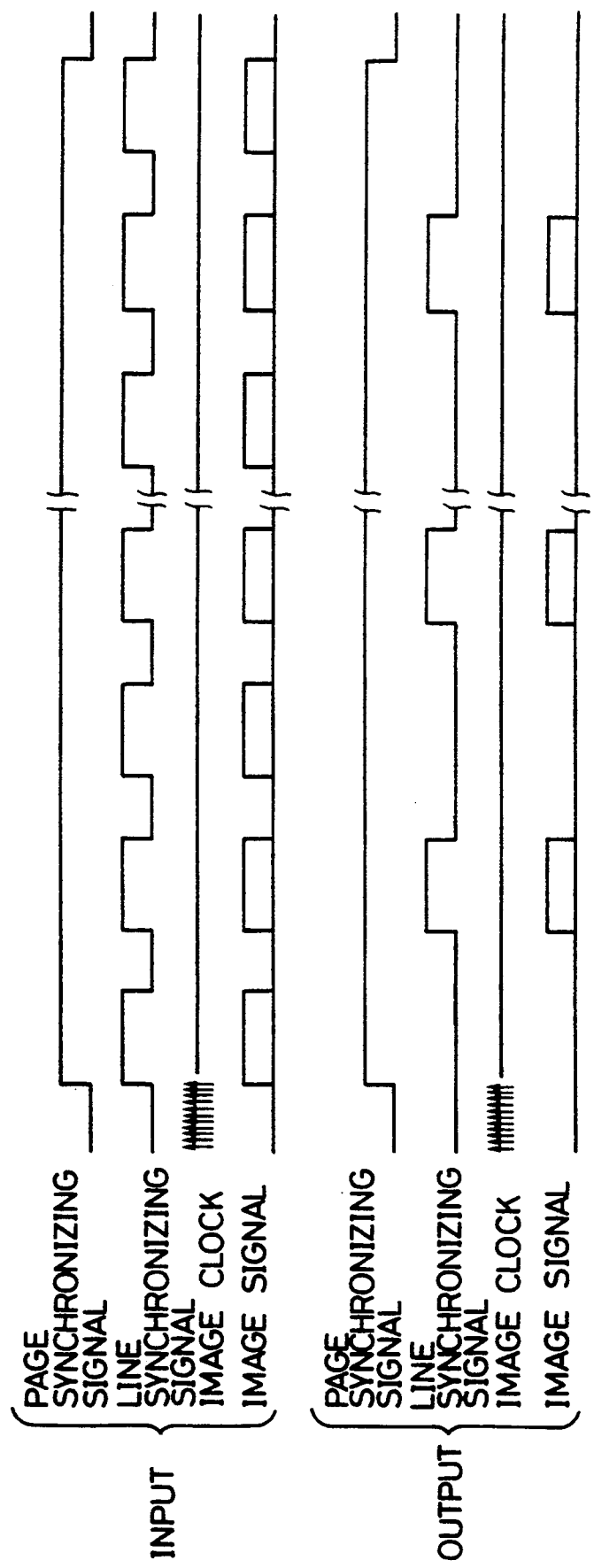
FIG. 6 is a timing chart of an input/output signal in the majority process, the averaging process and the thinning out process in a case where a number of pixels is decreased by a factor of 2 in the vertical scanning direction.
Figure 7:
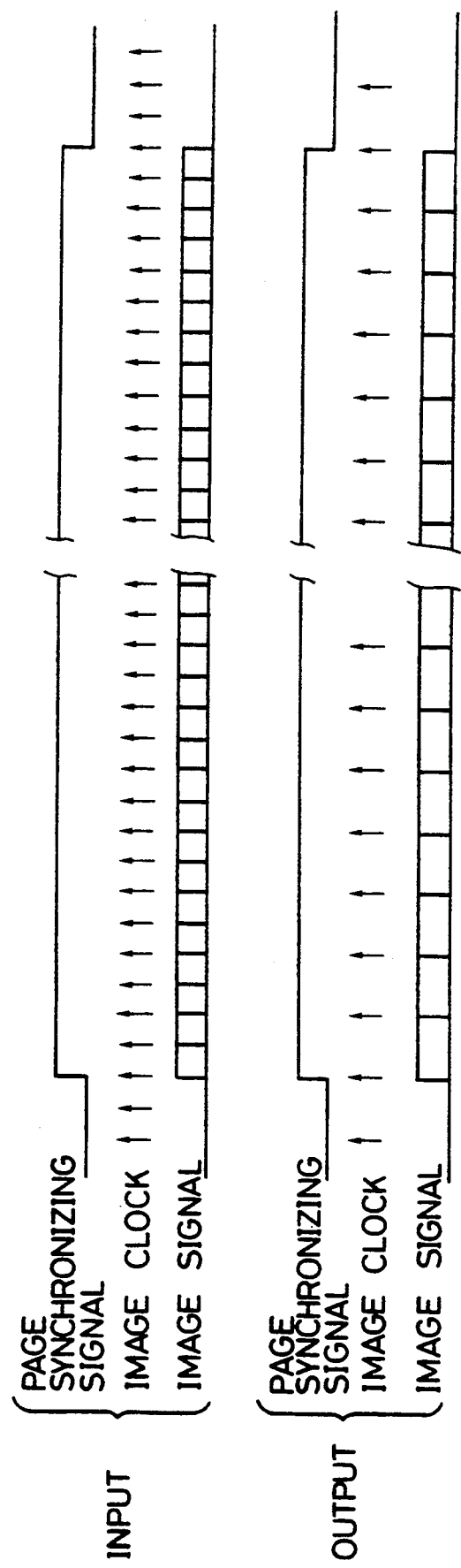
FIG. 7 is a timing chart of an input/output signal in the majority process, the averaging process and the thinning out process in a case where a number of pixels is decreased by a factor of 2 in the horizontal scanning direction.

FIG. 6 is a timing chart for the case of reduction in the number of pixels to one half in the vertical scanning direction in the aforementioned majority, averaging and thinning out processes. In FIG. 6, the number of lines is reduced to one half by reducing the number of line synchronizing signals and that of image signals which are output. FIG. 7 is a timing chart for the case of reduction in the number of pixels to one half in the horizontal scanning direction. In FIG. 7, the number of pixels is reduced to one half by reducing the number of image clocks which are output.

Figure 8:
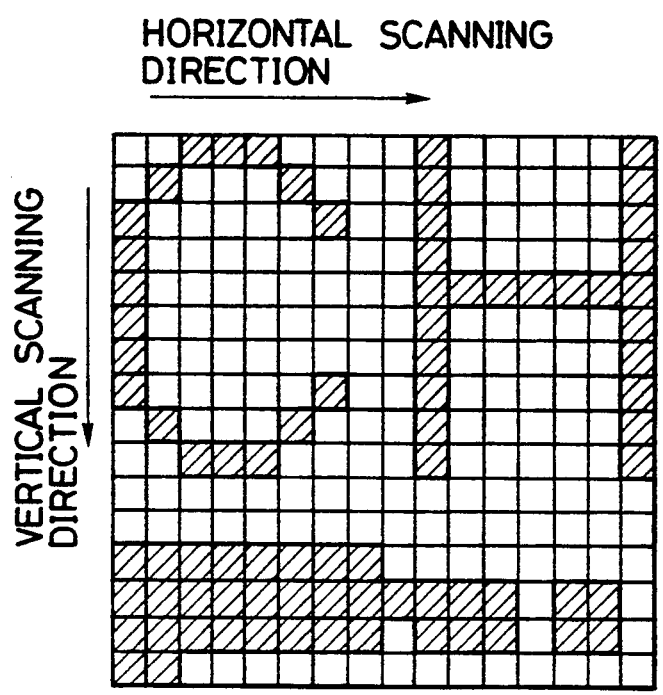
FIG. 8 shows an example of image information output from a pixel output device.
Figure 9A:
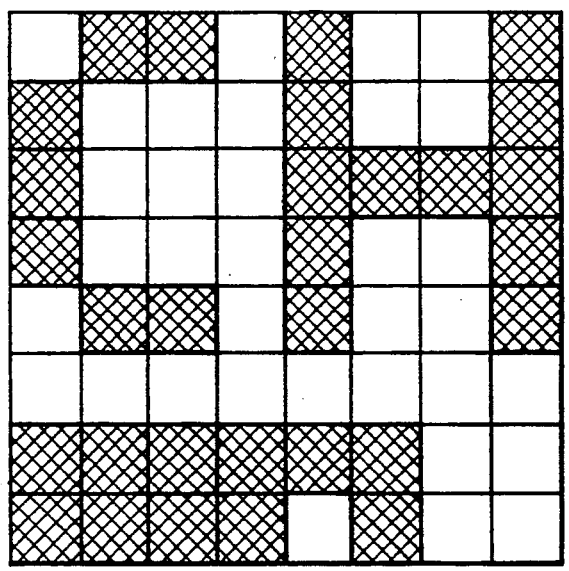
FIG. 9A shows an image obtained by conducting the majority process on the image information shown in FIG. 8.
Figure 9B:
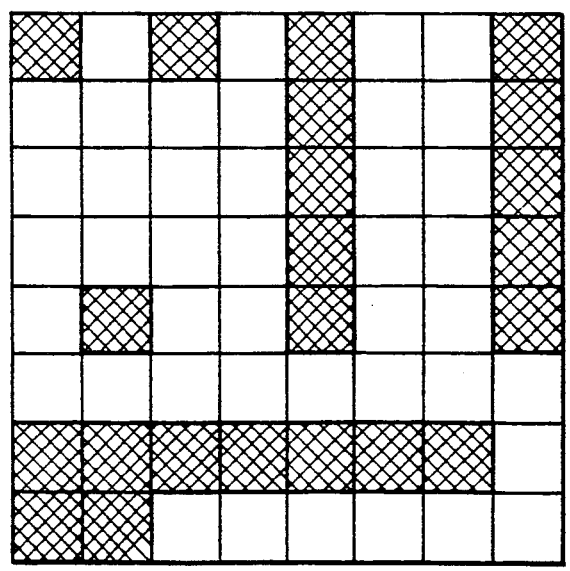
FIG. 9B shows an image obtained by conducting the thinning out process on the image information shown in FIG. 8.

FIG. 8 is an example of image information which is output from the image output device 1. FIG. 9A is an output image obtained by majority processing the image information shown in FIG. 8. In this shown example, the number of pixels is reduced to one half in both the horizontal and vertical scanning directions. In the majority process, 1 pixel shown in FIG. 9A corresponds to 4 pixels shown in FIG. 8. When the number of black pixels in these 4 pixels in the original image is 0 or 1, the output pixel represents white. When the number of black pixels is 2, 3 or 4, the output pixel represents black. FIG. 9B shows an output image obtained by thinning out the image information shown in FIG. 8. In the thinning out process, the image located at the same position in 4 pixels in the original image corresponding to converted 1 pixel is always output as the converged 1 pixel. In the case shown in FIG. 9B, the right lower pixel in the 4 pixels in the image information shown in FIG. 8 is output.

Example of Fractional Pixel Density Converting Unit

Conversion by the Projection Method

Principle

Figure 10A:
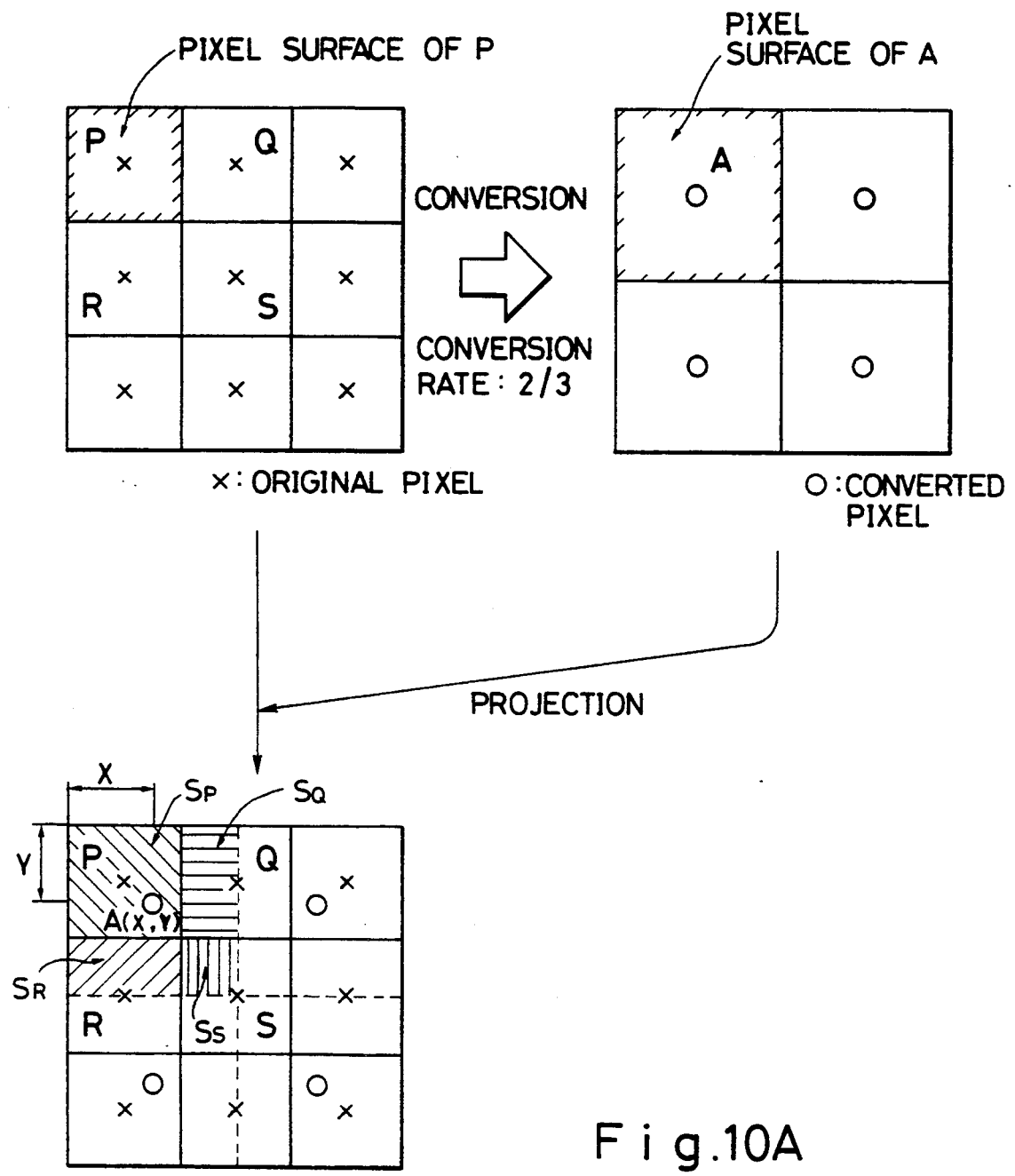
FIG. 10A illustrates the projection process performed at a conversion ratio of $\frac{2}{3}$.

The projection method involves increase or decrease in the number of pixels by a factor of an arbitrary value in both the horizontal and vertical scanning directions. FIG. 10 shows original pixels and those which have been subjected to the projection process. In this projection method, the shape of the original pixel is regarded as a square (shown by the broken line in FIG. 10A), and a rectangle whose sides have lengths obtained by multiplying the lengths of the sides of the original pixel by a reciprocal of the conversion factor in both the horizontal and vertical scanning directions is formed. The formed rectangle is laid on the original pixels, and tone information is determined by the ratio of the black area contained in that rectangle.

FIG. 10A shows the projection at a conversion ratio of ⅔. Let the original pixels over which the surface of a converted pixel A which is an objective pixel is laid when it is projected onto them be P, Q, R and S. If the areas in the overall surface of the converted pixel A which these respective pixels P, Q, R and S occupy are $S_P$, $S_Q$, $S_R$ and $S_S$, the average tone $I_A$ of the objective pixel A is expressed by the following equation:

$$I_A = \frac{S_P \times I_P + S_Q \times I_Q + S_R \times I_R + S_S \times I_S}{S_P + S_Q + S_R + S_S} \quad (1)$$

Next, the obtained average tone $I_A$ for the objective pixel A is binarized so as to obtain a converted output pixel whose pixel density has been converted.

Figure 10B:
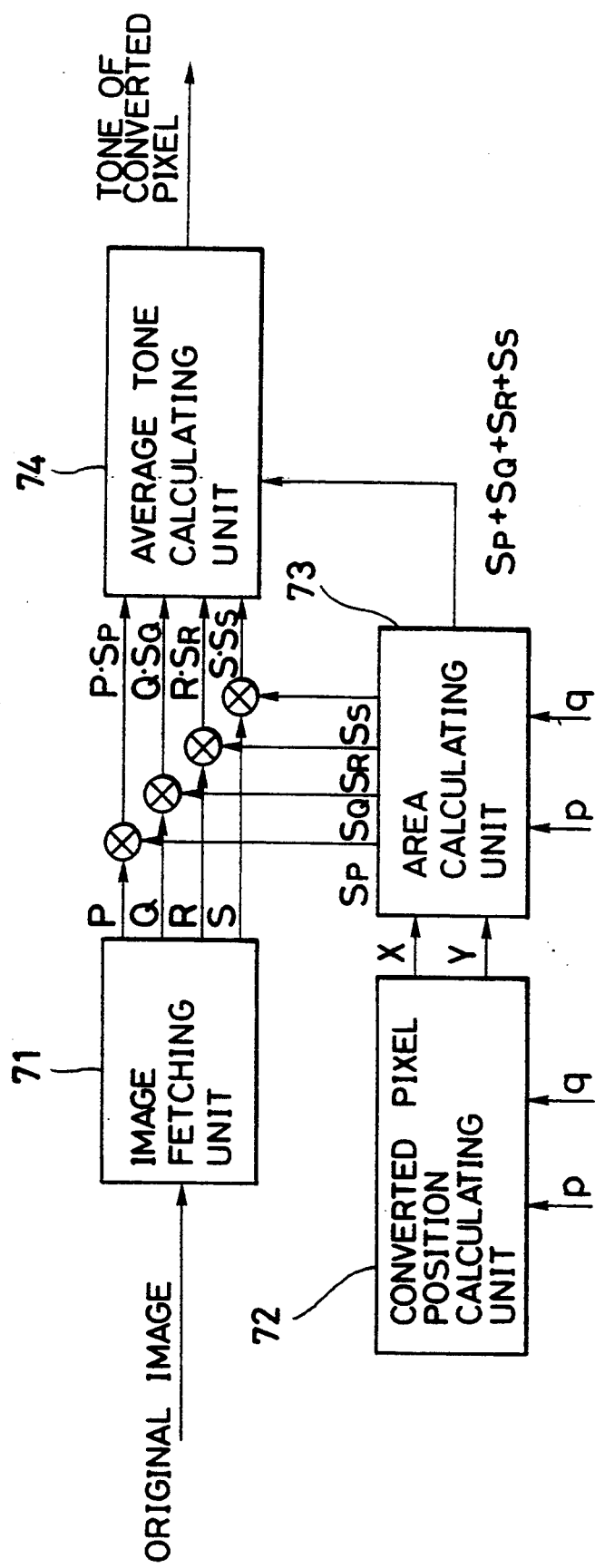
FIG. 10B is a block diagram of a pixel tone operating unit.

FIG. 10B is a block diagram of a pixel tone calculating unit for calculating a pixel tone. The example shown in FIG. 10B permits convertion at a conversion ratio greater than ½. An image fetching unit 71 fetches the original pixels located in the vicinity of the position (X, Y) at which a converted pixel is projected onto a projection surface. A position calculating unit 72 calculates the position of the converted pixel on a projected surface which is defined by a conversion factor in the horizontal and vertical scanning directions. An area calculating unit 73 calculates the respective areas in accordance with the positional information and the conversion factor which are obtained by the position calculating unit 72. An average tone calculating unit 74 performs the operation expressed by Equation (1), i.e., it calculates the average tone for the objective converted pixel from the results of multiplication of the output of the pixel fetching unit 71 by that of the area calculating unit 73.

The configuration of the pixel tone calculating unit is not limited to that shown in FIG. 10B but it may adopt any process as long as it produces the results of calculation of the following equation.

$$I_N = \frac{\Sigma\{I_K \times S_K\}}{\Sigma S_K} \quad (1')$$

$I_N$: The average tone or average brightness for an objective converted pixel N $I_K$: The tone or brightness of original pixels K over which the surface of the objective converted pixel N on a projection surface is laid $S_K$: The area of the surface of the original pixels K over which the converted pixel N is laid In this embodiment, the configuration of the circuit is simplified by limiting the number of original pixels K to be referred to 4. However, increase in the number of pixels to be referred to expands the range of the conversion factor which can be processed (lowers the minimum reduction ratio). The projection process may be conducted on image data which is input to the pixel fetching unit 71 in a sequence or that stored in the storage device such as a memory, depending on the configuration of the image fetching unit 71.

In this projection process, pixel density conversion by a factor of a broken number is conducted, whereas density conversion by a factor of an integer is performed in the aforementioned majority, averaging and thinning out processes.

Basic Configuration

Figure 11A:
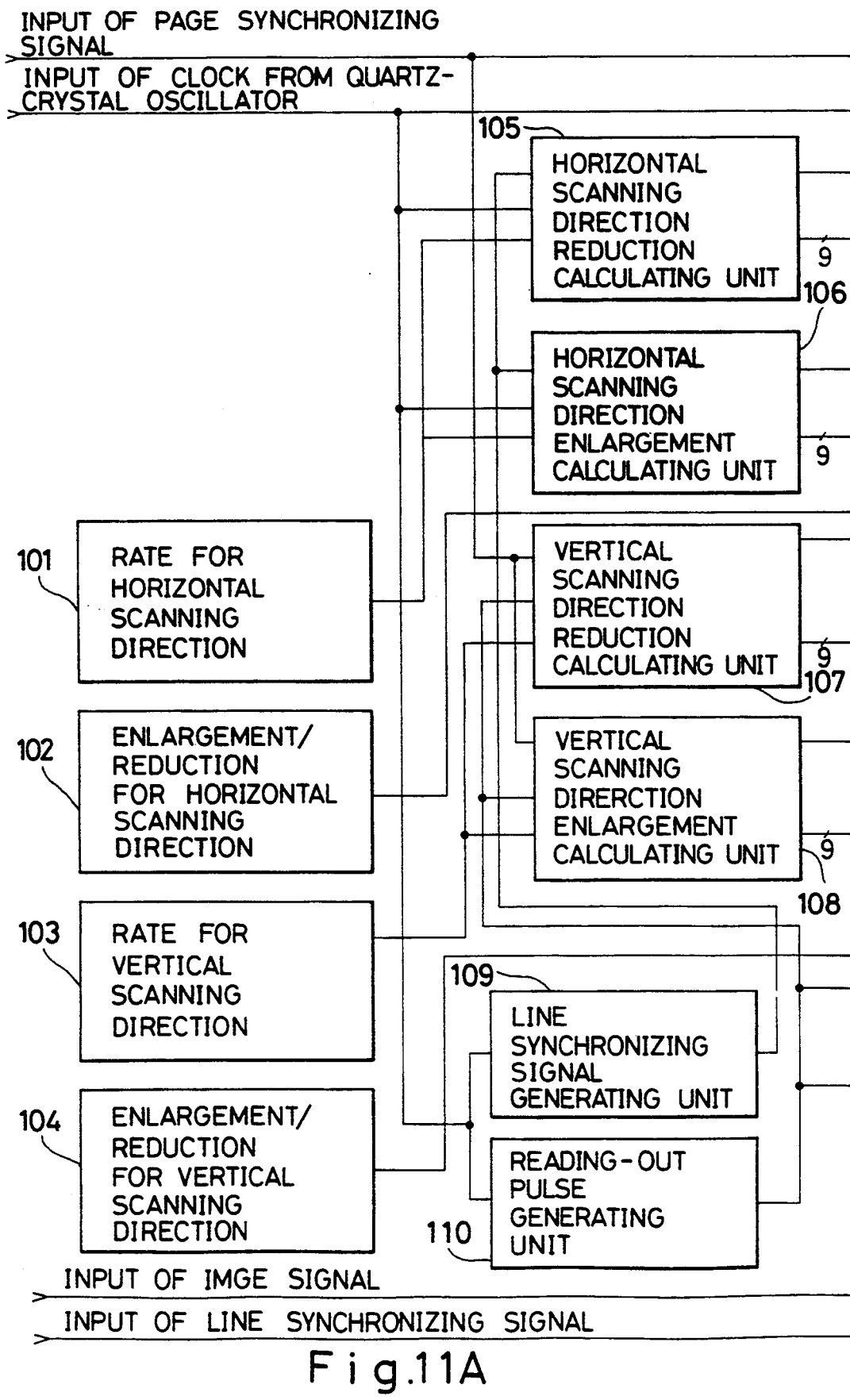
FIGS. 11A and 11B are block diagrams showing an example of the configuration of the projection process.
Figure 11B:
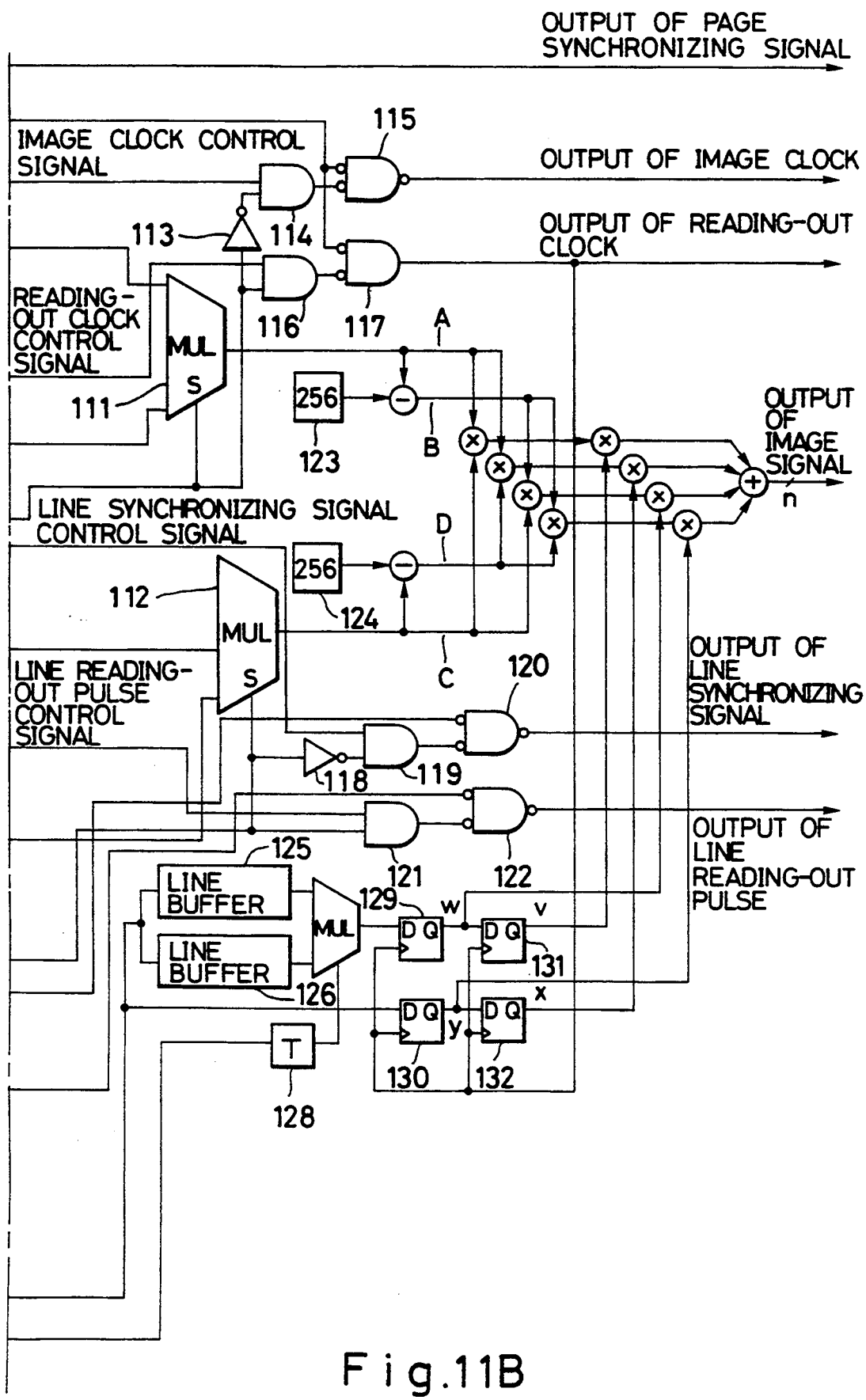

FIG. 11 is a block diagram of a structure adopted in the projection process.

In FIG. 11, a reference numeral 101 denotes a register for setting a conversion factor for the horizontal scanning direction, 102; a register for setting whether or not the conversion in the horizontal scanning direction is enlargement or reduction, the register assuming a logical "1" level for enlargement and a logical "0" level for reduction, 103; a register for setting a conversion factor for the vertical scanning direction, 104; a register for setting whether or not the conversion in the vertical scanning direction is enlargement or reduction, the register assuming a logical "1" level for enlargement and a logical "0" level for reduction. The registers 101 to 104 are set by a central processing unit (which is not shown). A reference numeral 105 denotes a horizontal scanning direction reduction calculating unit, 106; a horizontal scanning direction enlargement calculating unit, 107; a vertical scanning direction reduction calculating unit, 108; a vertical scanning direction enlargement calculating unit, 109; a line synchronizing signal generating unit for generating line synchronizing signals by dividing the frequency of the signal from a quarts-crystal oscillator, 110; a reading-out pulse generating unit for generating reading-out pulses by dividing the frequency of the signal from the quarts-crystal oscillator, 111; a multiplexer for passing the signal from the horizontal scanning direction reduction calculating unit 105 when the output of the register 102 is at a logical "0" level and the signal from the horizontal scanning direction enlargement calculating unit 106 when the output of the register 102 is at a logical "1" level, and 112; a multiplexer for outputting the signal from the vertical scanning direction reduction calculating unit 107 when the output of the register 104 is at a logical "0" level and the signal from the vertical scanning direction enlargement calculating unit 108 when the output of the register 104 is at a logical "1" level.

A reference numeral 113 denotes an inverter, 114; an AND gate, 115; an OR gate, 116; an AND gate, 117; an OR gate, 118; an inverter, 119; an AND gate, 120; an OR gate, 121; an AND gate, 122; an OR gate, 123 and 124; constant units for outputting a constant of 256, 125 and 126; line buffers which constitute double buffers, 127; a multiplexer for switching over the output of the line buffers 125 and 126, 128; a toggle flip-flop for operating in a toggle fashion each time a line synchronizing signal is input, and 129, 130, 131 and 132; D flip-flops.

First, the operation of the horizontal scanning direction reduction calculating unit 105 will be described.

Figure 12:
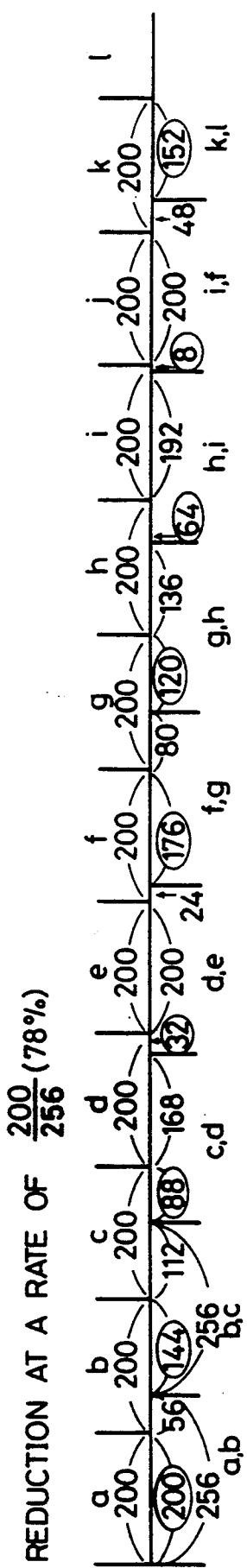
FIG. 12 shows overlapping of the sides of original pixels and those of converted pixels in the case of decrease in the number of pixels by the projecting method.

FIG. 12 shows overlapping of the sides of the original pixels and those of converted pixels when the conversion ratio is 200/256. The horizontal scanning direction reduction calculating unit 105 performs processing in accordance with the conversion factor set in the horizontal scanning direction conversion factor register 101. Synchronization of the operation of the horizontal scanning direction reduction calculating unit 105 is achieved by the clocks input from the quartz-crystal oscillator 10. Line processing is performed in synchronism by the signals input from the line synchronizing signal generating unit 109. The signal output from the horizontal scanning direction reduction calculating unit 105 includes an image clock control signal and that representing the length of a side. The image clock control signal takes the negative logic, and enables the image clock when it is at a logical "0" level. The length of the side which ranges from 1 to 256 is 9-bit parallel signals. Since the conversion ratio is 200/256, the horizontal scanning direction enlargement/reduction register is at the logical "0" level. In consequence, the multiplexer 111 selects and outputs the length of the side from the horizontal scanning direction reduction calculating unit 105. The lower input of the AND gate 114 is at a logical "high" level, and the image clocks are therefore controlled. The lower input of the AND gate 116 is at a logical "low" level, and the lower input of the OR gate 117 is at a logical "low" level. Consequently, the clocks input from the quartz-crystal oscillator are directly output from the OR gate 117 as the reading-out clocks.

Figure 13:
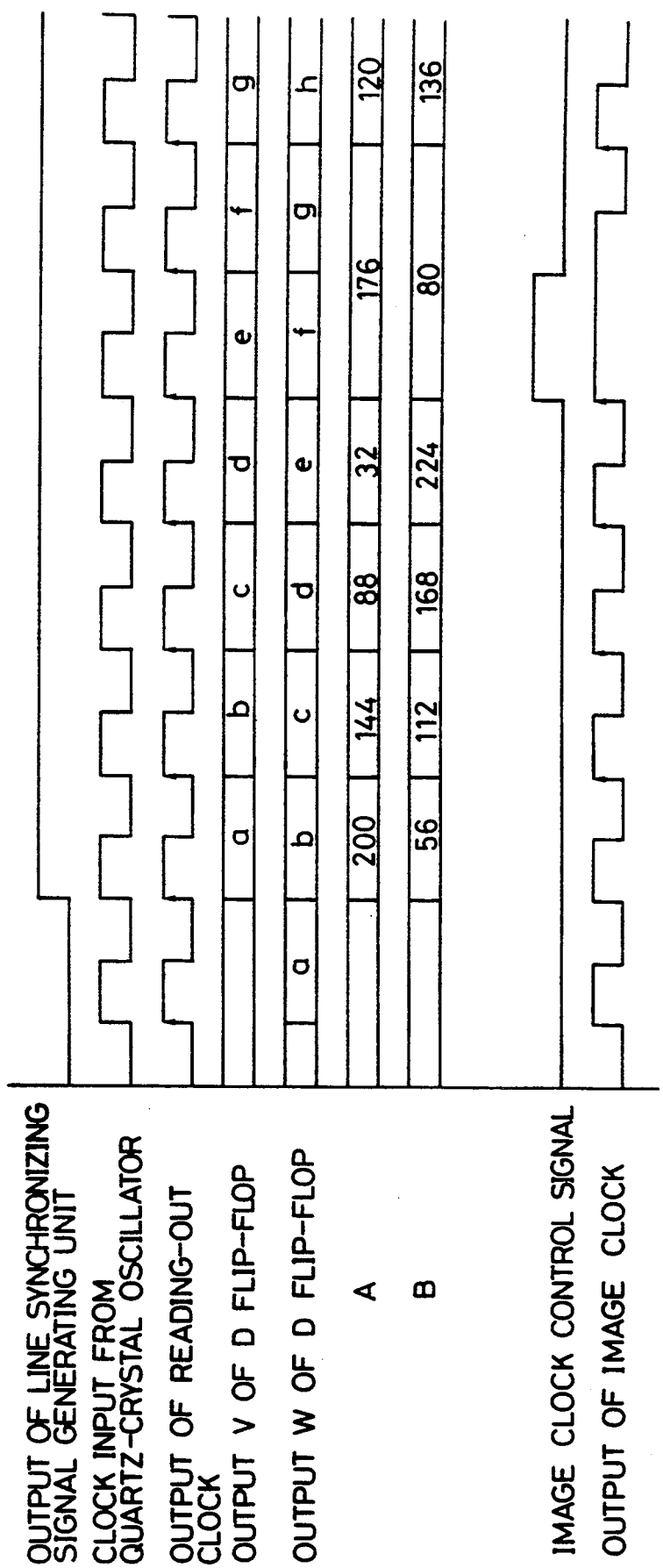
FIG. 13 is a timing chart for the pixel number decreasing process by the projecting method.

FIG. 13 is a timing chart for the reduction process at a conversion ratio of 200/256 in the horizontal scanning direction.

Next, the actual method of actually calculating the side will be described with reference to FIG. 12. First, 200 is output as the length of the side for the first pixel. Thereafter, the following is output as the length of the side for the subsequent pixels:

200−(256−200)=144

200−(256−144)=88

200−(256−88)=32

The length of the subsequent side is obtained by the same calculation as follows:

200−(256−32)=−24

This length is a negative value, and means that 3 original pixels are laid over 1 converted pixel.

Hence, the length of the side to be output is:

−24−200=176

At this time, in order to arrange the number of converted pixels, the image clock control signal assumes the logical "high" level during a period of time corresponding to 1 clock from the quartz-crystal oscillator, as shown in FIG. 13, so as to allow one image clock to be discarded.

The length of the subsequent side is as follows:

200−(245−176)=120

Thereafter, the processing continues in the manner shown in FIG. 12.

The operation of the side is performed in synchronism with the image clocks.

Next, the operation of the horizontal scanning direction enlargement calculating unit 106 will be described below.

Figure 14:
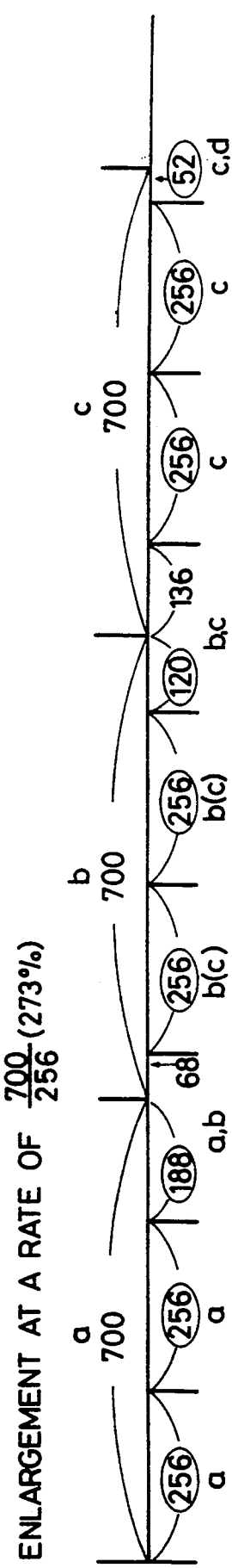
FIG. 14 shows overlapping of the sides of original pixels and those of converted pixels in the case of increase in the number of pixels by the projecting method.

FIG. 14 shows overlapping of the sides of the original pixels and those of the converted pixels-when the conversion ratio is 700/256. The horizontal scanning direction enlargement calculating unit 106 performs processings in accordance with the conversion factor set in the horizontal scanning direction conversion factor register 101. Synchronization of the operation of the horizontal scanning direction enlargement calculating unit 106 is achieved by the clocks input from the quartz-crystal oscillator. Line processing is performed in synchronism by the signals input from the line synchronizing signal generating unit 109. The horizontal scanning direction enlargement calculating unit 106 outputs an image clock control signal and a length of the side. The image clock control signal takes the negative logic, and enables the image clock when it is at a logical "0" level. The length of the side which ranges from 1 to 256 is 9-bit parallel signals. Since the conversion ratio is 700/256, the horizontal scanning direction enlargement/reduction register is at the logical "1" level. In consequence, the multiplexer 111 selects and outputs the length of the side from the horizontal scanning direction enlargement calculating unit 106. The lower input of the AND gate 114 is at a logical "low" level, and the lower input of the OR gate 115 is at a logical "low" level. Consequently, the clocks input from the quartz-crystal oscillator to the OR gate 115 are output as the reading-out clocks.

Figure 15:
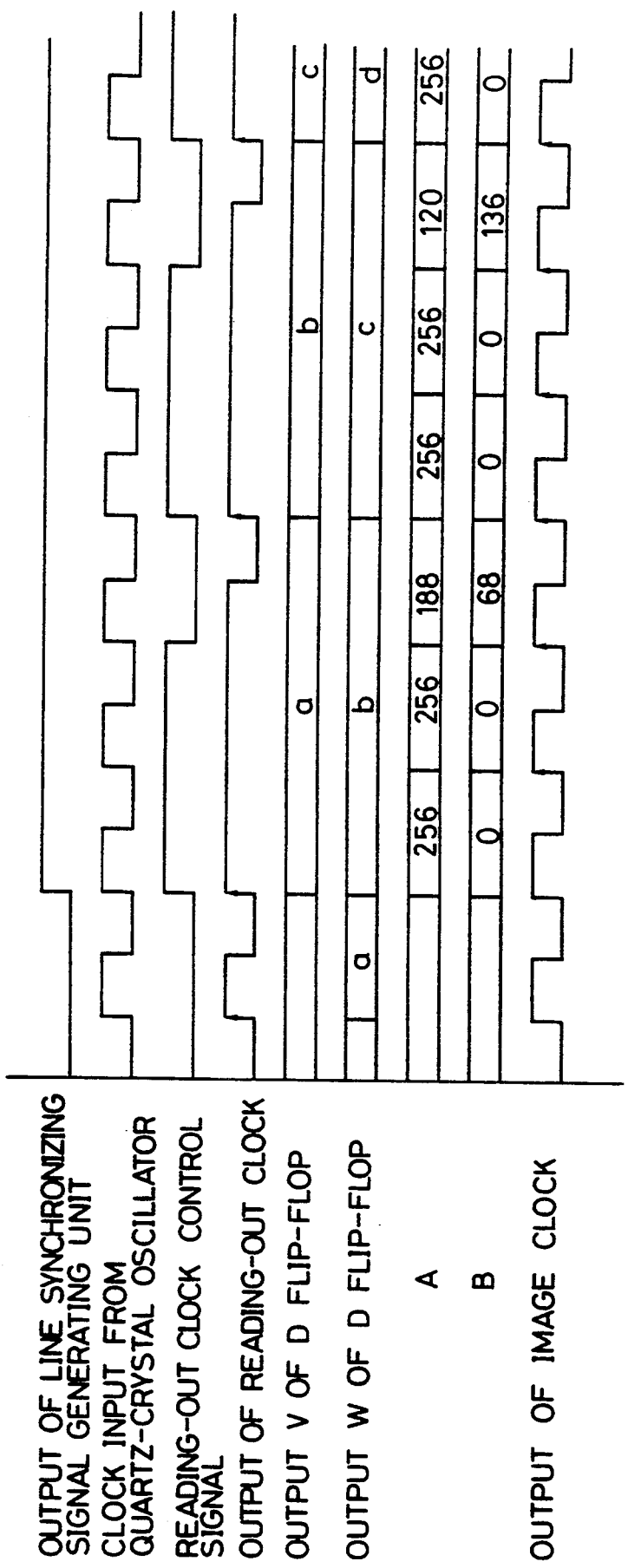
FIG. 15 is a timing chart for the pixel number increasing process by the projecting method.

FIG. 15 is a timing chart for the enlargement process at a conversion ratio of 700/256 in the horizontal scanning direction.

Next, the method of actually calculating the side will be described with reference to FIG. 14. First, 256 is output as the length of the side for the first pixel. Thereafter, 256 is output as the length of the subsequent side because 700−256=444>256. When the inequality sign is >, the reading-out clock control signal assumes a logical "1" level (disabled). Thereafter, 188 is output as the length of the subsequent side because 444−256=188≦256. At this time, the level of the reading-out clock control signal falls so as to enable the reading-out clock, and request of data on a subsequent pixel is thereby made to the image output device.

Next, 256 is output as the length of the side because (188+700)−256=632>256. Subsequently, 256 is output because 632−235=276>256. Thereafter, similar processings are repeated. Operation of the side is performed in synchronism with the clocks input from the quartz-crystal oscillator.

Although the operation of the side conducted in the reduction and enlargement in the horizontal scanning direction has been described, the reduction and enlargement in the vertical scanning direction are also operated in a similar manner. In the case of the operation-for the vertical scanning direction, the horizontal scanning, the clocks from the quartz-crystal oscillator, the image clocks, the side operation results A and B, and the reading-out clocks in the block diagram shown in FIG. 11 and on the timing charts shown in FIGS. 13 and 15 are respectively replaced by the vertical scanning, the reading-out pulses, the line synchronizing signals, the side operation results C and D, and the line reading-out pulses.

Next, control of the image data and the operation of the image signal will be described below. The image data is double buffering controlled by the line buffers 125 and 126, and is thereby delayed by 1 line. The delayed image data is input to the D flip-flop 129. The data output from the D flip-flop 129 is delayed by 1 pixel by the D flip-flop 131. The image signal is also directly input to the D flip-flop 130, and then to the D flip-flop 131 so as to delay 1 pixel.

The output of the image data from the image output device and the processing executed by the fractional pixel density conversion unit 5 are synchronized by the line reading-out pulses and the reading-out clocks which are output from the fractional pixel density converting unit 5 to the image output device.

Figure 16:
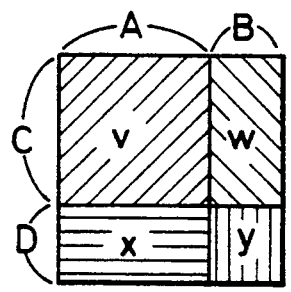
FIG. 16 shows reference pixels obtained by the approximation in the projecting process.

Thus, $2 \times 2 = 4$ pixels are referred to, as shown in FIG. 16, the areas of $A \times C$, $B \times C$, $A \times D$ and $B \times D$ are obtained by respectively multiplying the side operation results A and B in the horizontal scanning direction by the side operation results C and D in the vertical scanning direction. After the areas have been multiplied by the image data v, w, x and y corresponding to the areas, the results of the multiplication are added to each other to obtain the tone level of a converted pixel. Operation of all the bits in the 9-bit side data produces 17-bit data. The reason why 18-bit data is not produced is that the maximum value of the 9-bit side data is 100 Hex. As the image signal to be output, a required number of upper bits in the obtained 17 bits are employed.

As stated above, in the case of reduction in the number of pixels at a conversion factor ranging from ⅓ to 1, 3 original pixels are laid on one side of 1 converted pixel. This means that 9 original pixels are laid on 1 converted pixel at a maximum if the same conversion factor is used for both the horizontal and vertical scanning directions. Also, in the case of a conversion factor which is less than ⅓, a further increased number of pixels may be laid. Operation conducted on all of these pixels increases the size of the hardware.

Preferred Example

Figure 17:
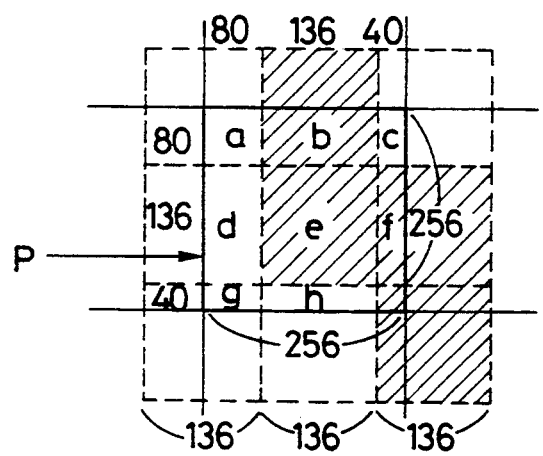
FIG. 17 shows how original pixels correspond to converted pixels in the horizontal and vertical scanning directions when the number of pixels is to be decreased at a magnification of 136/256.

Hence, in this embodiment, the number of pixels to be referred to is limited to 4 pixels, 2 pixels in the horizontal scanning direction and 2 pixels in the vertical scanning direction, and in a case where the number of pixels to be referred to exceeds 4 pixels, approximation is performed. FIG. 17 shows an example of correspondence of the original pixels to the converted pixels when the number of pixels is reduced at a ratio of 136/256 in both the horizontal and vertical scanning directions. 9 original pixels are laid on the converted pixel P. The portions of these 9 pixels laid on the converted pixel are represented by a, b, c, d, e, f, g, h and i, respectively. Let the areas of the portions a to i be Sa to Si, and the tone of these portions be Ia to Ii. I assumes a logical "1" level when the tone is black and a logical "0" level when the tone is white. In this approximation method, the tone of the portion c is approximated to that of the portion b, the tone of the portion g is approximated to that of the portion d, and the tone of the portions f, h and i is approximated to that of the portion e. In this method, the tone Ip for the pixel P is obtained by the following equation:

$$\begin{aligned} I_p &= \{Sa \cdot Ia + (Sb + Sc) \cdot Ib + (Sd + Sg) \cdot Id + \\ &\quad (Se + Sf + Sh + Si) \cdot Ie\}/(256 \cdot 256) \\ &= \{(136 + 40) \cdot 80 + (136 + 40) \cdot (136 + 40)\}/ \\ &\quad (256 \cdot 256) \\ &= 0.6875 \end{aligned}$$

In the case of increase in the number of pixels, approximation is not necessary because the number of original pixels which are laid on 1 converted pixel is 4 or less at any conversion factor.

The length of one side of a converted pixel is not limited to 256 but any arbitrary value is employed. However, the length of the side which is $2^n$ is preferable because the divisions in the tone operation can be structured by the shifting processes easily in terms of hardware, thereby reducing the size of the hardware and increasing the processing speed. Furthermore, in this embodiment, approximation is conducted on the reference pixels located at certain positions. However, two pixels whose portion which is laid on the converted pixel is the largest and second largest may be taken out as the reference pixels. Furthermore, the number of pixels to be referred to is not limited to $2 \times 2 = 4$. It is determined from the viewpoints of the reproductivity of an reproduced image and the size of the hardware and the processing speed.

Conversion by the Linear Interpolation Method

Principle

Figure 20:
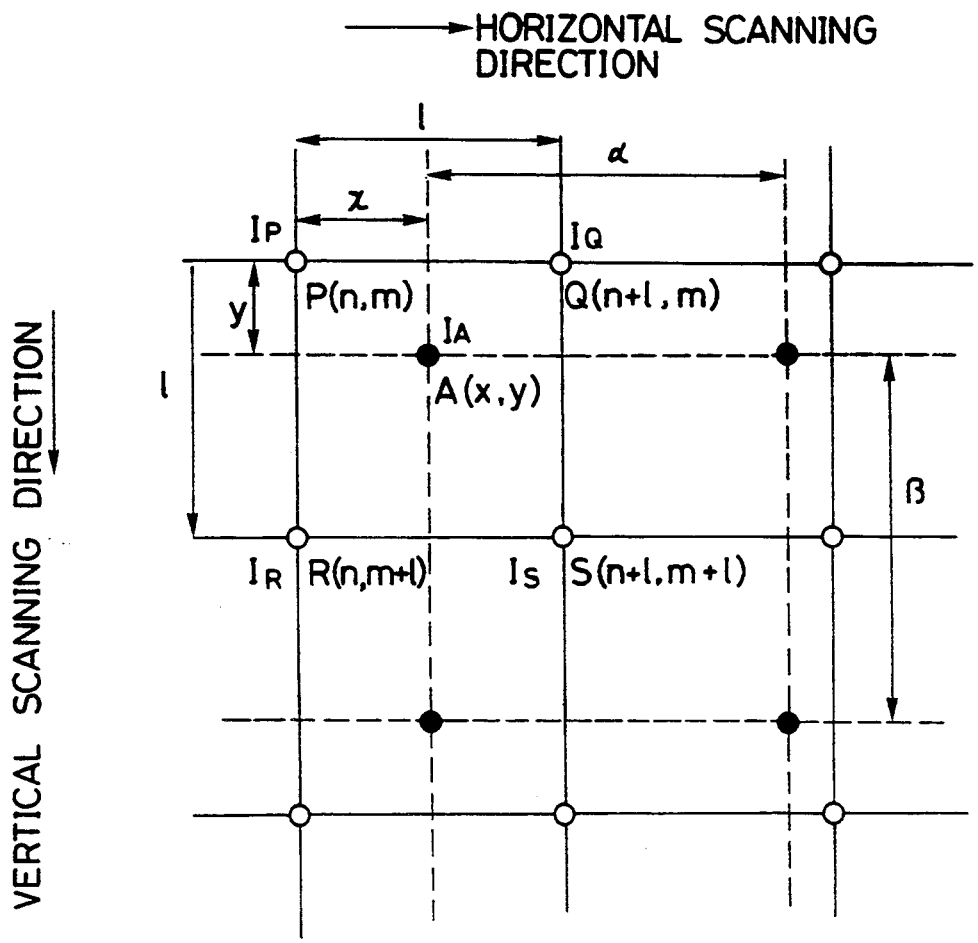
FIG. 20 illustrates projection of converted pixels onto original pixels.

In this linear interpolation method, the tone of the converted pixel A is determined by the following equation (2) from the tones P, Q, R and S of the original 4 pixels located in the vicinity of a converted pixel which is projected onto the original image, as shown in FIG. 20, and a coordinate (x, y) of the converted pixel A within the original pixel lattice relative to the adjacent original pixel.

$$I_A = (1-X) \times (1-Y) \times I_P + X \times (1-Y) \times I_Q + (1-X) \times Y \times I_R + X \times Y \times I_S \quad (2)$$

$I_N$: The tone of pixel n

In a case where the input image is a binary image, $I_A$ takes a value ranging from 0 to 1. $I_A$ is binarized to obtain the output converted pixel.

Basic Structure

Figure 19:
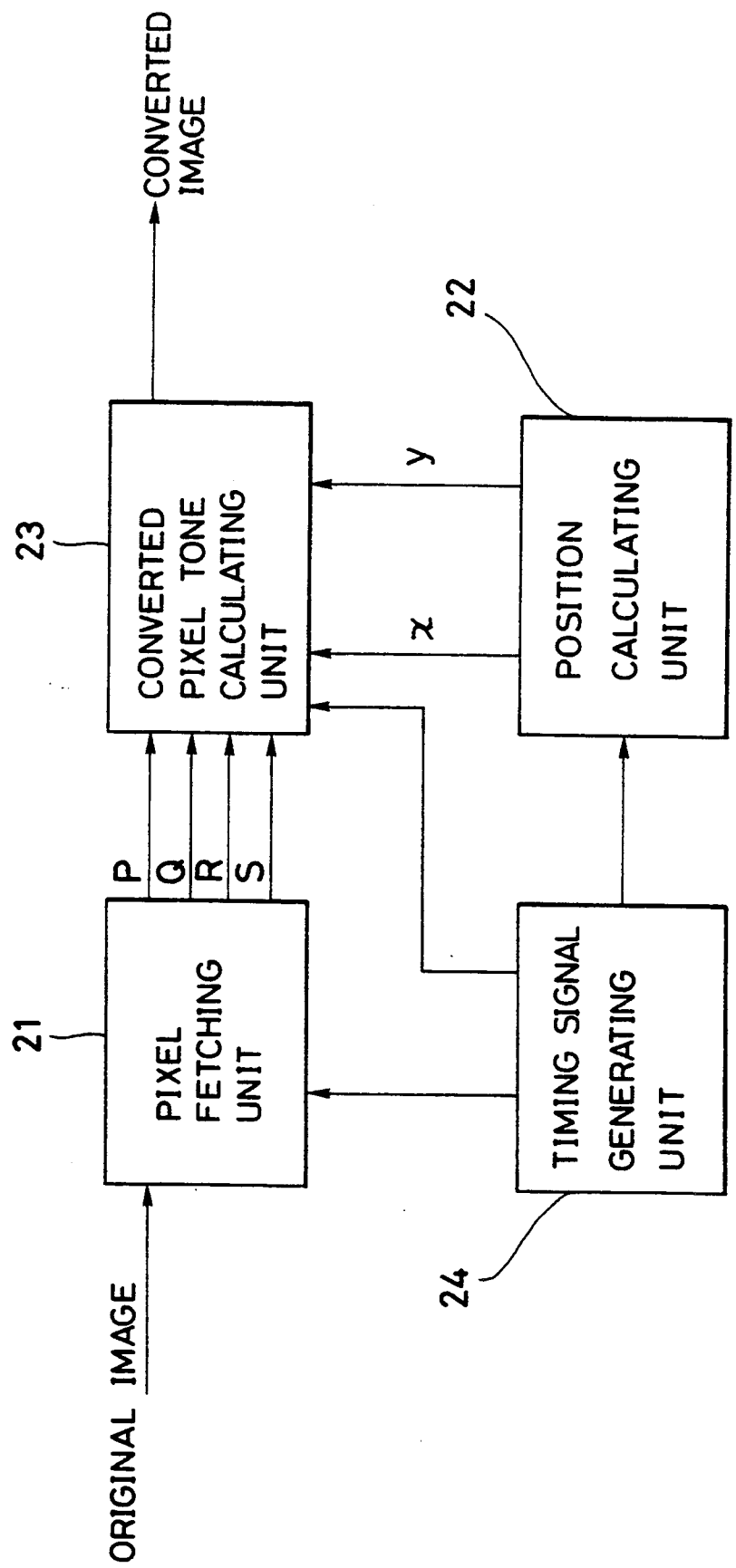
FIG. 19 is a block diagram showing the configuration of a basic pixel density converting unit which performs the linear interpolation process.

FIG. 19 shows an example of the structure of a converting unit which employs the linear interpolation method. A pixel fetching unit 21 fetches the original pixels P, Q, R and S located in the vicinity of an objective point on a projection surface. A position calculating unit 22 operates the relative coordinate (x, y) on the projection surface, and a converted pixel tone calculating unit 23 performs the operation expressed by Equation (2). A timing signal generating unit 24 sends a timing signal to the respective components.

However, the operation expressed by Equation (2) requires multipliers, and this prevents high-speed conversion of the pixel density on a real-time basis. In other words, the processings executed in the converted pixel tone calculating unit 23 require a long period of time.

Preferred Example

Figure 18:
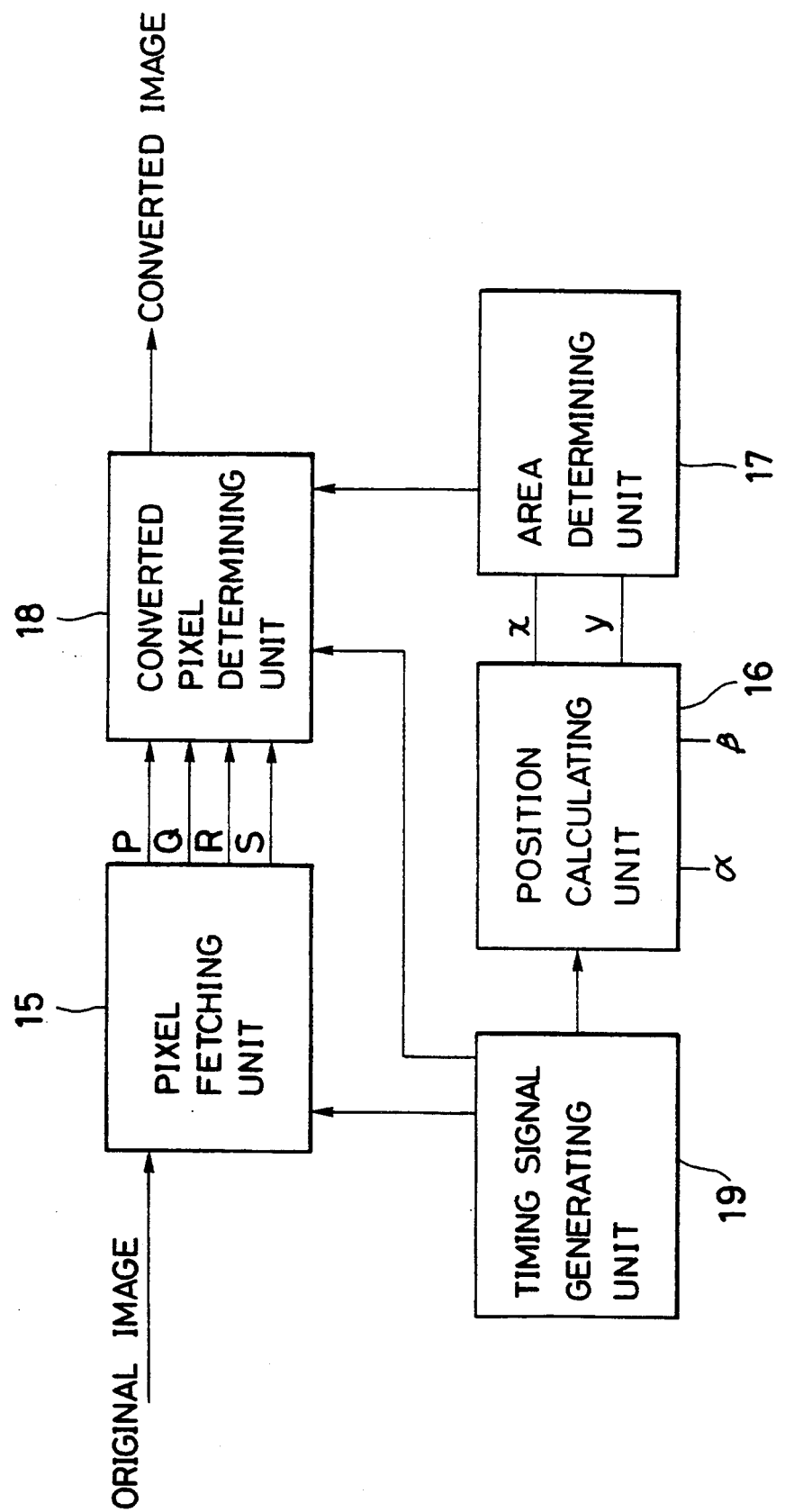
FIG. 18 is a block diagram showing the configuration of a pixel density converting unit which performs the linear interpolation process.

FIG. 18 is a block diagram of a pixel density converting unit. A pixel fetching unit 15 fetches the original pixels P, Q, R and S which are shown in FIG. 20 and which are located in the vicinity of a converted pixel projected onto a projection surface. A position calculating unit 16 calculates the position (x, y) of the converted pixel on the projecting surface relative to the adjacent original pixel. An area determining unit 17 determines the area of the projected position of the converted pixel corresponding to the relative position (x, Y).

Assuming that the converted pixel is present in an area defined by x<0.5 and y<0.5, the tone of the converted pixel is determined in the manner shown in Table 1 in correspondence to the tones ($I_P$, $I_Q$, $I_R$, $I_S$) of the adjacent original pixels P, O, R and S Since $I_A'' = 1 - I_A'$, if the original pixel is projected within this area, the conversion output is determined by the following logical expressions which represent the two areas:

$x + y - xy \geq \frac{1}{2}$:

Conversion output $= I_P * (I_Q + I_R + I_S) + I_Q * I_R * I_S$ $x + y - xy < \frac{1}{2}$:

Conversion output $= I_P$ where * denotes a logical AND, and + denotes a logical OR.

TABLE 1

| $I_P I_Q I_R I_S$ | $I_A$ Equation (1) | Conversion output* |
|---|---|---|
| 0 0 0 0 | 0 | 0 |
| 0 0 0 1 | x y | 0 |
| 0 0 1 0 | y − x y | 0 |
| 0 0 1 1 | y | 0 |
| 0 1 0 0 | x − x y | 0 |
| 0 1 0 1 | x | 0 |
| 0 1 1 0 | x + y − 2 x y | 0 |
| 0 1 1 1 | x + y − x y | $I'_A$ |
| 1 0 0 0 | 1 − x − y + x y | $I''_A$ |
| 1 0 0 1 | 1 − x − y + 2 x y | 1 |
| 1 0 1 0 | 1 − x | 1 |
| 1 0 1 1 | 1 − x + x y | 1 |
| 1 1 0 0 | 1 − y | 1 |
| 1 1 0 1 | 1 − y + x y | 1 |
| 1 1 1 0 | 1 − x y | 1 |
| 1 1 1 1 | 1 | 1 |

*The case of x < 0.5 and < 0.5

TABLE 2

| Area | Conversion output |
|---|---|
| ① | $I_P$ |
| ② | $I_P * (I_O + I_R + I_S) + I_Q * I_R * I_S$ |
| ③ | $I_Q$ |
| ④ | $I_Q * (I_P + I_R + I_S) + I_P * I_R * I_S$ |
| ⑤ | $I_R$ |
| ⑥ | $I_R * (I_P + I_Q + I_S) + I_P * I_Q * I_S$ |
| ⑦ | $I_S$ |

TABLE 2-continued

| Area | Conversion output |
|---|---|
| ⑧ | $I_S * (I_P + I_Q + I_R) + I_P * I_Q * I_R$ |

*logical AND
+: logical OR
(x > 0.5 y < 0.5)
(x > 0.5 y > 0.5)
(x < 0.5 y > 0.5)

Figure 21:
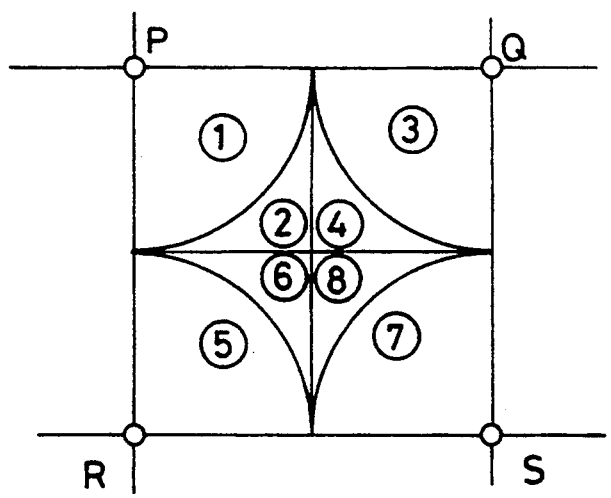
FIG. 21 illustrates areas of the converted pixel on a projection surface.
Figure 22:
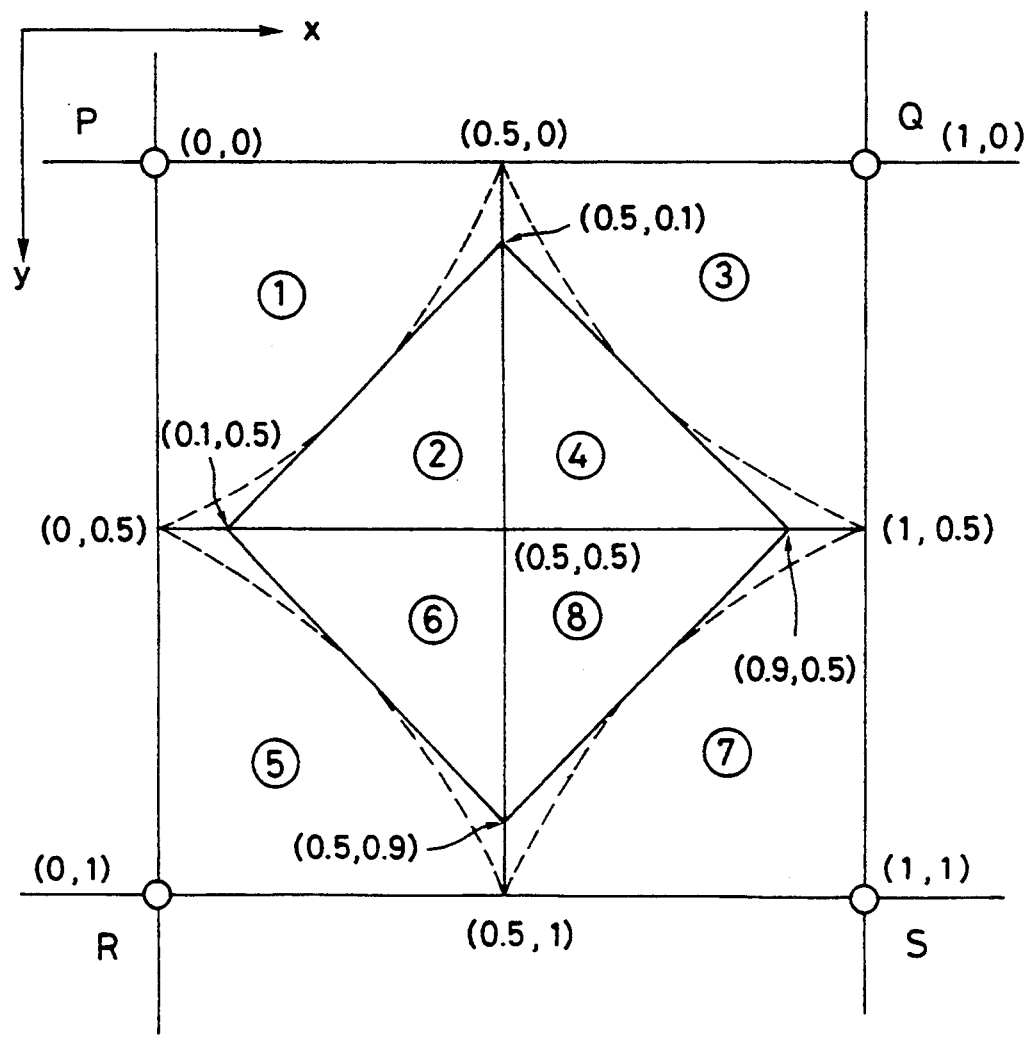
FIG. 22 illustrates the areas in detail.

The same thing is applied to the above respective areas, and this results in division of the area of the converted pixel into 8 portions, as shown in FIG. 21. The conversion output is determined by the logical expression selected from those listed in Table 2 using one of these area values. More specifically, the conversion output is determined only by the logical operation from the area onto which the converted pixel is projected. In this embodiment, the boundary curves of these areas are approximated by tangents shown in. FIG. 22 so as to achieve increase in the speed of the operations. The coordinates shown in FIG. 22 are expressed by significant figures of one figure.

Figure 23:
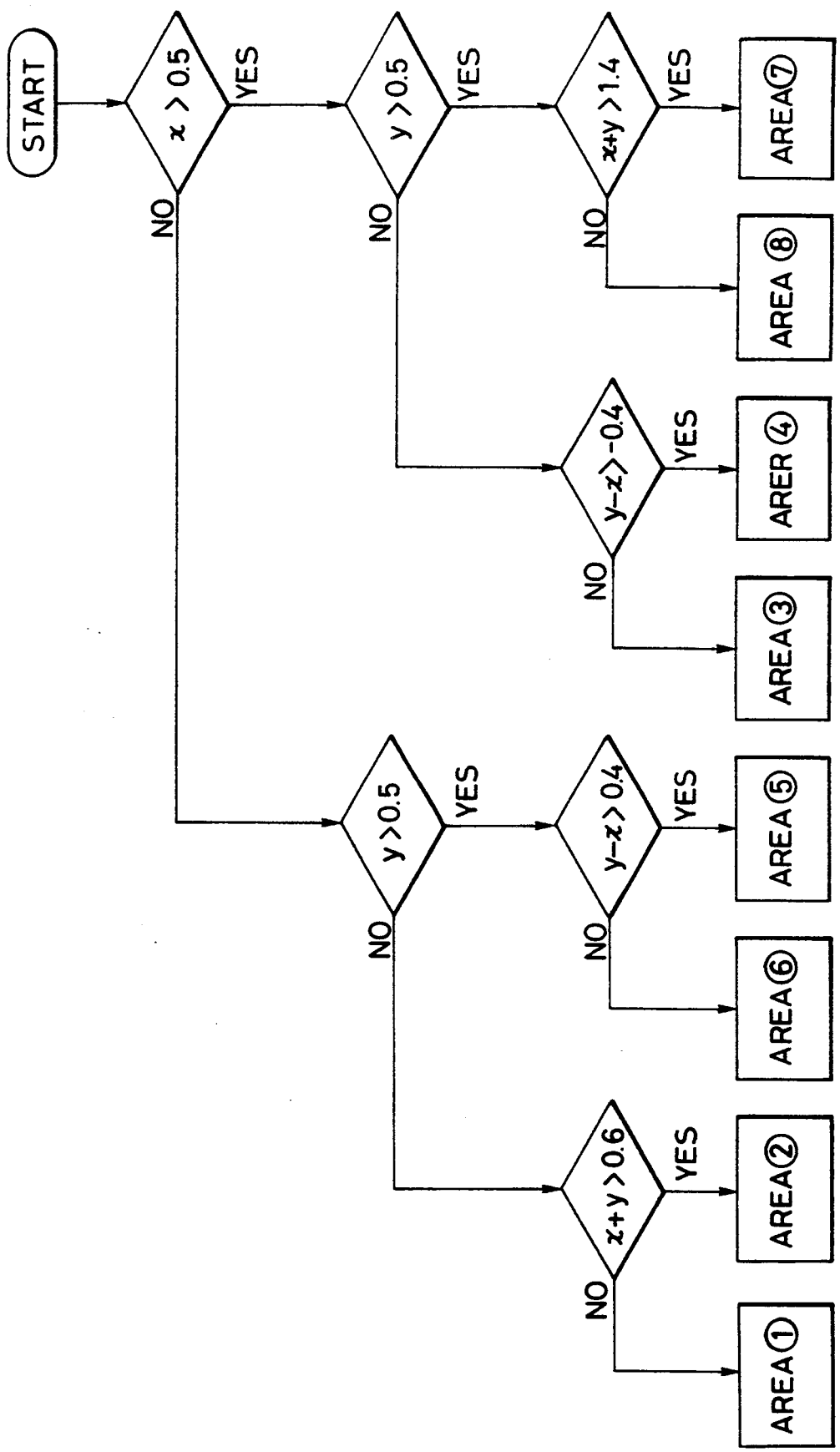
FIG. 23 is a flowchart for the algorithm of the area determination process.

FIG. 23 is a flowchart of the-algorithm for the area determining unit 17, and is a graphic presentation of Table 2. The processings in the algorithm shown in FIG. 23 can be constructed only by the adders and comparators, and this enables the processing speed to be increased.

Next, one of the logical expressions shown in Table 2 is selected in the converted pixel determining unit 18 using the determination information obtained by the area determining unit 17, and the value of the selected logical expression is output as the converted output. The operations conducted in the pixel determining unit 18 can also be constructed only by the logical operations, and this allows the processing speed to be increased and the circuit configuration to be simplified.

As stated above, in this example of the pixel density converting unit, complicated operations such as multiplications are not necessary, and high-speed conversion of the pixel density of binary images is thereby enabled.

The above-described example employs the linear interpolation as the interpolation method. However, the present invention is not limited to this but other interpolation methods such as the distance inverse proportion method can also be adopted. If the distance inverse proportion method is employed, the converted pixel tone is calculated by the following equation (3) in place of Equation (2).

$$\frac{(1/PA)^2 \cdot I_P + (1/RA)^2 \cdot I_R + (1/QA)^2 \cdot I_Q + (1/SA)^2 \cdot I_S}{(1/PA)^2 + (1/RA)^2 + (1/QA)^2 + (1/SA)^2} \quad (3)$$

PA, RA, QA, SA: The distance between the objective pixel and the adjacent original pixels.

The converted pixel tone calculating unit 23 is constructed such that it realizes the operation expressed by Equation (3).

Example of the Binarizing Unit for Half-tone Images

Binarization by the Error Diffusion Method

The error diffusion process will be described below. In a case where the projection method or the linear interpolation method is applied to the images which have been subjected to the pseudo half-tone process such as the dither method, simple binarization (binarization by a predetermined threshold level) of the obtained images increases quantization errors, resulting in emphasis of moire and deterioration in the image quality. In this embodiment, the error diffusion method is accordingly employed for binarization in order to prevent deterioration in the image quality caused by the quantizing errors.

FIG. 24 is a block diagram showing the structure employed for the error diffusion process. While the pixel tone or the brightness $I_A$ which is obtained by the projection process is passing through 1-pixel delaying elements 51a to 51d, a delaying element 53 for delaying pixels by a number obtained by deducting 3 pixels from that corresponding to 1 line, and adders 52a to 52d, binarizing errors $e_1$ to $e_4$ previously generated in the surrounding pixels are added to $I_A$. The resulting tone or brightness containing the binarizing errors for the surrounding pixels is binarized by a binarizing unit 54 using a certain threshold value so as to obtain the tone or brightness of an objective pixel.

Next, the quantizing error generated by this binarization is obtained by a binarizing error calculating unit 55, and the obtained error is distributed as errors $e_1$ to $e_4$ by an error distributing unit 56. The binarizing error calculating unit 56 calculates a binarizing error by the following equation.

$$E = \begin{cases} I_D - 1 \ (I_D > T) \\ I_D \ (I_D \leq T) \end{cases} \quad (4)$$

where E is the binarizing error, $I_D$ is the tone input to the binarizing unit, T is the threshold value, "1" or "0" is the binarized output.

The error distributing unit 56 operates errors $e_1$ to $e_4$ as follows:

$$e_1 = \frac{1}{6} E, \ e_2 = \frac{2}{6} E, \ e_3 = \frac{1}{6} E, \ e_4 = \frac{2}{6} E$$

$e_1$ to $e_4$ are distributed to the pixels surrounding the objective pixel in the manner shown in FIG. 25.

In the example shown in FIGS. 24 and 25, the errors are diffused to the surrounding 4 pixels. However, the present invention is not limited to this but the surrounding pixels to which the errors are distributed can be determined depending on the image quality and the scale of a circuit employed. If it is desired to excellently eliminate moire, however, 100% of the binarizing errors must be distributed to the surrounding pixels. In other words, $e_n$ is determined such that it satisfies $\Sigma e_n = E$ (n: the number of surrounding pixels to which the errors are distributed).

Binarization by the Average Error Minimizing Method

The average error minimization method is also employed for binarization.

FIG. 26 is a block diagram showing the configuration of a tone keeping binarizing unit which employs the average error minimization method. An error buffer memory 60 contains the previously generated error data $\epsilon_{ij}$ between the input data $X_{ij}$ and the output data $Y_{ij}$. The error data $\epsilon_{ij}$ is multiplied by a weighting factor $a_{ij}$ designated by a weighting generating unit 61, and the obtained value is added by an adder 62 to the tone of the converted pixel which is obtained by the interpolation method. These are expressed as follows:

$$X_{ij}' = X_{ij} + \frac{\sum\limits_{k,l} a_{kl} \cdot \epsilon_{i+k\,j+l}}{\sum\limits_{k,l} a_{kl}}$$

An example of the weighting factor is shown in FIG. 27.

Next, the corrected data $X_{ij}'$ is compared with the threshold value by a binarizing circuit 63 so as to obtain output data $Y_{ij}$. $Y_{ji}$ represents binary data, such as Ymax or Ymin (e.g., 1 or 0).

An operating unit 64 operates a difference $\epsilon_{ij}$ between the corrected data $X_{ij}'$ and the output data $Y_{ij}$, and the comparison results are stored in the error buffer memory 60 at a corresponding pixel position. A sequence of these operations are repetitively conducted to perform binarization by the average error minimization method.

Example of the Binarizing Unit for Contrast Images

Binarization by Means of a Fixed Threshold Level

The simple binarizing unit 7 is adapted to binarize the tone of the converted pixel obtained by the projection method or the interpolation method using a fixed threshold value.

Selection in the Selecting Unit and Example of the Image Determining Unit

Selection by Means of the Mode Change-over Switch

The flow of a signal is changed over by means of a mode change-over switch in accordance with the property of the image output from the image output device.

When the image output from the image output device is that which has been subjected to the pseudo half-tone process such as the dither method or the error diffusion method, the selecting unit 4 selects the signal output from the pixel density converting unit 3 for half-tone images. When the image output from the image output device is a simple binarized image, the selecting unit 4 selects the signal output from the pixel density converting unit 2 for contrast images. This is so because, when the number of pixels of a half-tone processed image is to be decreased by a factor of an integer, changes in the ratio of the number of white pixels to that of black pixels in a certain area are less in the image obtained by the thinning out method than in the image obtained by the majority method or the averaging method, as shown in FIGS. 9A and 9B, resulting in storage of the tone. Also, when the number of pixels of a simply binarized image is to be decreased by a factor of an integer, since an original document of the simply binarized image contains characters or figures, disappearance or breaking of thin lines are less in the image obtained by the majority process or the averaging process than in the image obtained by the thinning out process.

The selecting unit 8 selects the signal output from the binarizing unit 6 for half-tone images when the image output from the image output device is that obtained by the pseudo half-tone process and the signal output from the binarizing unit 7 for contrast images when the image output from the image output device is that obtained by the simple binarization. If simple binarization is conducted on the half-tone image whose pixel density has been converted at a ratio which is not an integer but a fraction by the projection or linear interpolation process, moire is generated. Therefore, the half-tone image is subjected to the error diffusion process or the average error minimization process so as to prevent generation of moire. If the error diffusion process or the average error minimization process is conducted on the simply binarized image whose pixel density has been converted by a factor which is a fraction by the projection method or the linear interpolation method, protrusions may be generated in the edge portions of characters or the edge portions may be blurred. Simple binarization is therefore performed on such a simply binarized image so as to prevent deterioration in the image quality of the characters.

Thus, the selecting units 4 and 8 are changed over depending on the property of the image to be processed. Change-over of the selecting units may be controlled from an operation panel (not shown) or by means of a control signal which is output from a central processing unit on the basis of the information on the characteristics of the images output from the image output device which are managed by the CPU. For example, the pseudo half-tone image and the simply binarized image may be separated from each other by a number of changing points or the structure of a pattern.

Selection by the Input of Area Data

Figure 28:
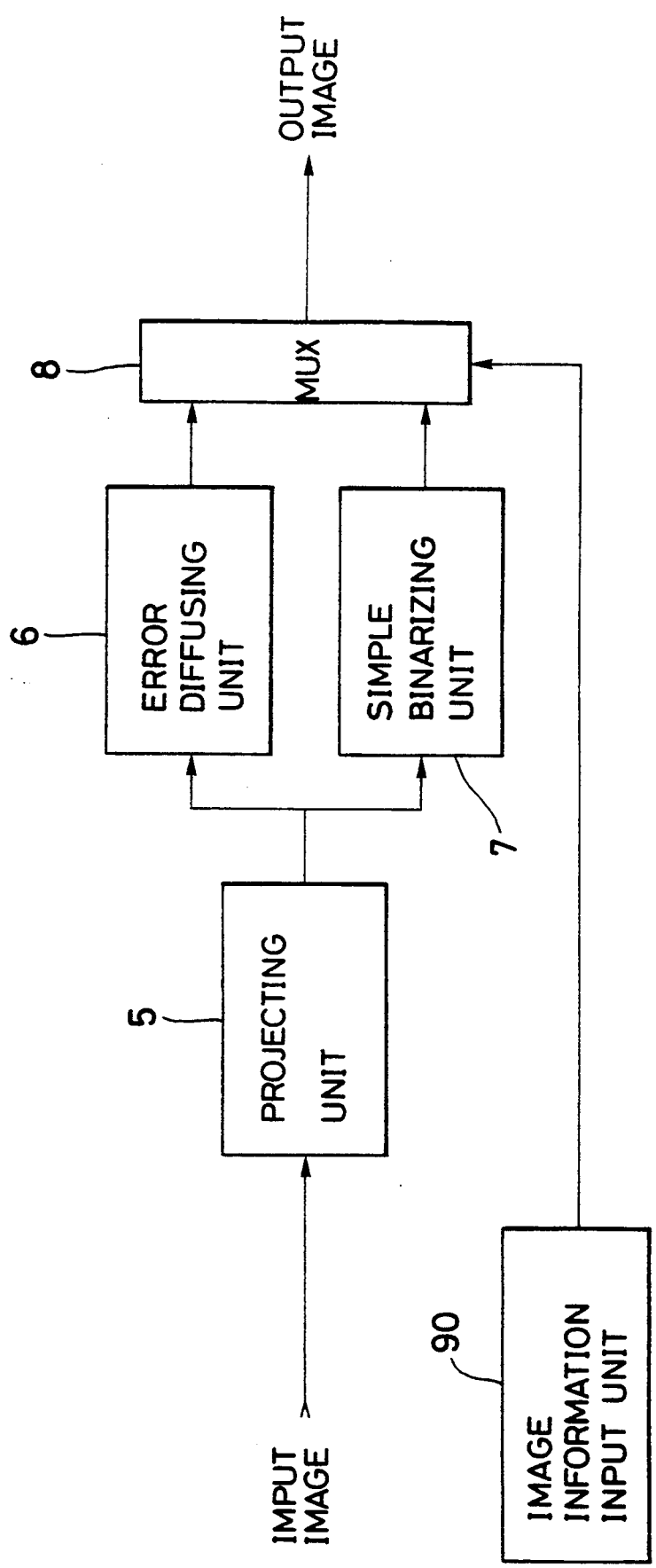
FIG. 28 is a block diagram showing the configuration which incorporates an image information input unit.

FIG. 28 is a block diagram showing the structure for changing over the selecting unit 8 on the basis of the information input from an image information inputting unit 90.

Figure 29:
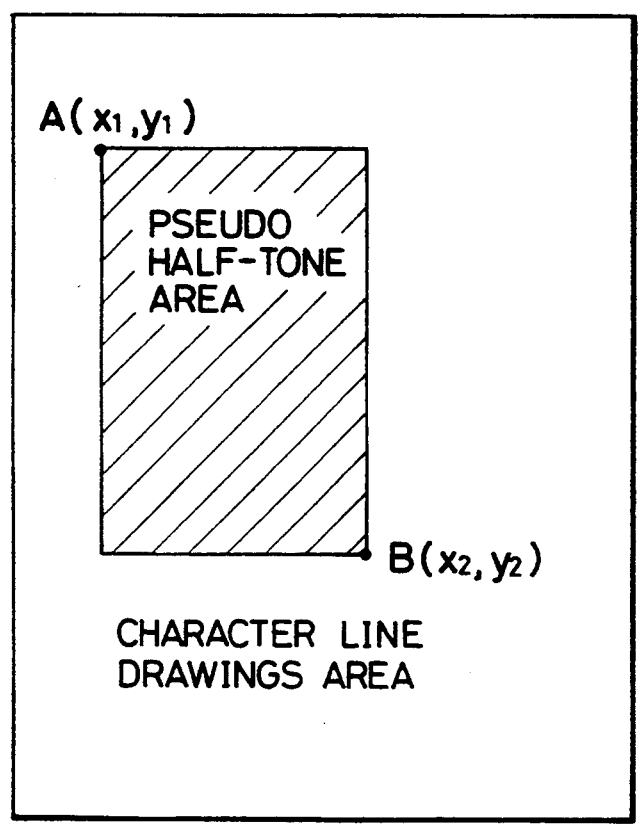
FIG. 29 shows an original document displayed on a CRT or the like in which pseudo half-tone area and character line drawing area are present in a mixed state.

The image information input unit 90 inputs the area information on one page and the coordinates therefor A (x1, y1), B (x2, y2) when an operator inputs them onto an image displayed by a CRT or the like, as shown in FIG. 29, from an input device such as a key board or a mouse, and thereby selectively separates one page, unlike the aforementioned mode change-over switch which determines the image area for each page and changes over the operation mode.

Figure 30:
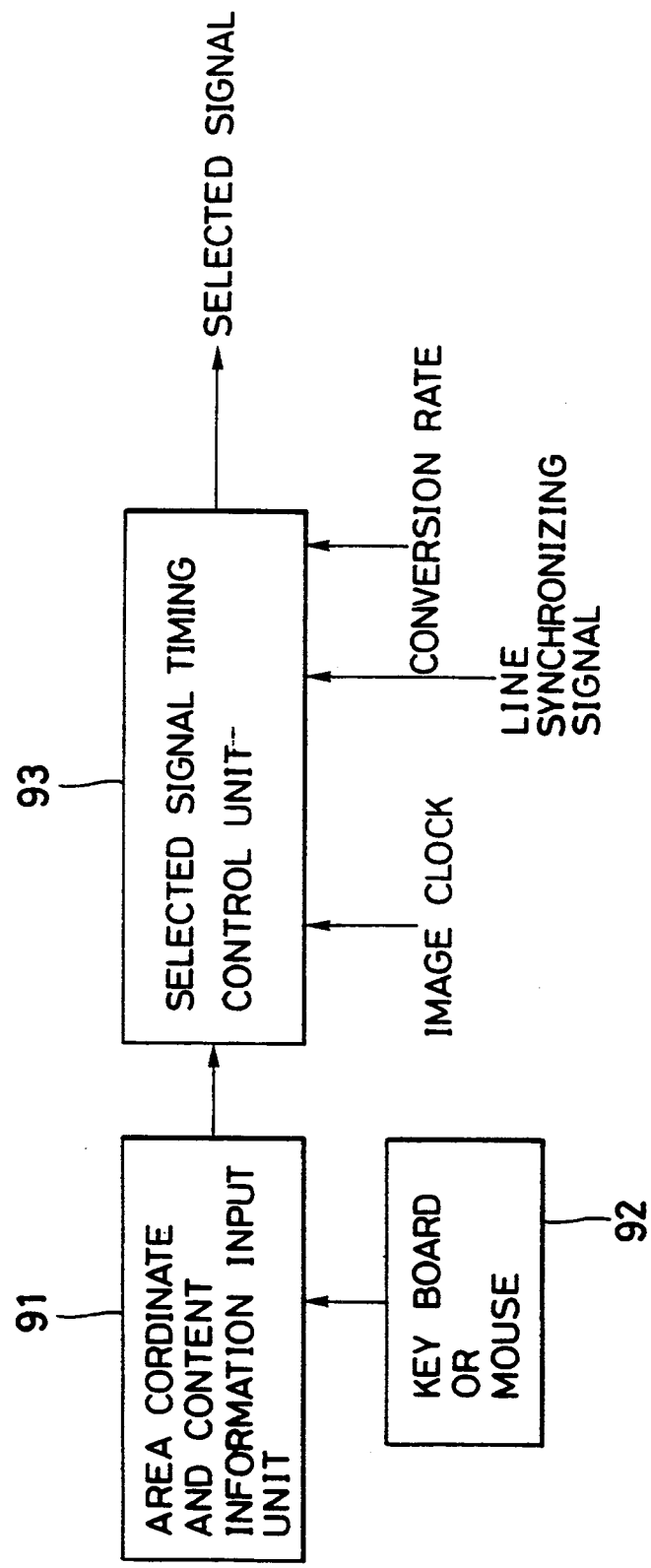
FIG. 30 shows the configuration of an image information input unit.
Figure 31:
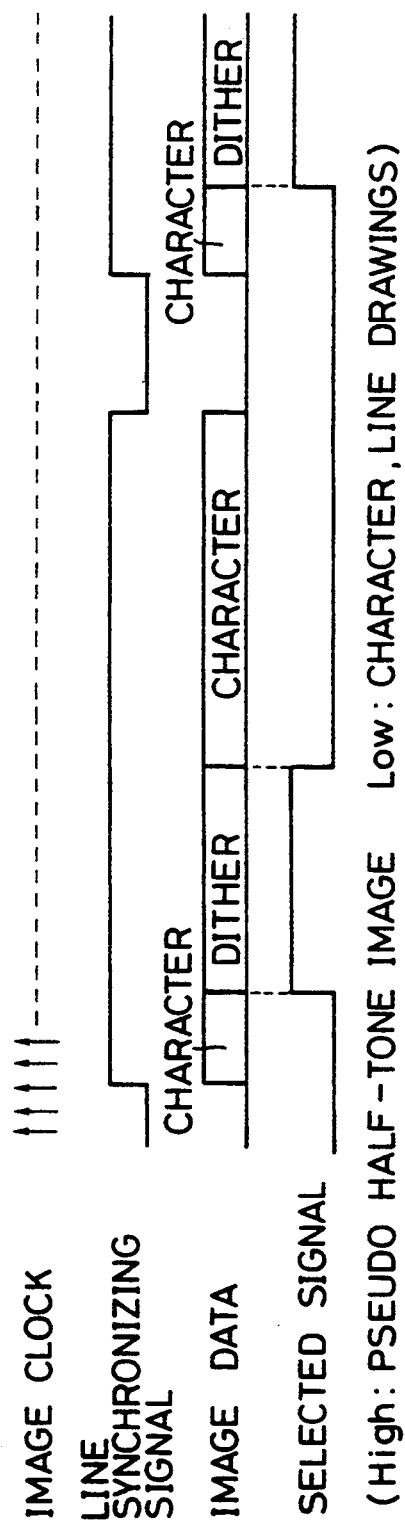
FIG. 31 is a timing chart of the operation of the image information input unit of FIG. 30.

FIG. 30 shows the configuration of the image information input unit 90, and FIG. 31 is a timing chart of the operation of the input unit 90. A selection signal timing control unit 93 generates a selection signal in synchronizm with the image clock and the line synchronizing signal from the coordinate information and the image information on an area defined by the coordinate information, which are input through an area coordinate and contents information input unit 91 from a keyboard or a mouse 92. The selection signal shown in FIG. 31 assumes a logical "high" level for pseudo half-tone images, and a logical "low" level for characters or line drawings.

Selection by Image Area Determination

Figure 32:
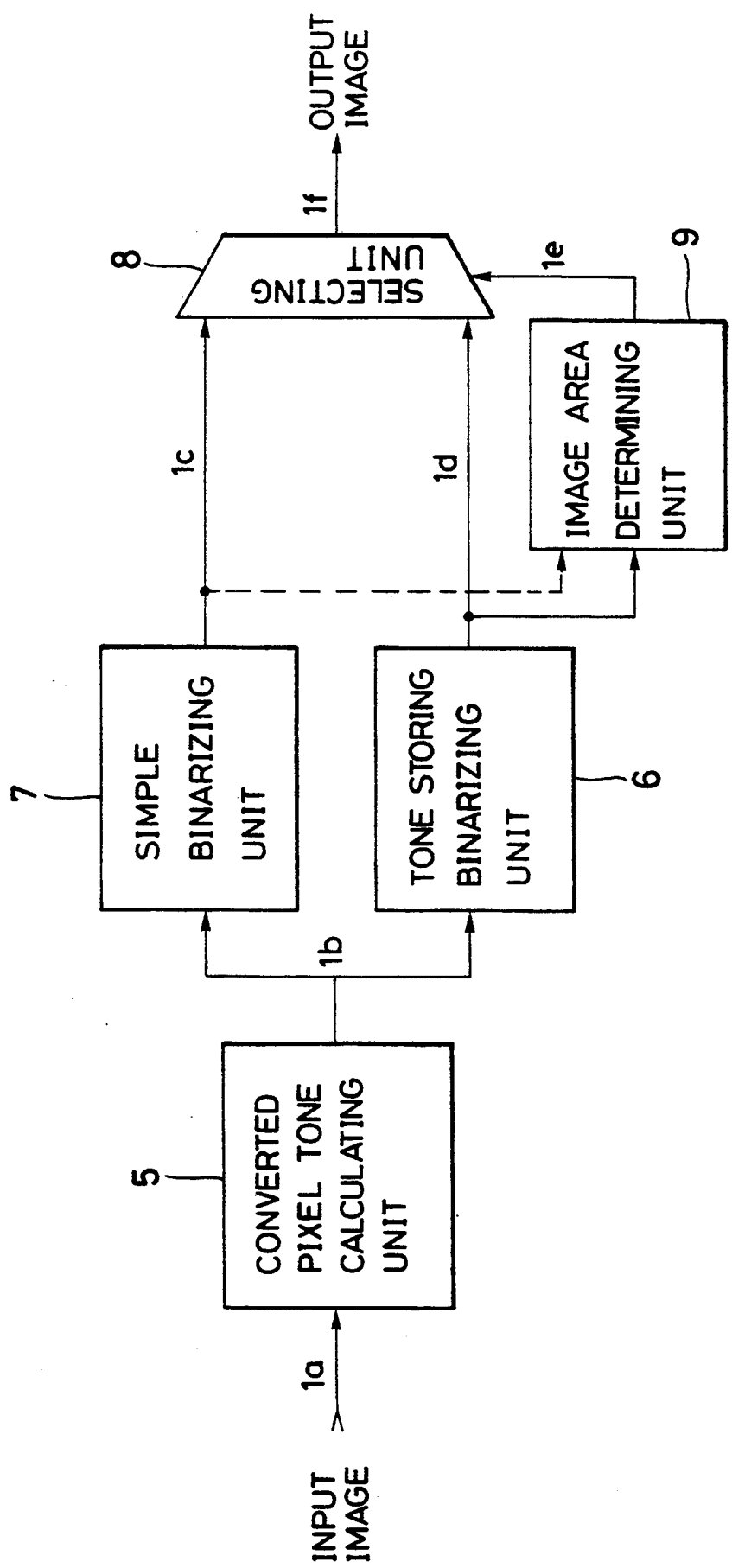
FIG. 32 is a block diagram showing the configuration which incorporates an image area determining unit.
Figure 33:
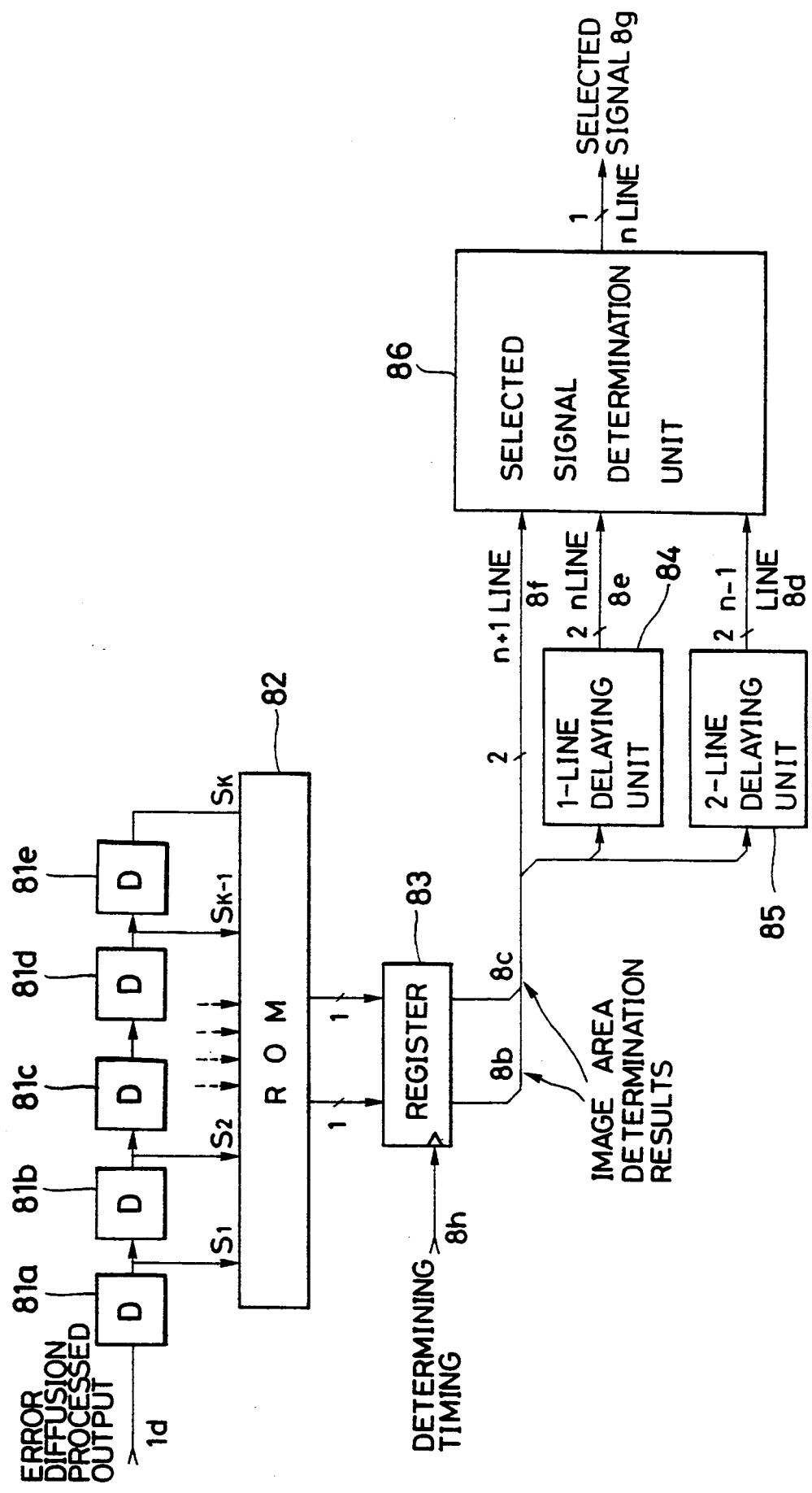
FIG. 33 shows an example of the image area determining unit.
Figure 36:
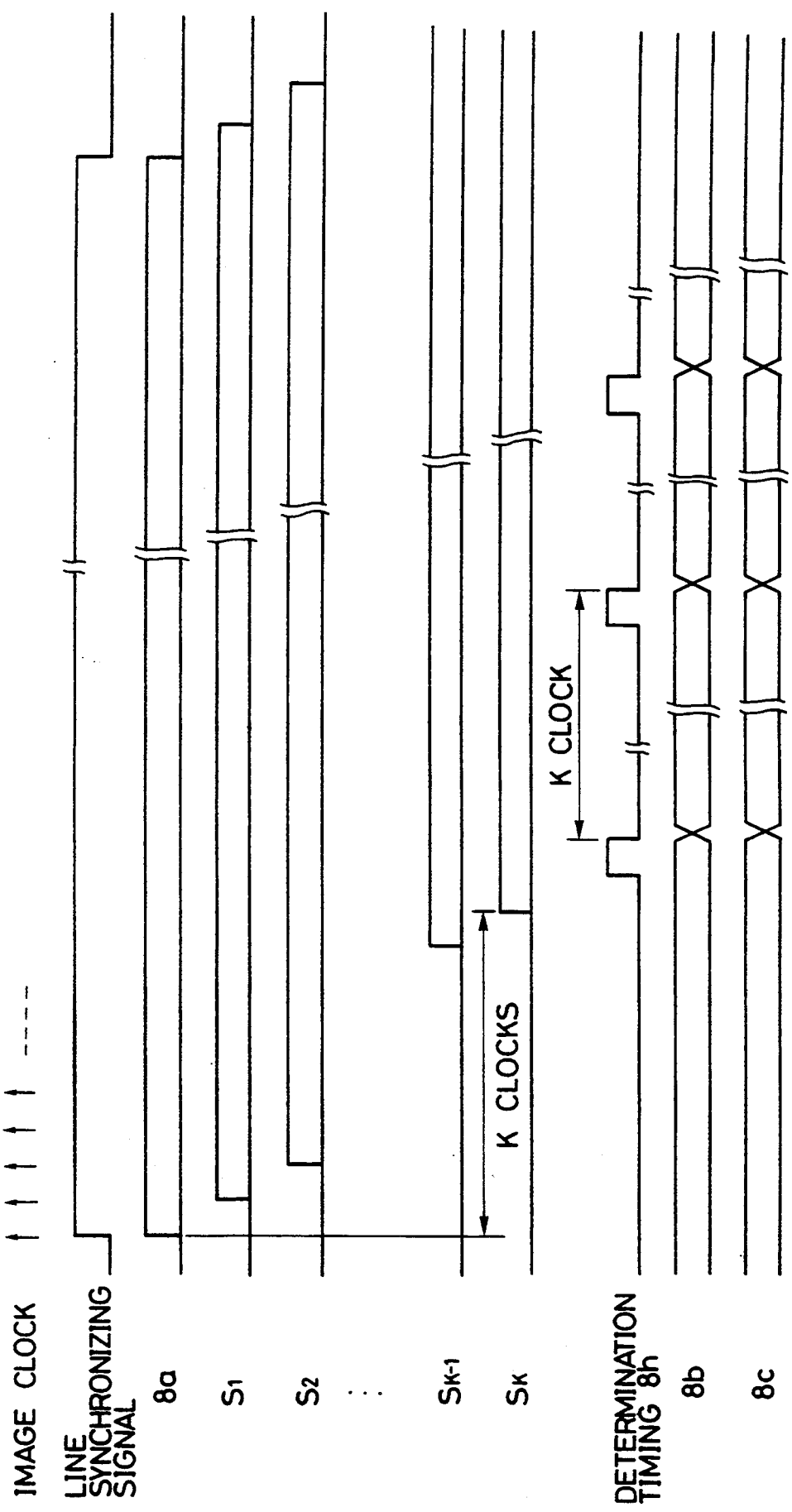
FIG. 36 is a timing chart of the determination.

Next, image area determination will be described in detail. FIG. 32 is a block diagram showing the structure which contains the image area determining unit 9, and FIG. 33 is a block diagram of the image area determining unit 9. Image data 1d which is data binarized by the error diffusion process or the average error minimization process is converted into K-bit parallel data by 1-pixel delaying elements (d flip-flops) 81a to 81e, and image area determination as to whether or not the image data 1d are characters, line drawings or pseudo half-tone images is then conducted on the K pixels which constitutes one block in the horizontal scanning direction (so as to obtain an image area determination result 8b) by referring to a ROM 82 which contains the input patterns and the determination results. Concurrently with this, color determination is also conducted on that block (to obtain a color determination result 8c). Color determination is to determine whether the color for the block is black or white by comparing the number of white pixels in the block with the number of black pixels. The value determined by an adequate evaluation equation, such as a number of changing points or the structure of a pattern, is set as the pattern for the image area determination. FIG. 36 is a timing chart for the determination of the image area and of the color.

Example of data in the ROM 82 is shown in FIG. 34. As shown in FIG. 34A, a basic block consists of 8 pixels in which bit 4 to 7 are addressable as upper addresses and bit 0 to 3 are addressable by lower addresses. The output from the ROM 82 is 2 bits in which bit 0 represents the tone determination result (black: 1, white: 0) and bit 1 represents the image area determination results (pseudo half-tone image: 1, characters, line drawings: 0). FIG. 35 shows an example of the data stored in the ROM 82 by means of which, when the number of black bits is equal to or greater than 5, the tone is determined as black while, when the number of black bits is less than 4 bits, the tone of the block is determined as white, and by means of which the image area is determined as characters or line drawings when the block contains consecutive two or more black bits or when no black bit is present in the block.

FIGS. 34B and 34C show examples of basic block data and of the determination results.

The thus-obtained image area and tone determination results 8b and 8c are supplied to a 1-line delaying element 84 which delays them by 1 line and to a 2-line delaying element 85 which delays them by 2 lines so as to expand the determination results for the basic block in the vertical scanning direction. A selection signal determining unit 86 determines a selection signal 8g from a determination result 8f, a determination result 8e output from the 1-line delaying element 84, and a determination result 8d output from the 2-line delaying element 85. The selection signal determining unit 86 determines a selection signal S for n line and m block by the following determination conditions.

| Selection signal | Condition |
| --- | --- |
| Characters line drawings S (m, n) = 0 | {C (m, n) = C (m, n − 1)} {D (m, n) = 0} . . . (5) or {C (m, n − 1) = C (m, n + 1)} {D (m, n − 1) = D (m, n + 1) = 0} (6) |
| Pseudo half-tone image S (m, n) = 1 | Other than the above-described cases | where

Figure 37:
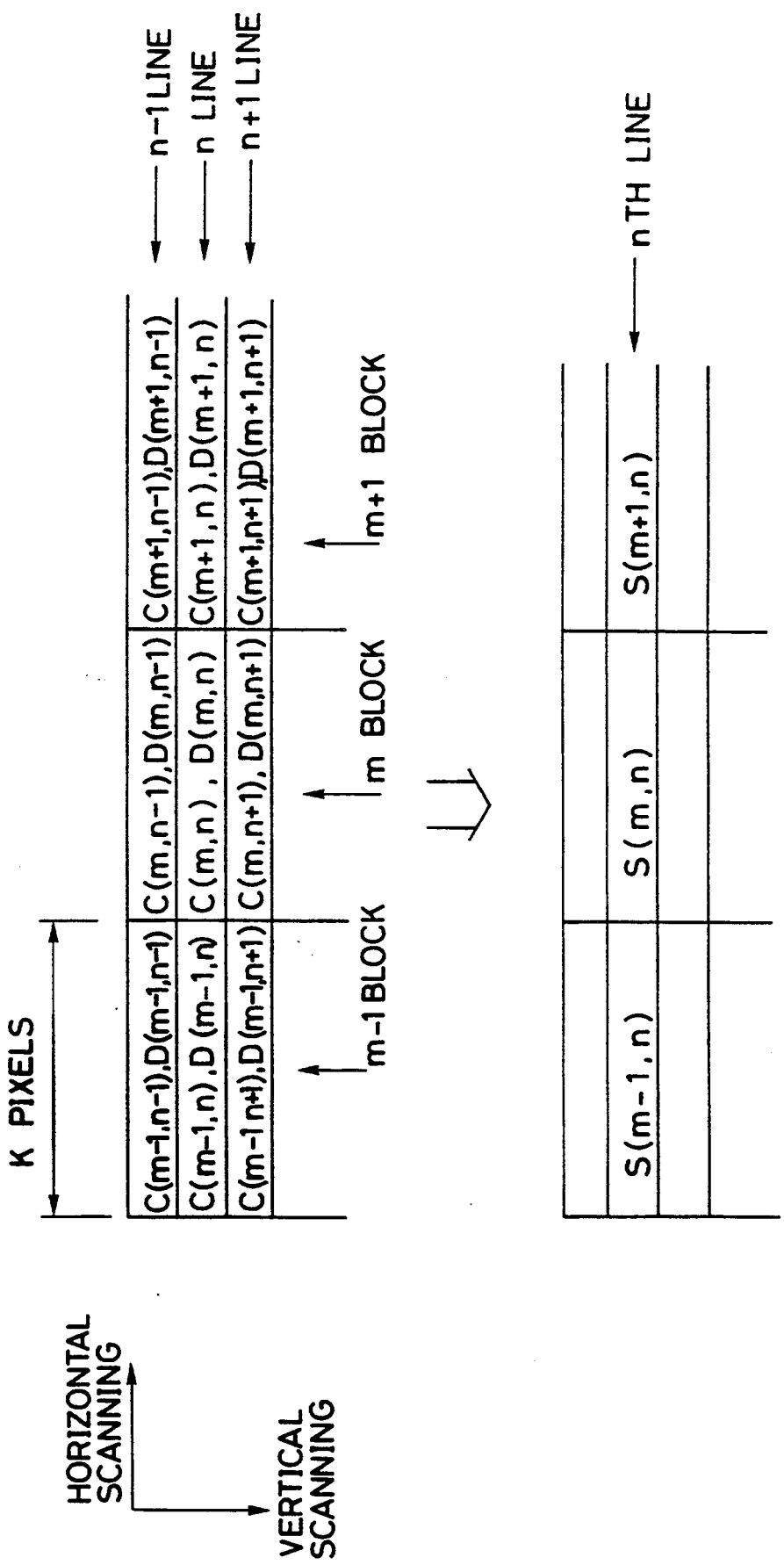
FIG. 37 shows the positional relation of a determination block on an image.
Figure 38:
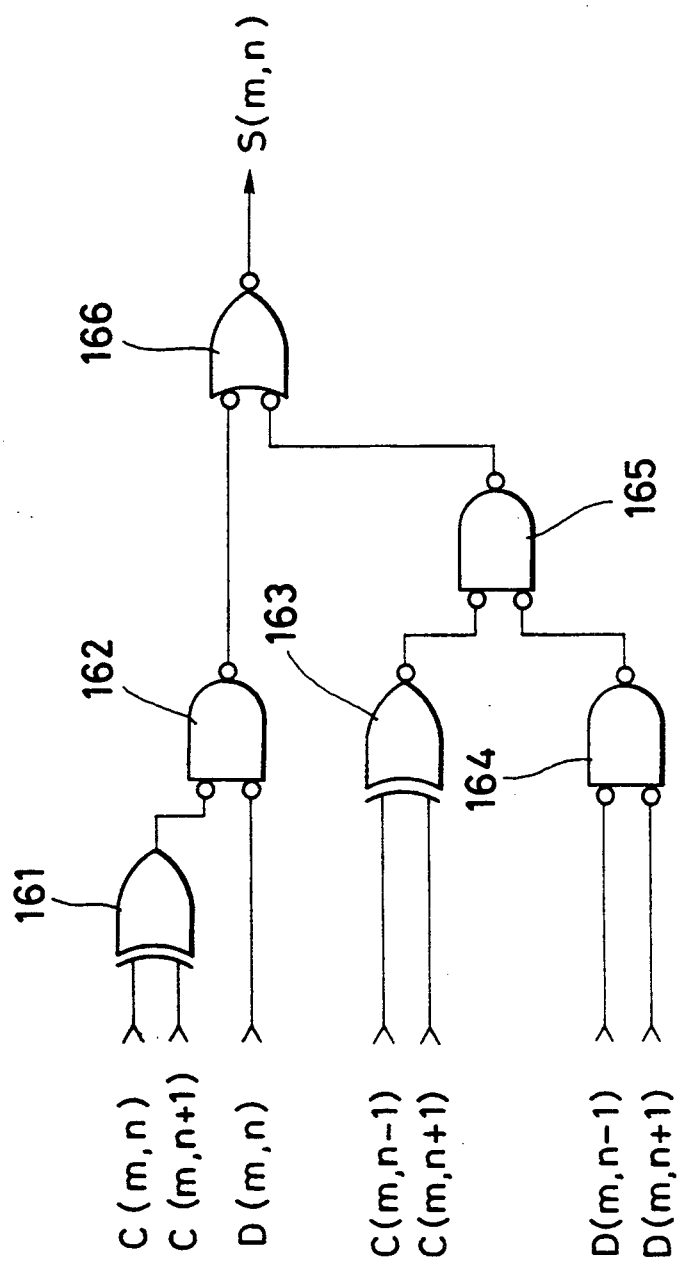
FIG. 38 shows an example of a selection signal determining unit.

C (m, n): The tone determination result for n line and m block C (m, n)=1: black C (m, n)=0: white D (m, n): The image area determination result for n line and m block D (m, n)=1: half-tone image D (m, n)=0: characters, line drawings FIG. 37 shows the positional relation between C(m, n), D(m, n) and S(m, n) on an image, and FIG. 38 shows the practical form of the aforementioned conditional equation.

Figure 39:
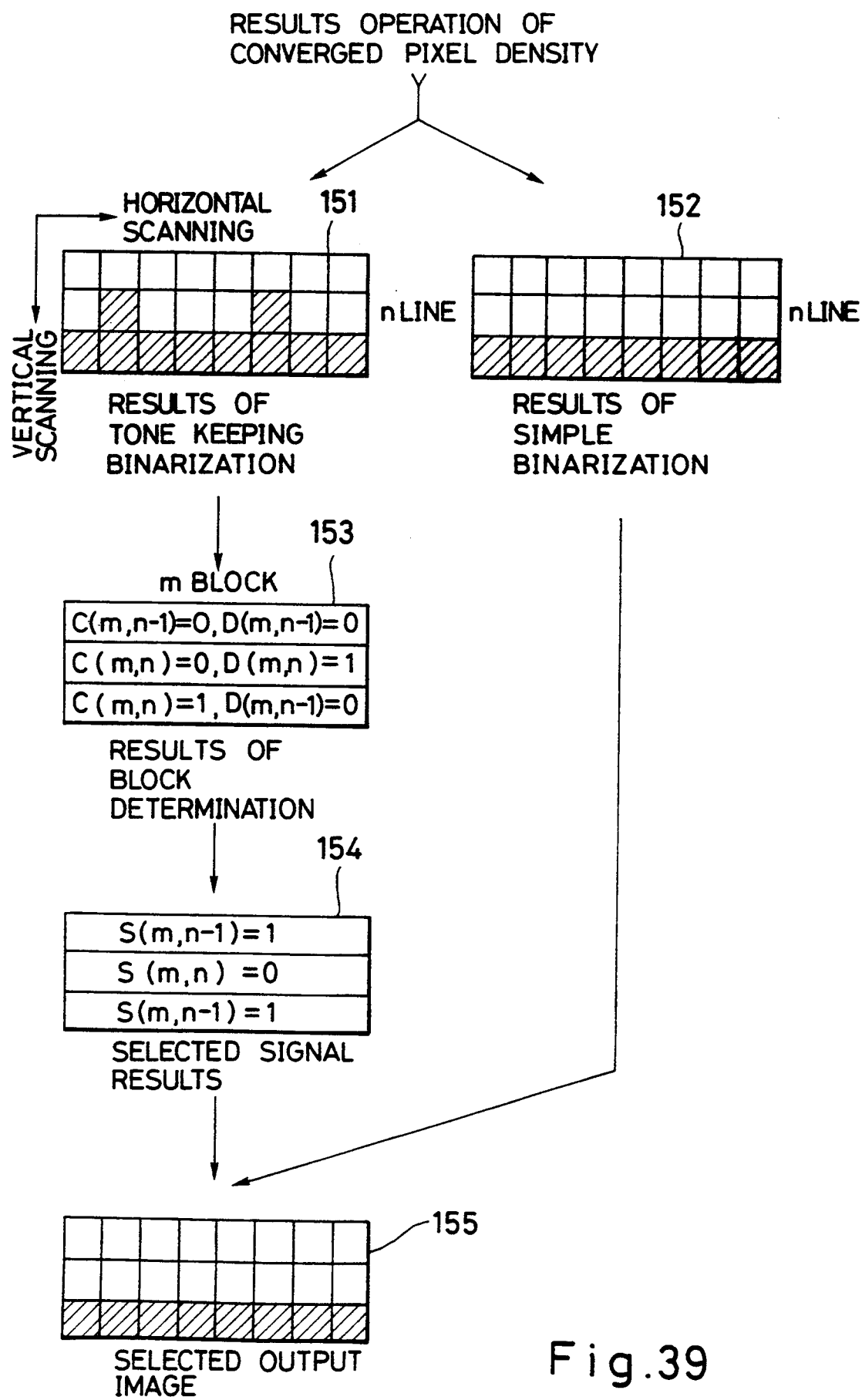
FIG. 39 illustrates a concrete example of the image area determination process.

The processing executed by the image area determining unit will be described by way of example with reference to FIG. 39.

Assuming that protrusions are generated in an edge portion by the tone keeping binarizing process such as the error diffusion process or the average error minimization process, as shown 151, a determination result 153 for the block (consisting of 8 pixels) is obtained, and D (m, n) is determined as the pseudo half-tone processed block. However, the selection signal determination unit 86 determines that S (m, n) is a character or line drawing block from Conditional Equation (6), as shown in 154, and a simply binarized determination result 152 is therefore output as the selected output image, eliminating deterioration in the edge portion, as shown in 155.

As has been shown in the above-described example, the edge in the horizontal scanning direction is detected and the edge boundary portion is simply binarized under Equation (6) so as to eliminate deterioration in the edge portion in the horizontal scanning direction, and determination as to whether the image is the character/line drawing or the pseudo half-tone image is conducted on two blocks in the vertical scanning direction under Equation (5) so as to eliminate deterioration in the edge portion in the vertical scanning direction.

Other Example of the Image Area Determination

Figure 40:
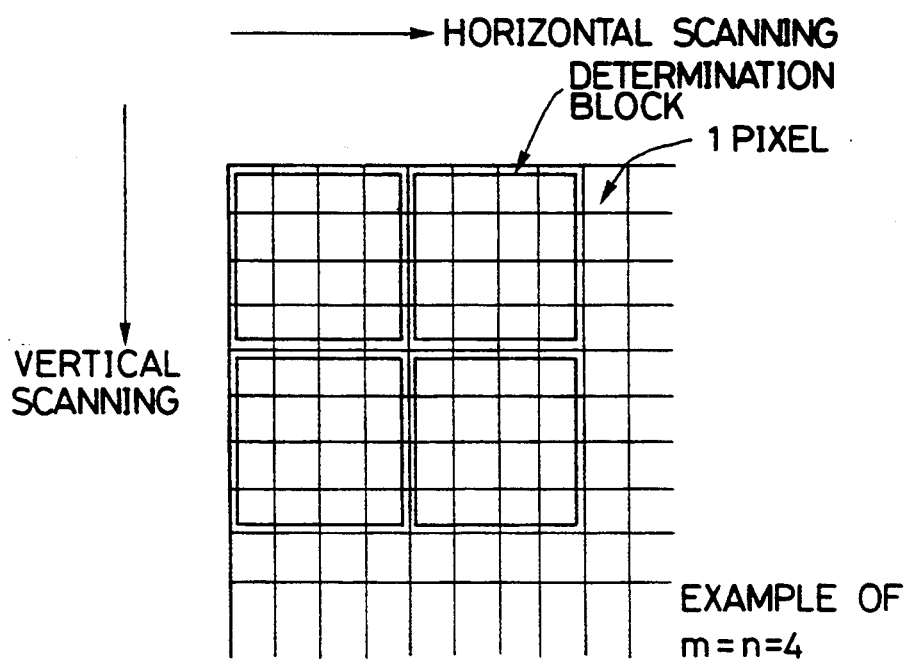
FIG. 40 shows a determination block of another example of the image area determining unit.

The image area determination method is not limited to the above-described example but determination may be conducted on 1 block consisting of n×m pixels, as shown in FIG. 40. In that case, an image obtained by the simply binarization process may also be input to the image area determining unit.

Figure 41:
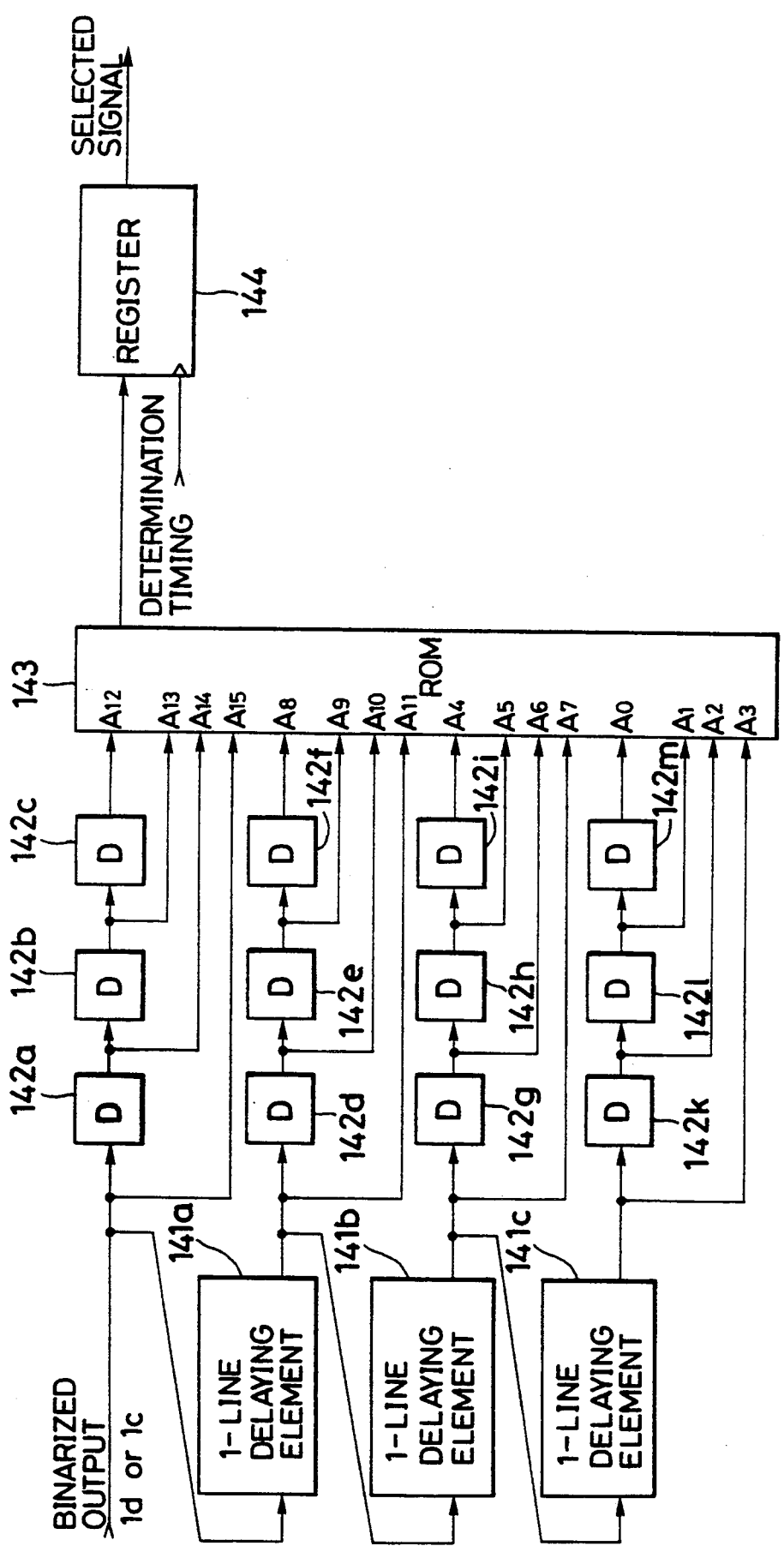
FIG. 41 shows the configuration of another example of the image area determining unit.

FIG. 41 shows an example of the configuration of the image area determining unit which conducts determination on 1 block consisting of 4×4 pixels.

Data on 4×4 pixels shown in FIG. 40 are taken out from the binary output 1d or 1c by 1-line delaying elements 141a to 141c and 1-pixel delaying elements (D flip-flops) 142a to 142m, and a selection signal is then obtained from the obtained data by referring to a ROM 143. The ROM stores the input patterns and the results therefor. For example, the binary output 1d (or 1c) is connected to an address line A15 of the ROM 143, an output of the D flip-flop 142a is connected to an address line A14, an output of the D flip-flop 142b is connected to an address line A13 and so on. In this way, the specific addresses of the ROM 143 can be respectively designated for various types of patterns that can occur on the block consisting of 4×4 pixels. The ROM 143 outputs "0" for the block which is characters and "1" for the block which is a photograph.

As to whether a certain block is a character portion or a photograph portion is determined as follows: If there exists a collection of black pixels, that collection is regarded as part of a character or part of a figure drawn by white and black lines, and the block is therefore determined as the character portion. If the black pixels are present in a diffused state, these diffused black pixels are regarded as the pseudo half-tone image processed by the dither method, and the block is therefore determined as the photograph portion. FIG. 42 shows an example of data stored in the ROM 143. In terms of the data in the D flip-flops, "0" represents white and "1" represents black. FIGS. 43A and 43B show examples of the photograph portion, and FIGS. 43C and 43D shows examples of the character portion.

The ROM may also be constructed by a logical circuit.

Example of Conversion Factor Setting Unit

Setting of Conversion Factor

Next, setting of the conversion factor for each component will be described.

The integral pixel density converting units 2 and 3 have the function of decreasing the number of pixels by a factor of an integer, and the fractional pixel density converting unit 5 has the function of increasing or decreasing the number of pixels by a factor of an arbitrary value. When the fractional pixel density converting unit 5 refers 4 pixels and performs the decreasing process, an area which employs approximation increases, thereby increasing approximation errors and deterioration in the image quality. Hence, when the conversion ratio exceeds $\frac{1}{2}$, the conversion process is conducted only by the fractional pixel density converting unit 5. When the conversion ratio is between $\frac{1}{4}$ and $\frac{1}{2}$, the decreasing process by a factor of 2 is conducted by the integral converting unit 2 or 3, and the conversion process by a factor of a fraction is conducted by the fractional conversion unit 5. Thus, the decreasing process by a factor of an integer is conducted by the integral converting units 2 and 3, and the conversion process by a factor of a fraction is conducted by the fractional converting unit 5. In the above-description, the integral converting units 2 and 3 are capable of the decreasing process by a factor of an integer. However, they may also be arranged such that they are capable of the decreasing process by a factor of the nth power of 2 ($\frac{1}{2^n}$) or only at a factor of a specific value.

As has been stated above, approximation is employed when the integral converting units 2 and 3 have the function of decreasing the number of pixels by a factor of an integer and when the fractional converting unit 5 refers to 4 pixels and decreases the number of pixels. In consequence, as the conversion factor is lowered, the area for approximation increases, thereby increasing approximation errors and deterioration in the image quality. Hence, in another conversion factor setting method, the conversion factor for the integral converting units 2 and 3 is set such that the conversion factor for the fractional converting unit 5 is 0.6 or above. For example, in the case of a conversion factor of 0.7, conversion is performed only by the fraction converting unit 5. In the case of a conversion factor of 0.55, the decreasing process by a factor of 2 is conducted by the integral converting unit 2 or 3, and the increasing process by a factor of 1.1 is performed by the fractional converting unit 5. In the case of a conversion factor of 0.35, the decreasing process by a factor of 3 is conducted by the integral converting unit 2 or 3, and the increasing process by a factor of 1.05 is conducted by the fractional converting unit 5. As stated above, in a case where the fractional converting units 2 and 3 are capable of reduction by a factor of the nth power of 2 ($\frac{1}{2^n}$), if the conversion factor is 0.35, the decreasing process by a factor of 2 is conducted by the integral converting units 2 and 3, and the conversion process by a factor of 0.7 is conducted by the fractional converting unit 5.

In the above description, the conversion factor at which the fractional conversion unit 5 processes is set to 0.6 or above. However, it may be set to any value, such as 0.55 or 0.7 or above, depending on the characteristics of a printer which outputs converted image information.

Thus, when the number of pixels is to be decreased, approximation errors can be reduced and deterioration in the image quality can be thereby reduced by setting the conversion factor for the thinning out process or that for the majority and averaging processes such that the conversion factor for the projection or linear interpolation process is a certain value or above.

Example of Changing the Binarization Threshold by the Conversion Factor

Figure 44:
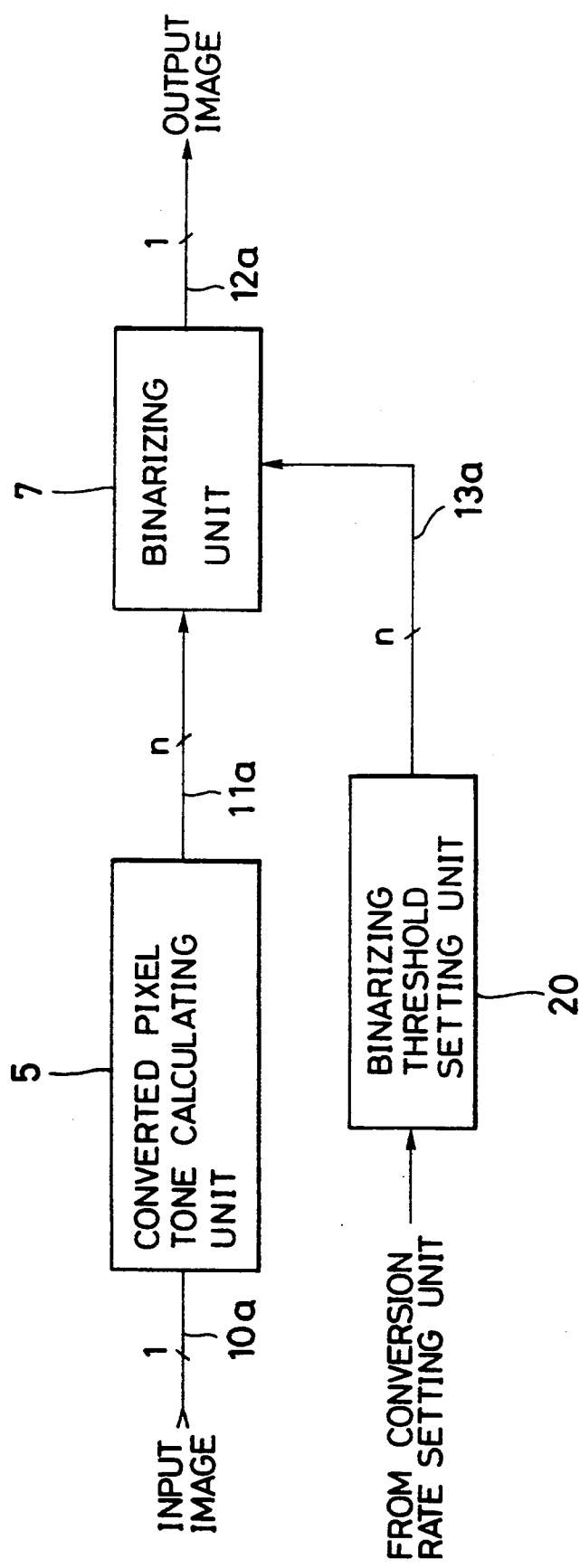
FIG. 44 is a block diagram of the configuration of a binarization threshold level changing process.

FIG. 44 is a block diagram of the configuration of this example.

The fractional converting unit 5 receives an input image 10a (1 bit) and operates the tone (n bits) of a converted pixel. The binarizing unit 7 receives the tone of the converted pixel and binarizes it on the basis of a threshold level 13a set by a binarization threshold setting unit 20 in accordance with the conversion factor.

The Case of the Projection Method

Figure 46:
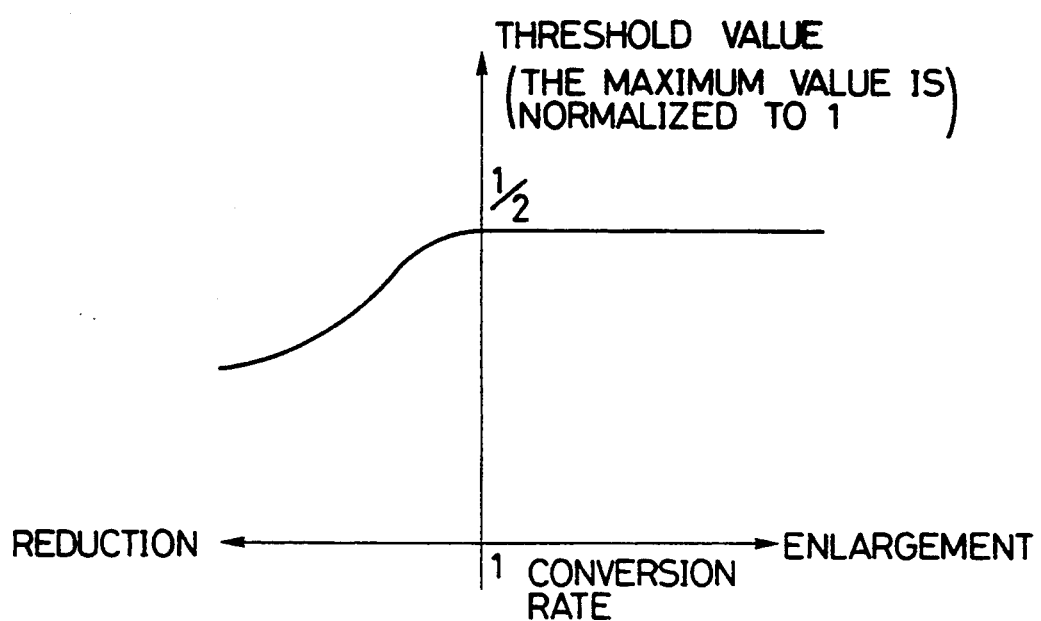
FIG. 46 shows the relation between a conversion factor and a threshold level.
Figure 47:
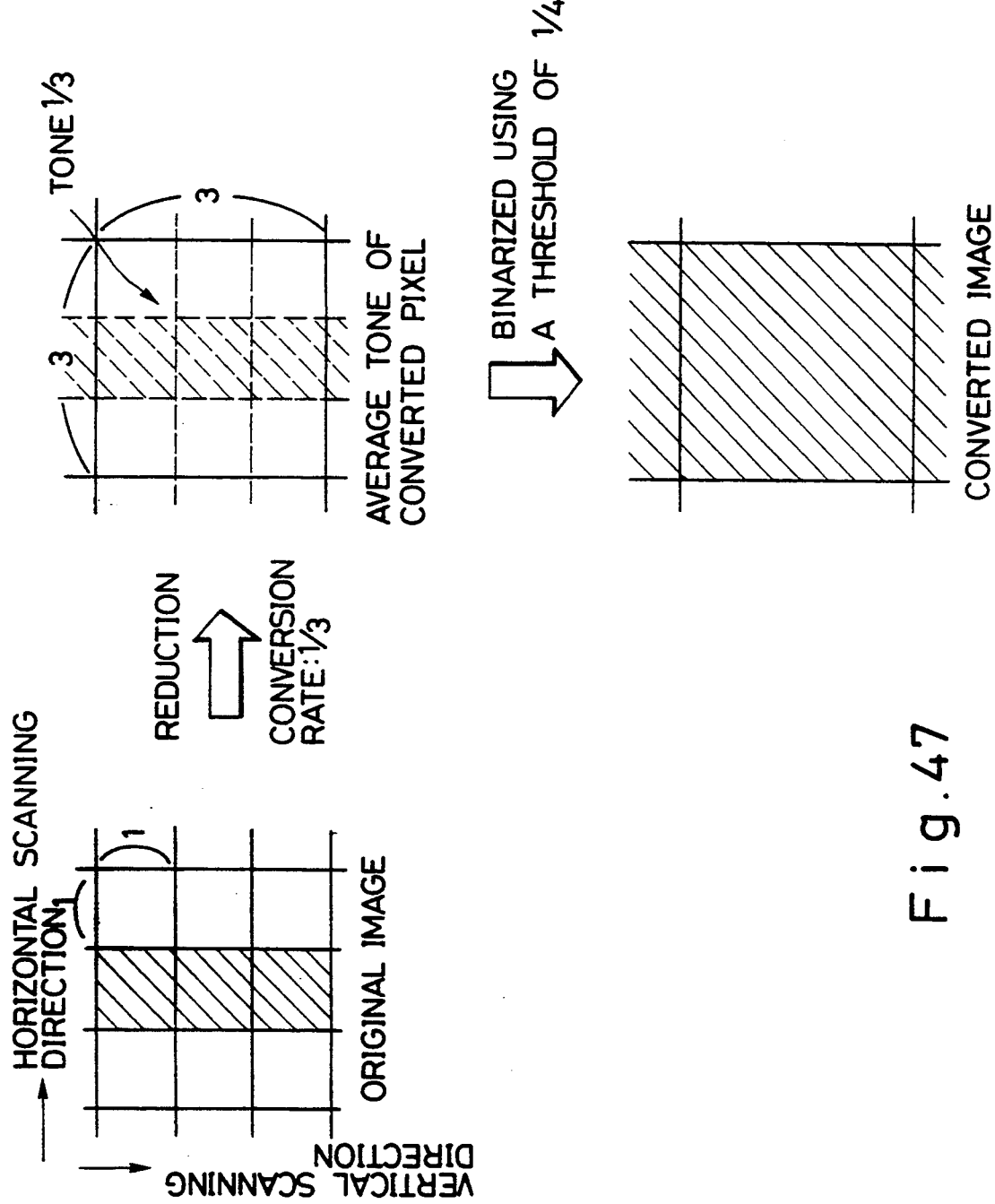
FIG. 47 shows an example of conversion by the projection method.
Figure 48:
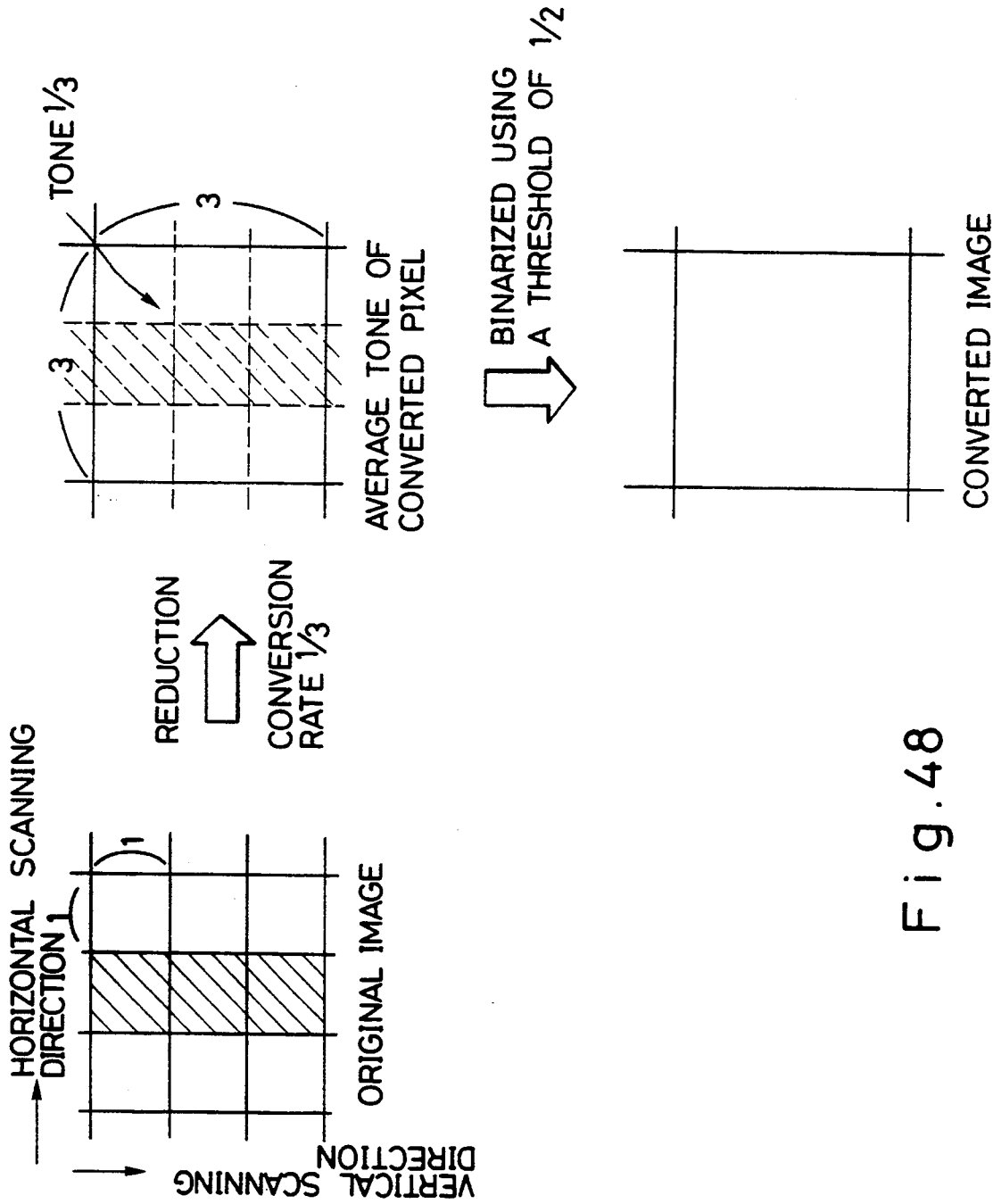
FIG. 48 explains disappearance of a thin line in a conventional example.

Conventionally, the average tone of a converted pixel obtained by the projection method is binarized using a threshold level of ½ (assuming that the maximum value of the tone is normalized to 1). However, in the conventional binarization example such as that shown in FIG. 48, a thin line disappears. Hence, in the present embodiment, disappearance of thin lines is prevented by setting the threshold level on the basis of the relation between the conversion factor and the threshold such as that shown in FIG. 46, i.e., by setting the threshold level to a lower level, for the reduction process. In that case, a thin line disappears, as shown, for example, in FIG. 47.

Figure 45:
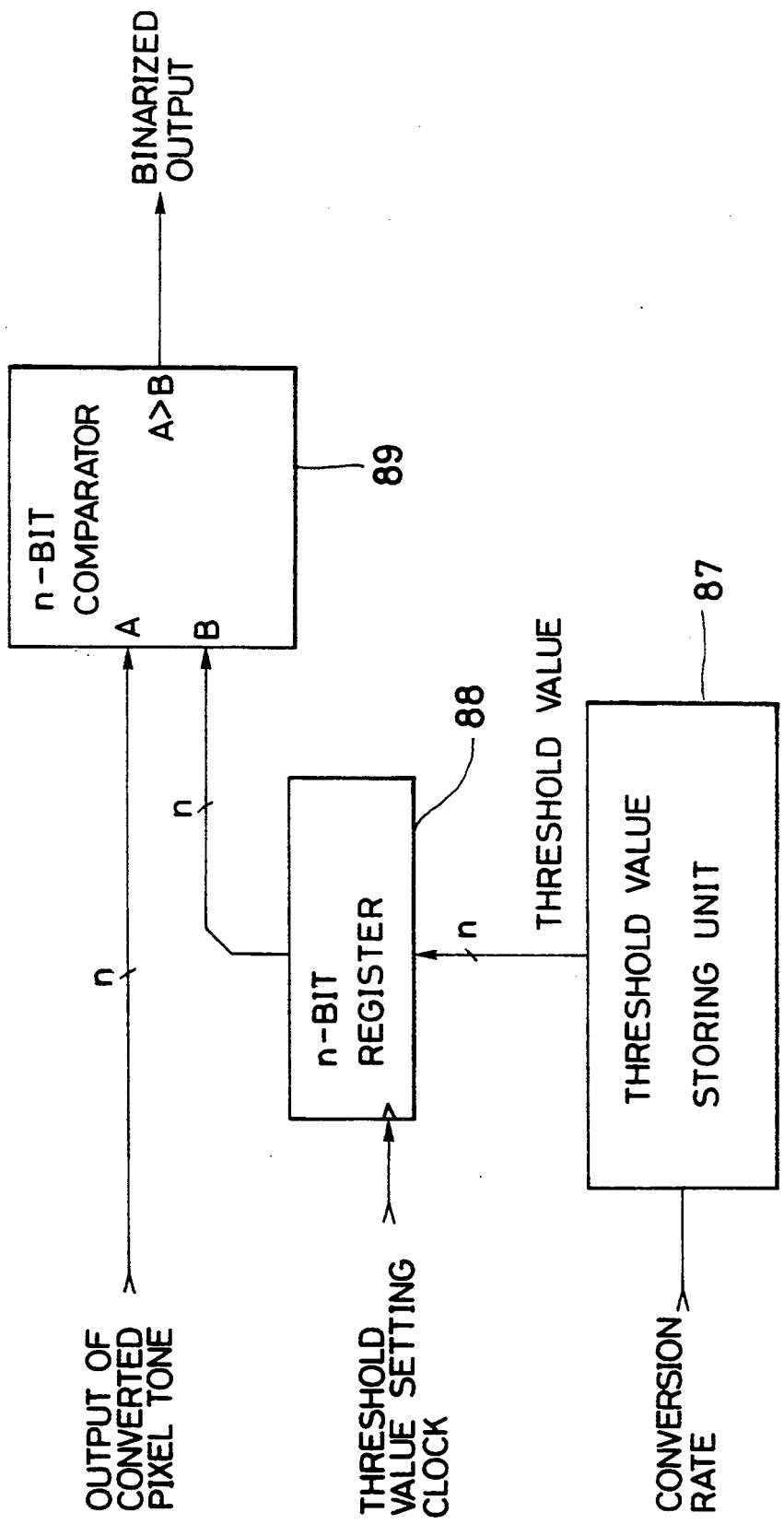
FIG. 45 shows the configuration of a binarizing unit and a binarization threshold level setting unit.

FIG. 45 shows the configuration of the binarizing unit 7 and that of a binarization threshold level setting unit 15.

Prior to the conversion, threshold data corresponding to the conversion factor is written in an n-bit register 88 from a threshold level storing unit 87 by means of a threshold level setting clock. An n-bit comparator 89 performs binarization by comparing the output of the register 88 with the output of the converted pixel tone. The threshold level storing unit 87 may be constructed by a ROM which stores the relation shown in FIG. 46 by the map method.

In this embodiment, disappearance of thin lines is eliminated by setting the threshold level to a value lower than ½ when the conversion factor is low. In the case of an input original document such as a negative original document, however, the threshold level is set to a value higher than ½.

As stated above, in this embodiment, since the threshold level, which is used to binarize the tones of pixels whose density have been converted by the projection method, can be made variable in accordance with the conversion factor, thickening or blurring of lines, which would otherwise occur when the conversion factor is in the vicinity of 1 or in the enlargement process, can be eliminated while disappearance of thin lines, which would occur in a normal original document in the reduction process, can be reduced.

The Case of the Interpolation Method

Figure 49:
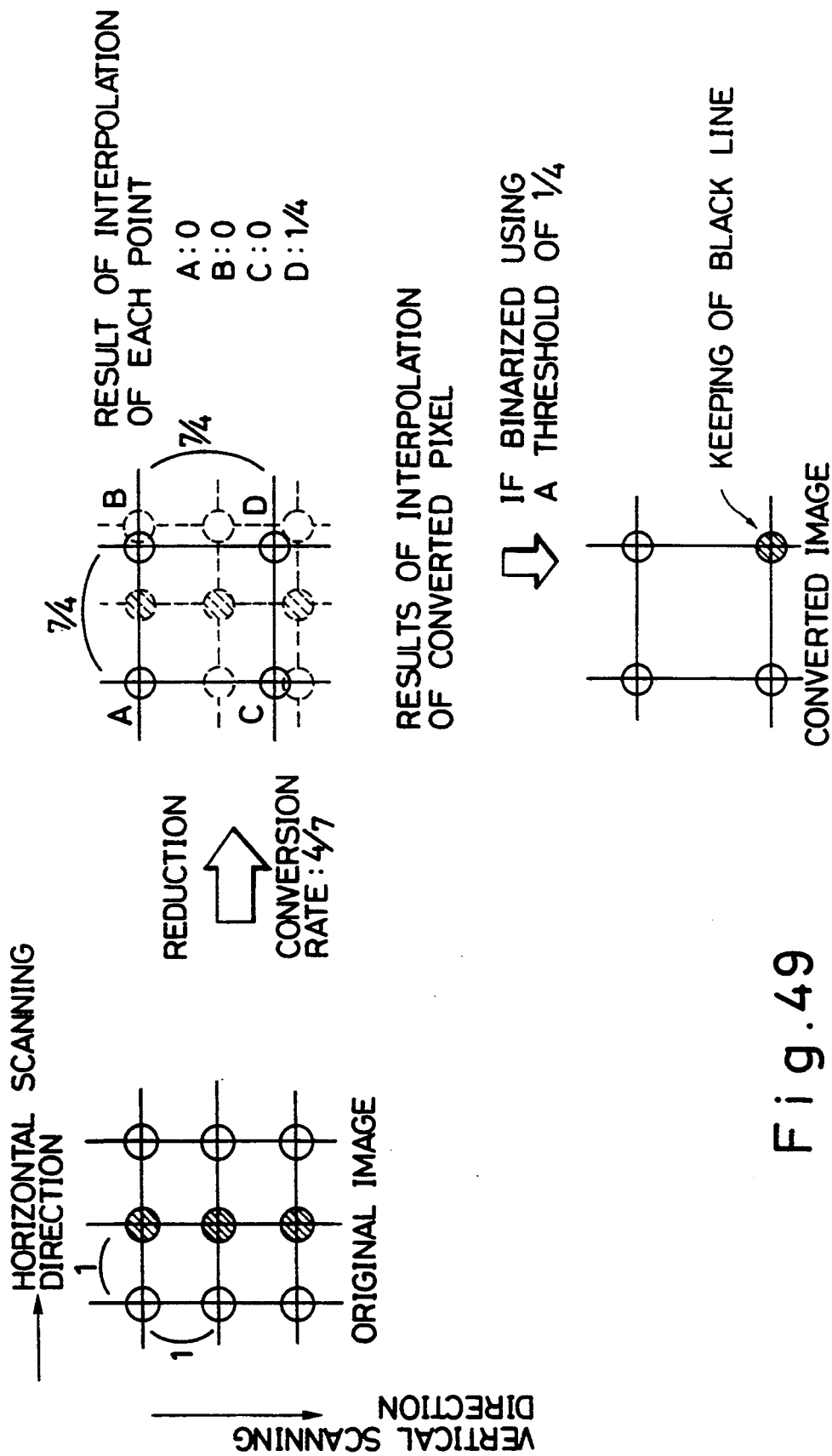
FIG. 49 shows an example of conversion by the linear interpolation method.
Figure 50:
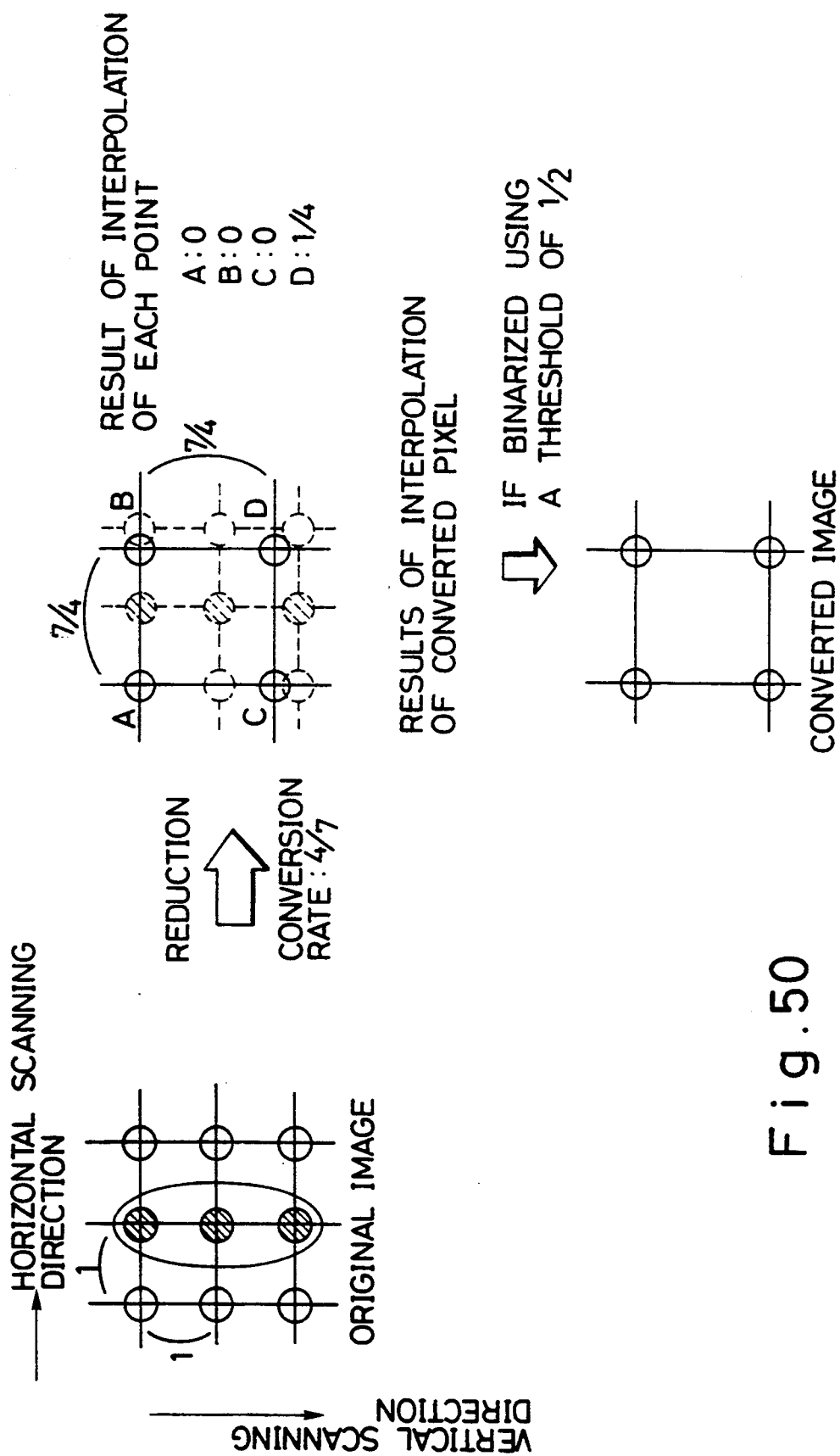
FIG. 50 explains disappearance of a thin line in a conventional example.

When the tone of a converted pixel obtained by the interpolation method at a conversion factor such as that shown in FIG. 50 is binarized conventionally using a threshold level of ½ (assuming that the maximum value of the tone is normalized to 1), a thin line disappears. Hence, in the present embodiment, disappearance of thin lines is prevented by setting the threshold level on the basis of the relation between the conversion factor and the threshold such as that shown in FIG. 46, i.e., by setting the threshold level to a lower level, for the reduction process. In that case, a thin line disappears, as shown, for example, in FIG. 49.

The configuration of the binarizing unit 6 and that of a binarization threshold level setting unit are the same as those shown in FIG. 45.

In this embodiment, disappearance of thin lines is eliminated by setting the threshold level to a value lower than ½ when the conversion factor is low. In the case of an input original document such as a negative original document, however, the threshold level is set to a value higher than ½. This effect can also be achieved in the interpolation method other than the linear interpolation method, e.g., the distance inverse proportion method.

As stated above, in this embodiment, since the threshold level, which is used to binarize the tones of pixels whose density have been converted by the interpolation method, can be made variable in accordance with the conversion factor, thickening or blurring of lines, which would otherwise occur when the conversion factor is in the vicinity of 1 or in the enlargement process, can be eliminated while disappearance of thin lines, which would occur in a normal original document in the reduction process, can be reduced.

Example of the Edge Emphasizing Unit

FIG. 53 shows an example of pixel density conversion in which original pixels 41 are decreased by 10/21 times. A reference numeral 42 denotes converted pixels obtained by the projection method. A, B, C, D, E, F, G, H and I respectively represent the average tones of the converted pixels when the maximum average tone is normalized to 1.

The data row 42 representing the average tones of the converted pixels, which is obtained from the original pixels 41, is subjected to the edge emphasis process, and an obtained value 45 is subjected to the binarization process. In this way, disappearance of thin lines can be prevented in a converted image 46 by the edge emphasis process. The edge emphasis process shown in FIG. 53 employs a differential filter of a factor shown in FIG. 52 to operate an edge amount. In FIG. 52, P, Q, R and S represent pixels located adjacent to a pixel A. Edge emphasis is conducted by the following equation.

$$A = A + \alpha(4A - P - Q - r - S) \tag{7}$$

(In this example, $\alpha = 1$)

where A, P, Q, R and S represent the tones of the respective pixels.

Figure 51:
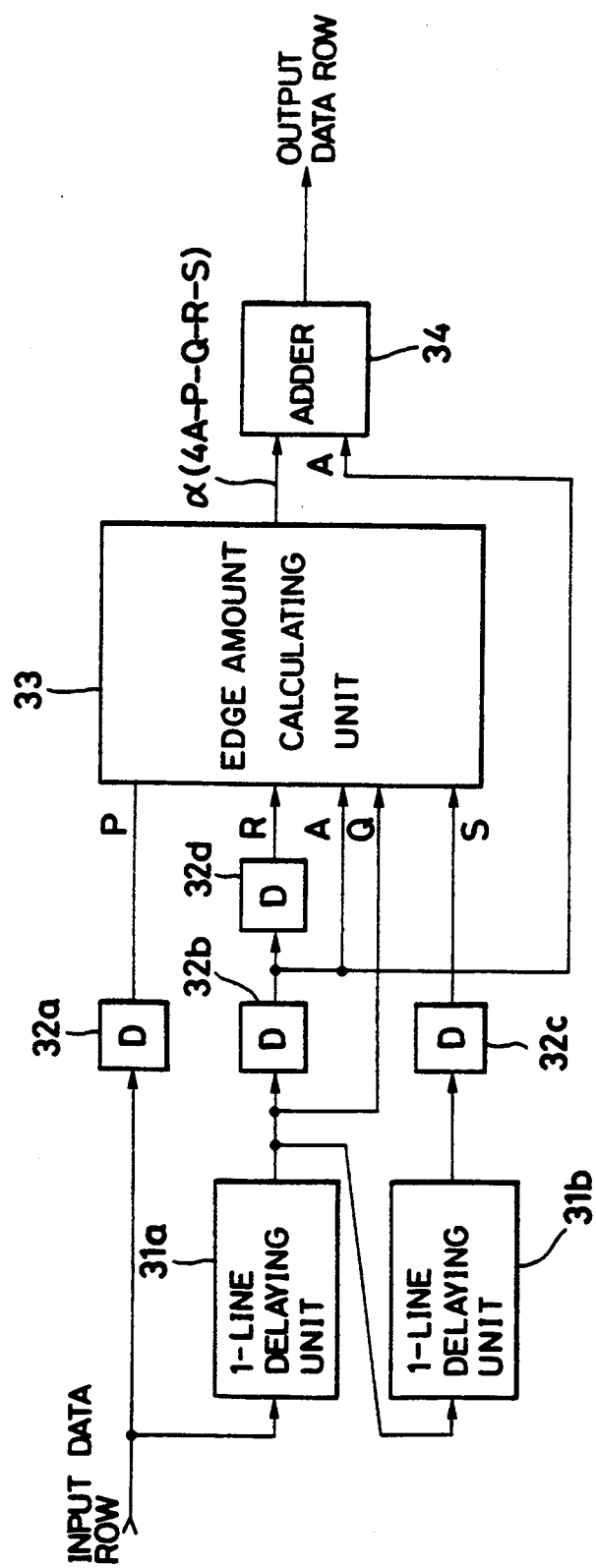
FIG. 51 is a block diagram showing the configuration of an edge emphasizing unit.

FIG. 51 shows an example of the edge emphasizing unit 13. The edge emphasizing unit 13 includes line buffers 31a and 31b for delaying pixels by 1 line, D flip-flops 32a to 32d for delaying pixels by 1 pixel, by means of which the pixels P, Q, R and S located adjacent to the objective pixel A are taken out, an edge amount operating unit 33 which performs the operation expressed by the second term of Equation (7), and an adder 34 for adding an edge amount to the objective pixel tone.

The edge emphasis results are binarized by a binarizing unit using a fixed threshold level. Any type of binarization can be employed as long as it does not cancel the effect of the edge emphasis.

Figure 54:
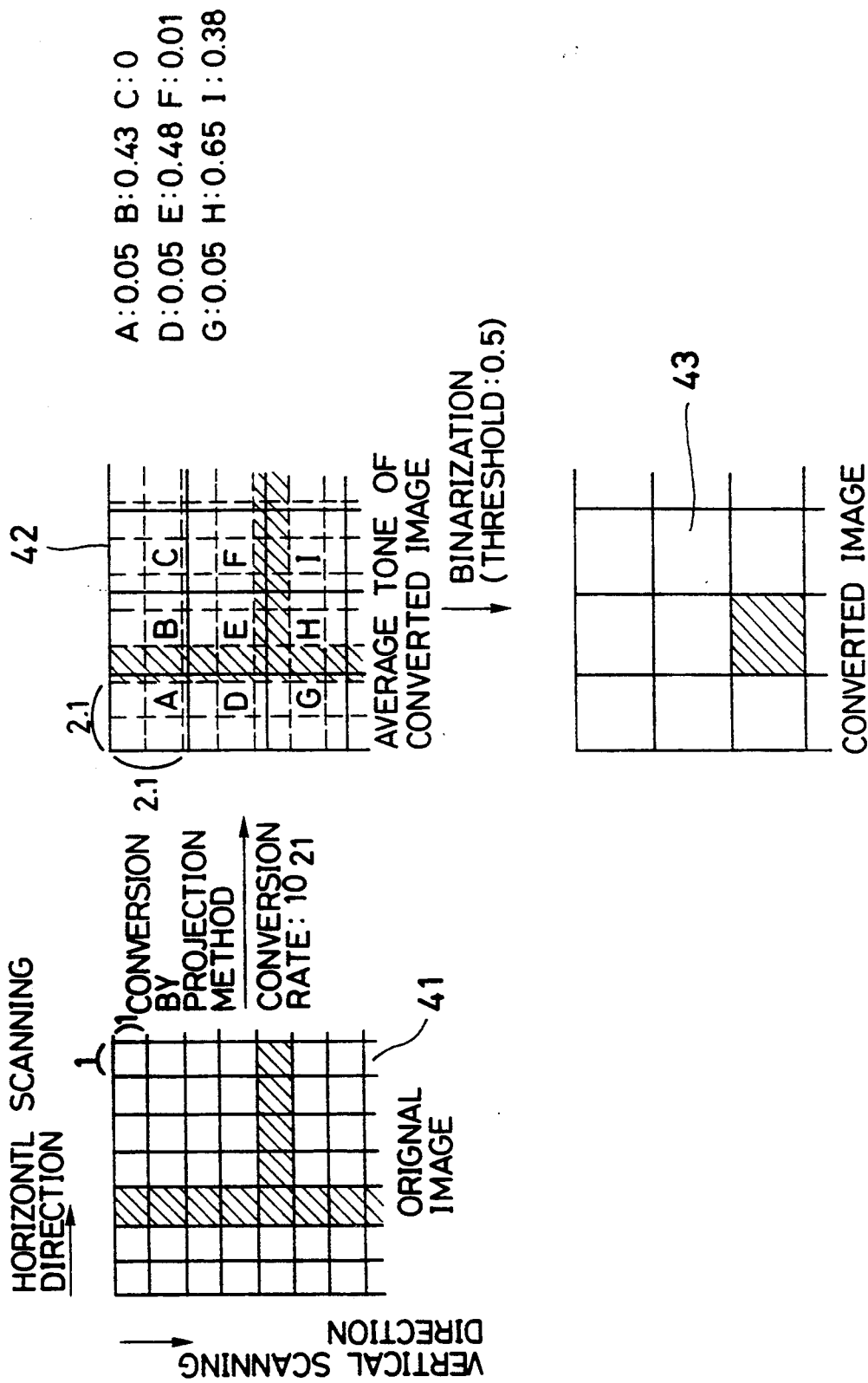
FIG. 54 explains an example of a conventional conversion.

FIG. 54 shows an example of a conventional conversion. In this example, the average tones obtained under the same conditions as those of FIG. 53 are directly binarized using a fixed threshold level, resulting in loss of a thin lines in a converted image 43.

The edge emphasis process in this conversion example employs the filter factor shown in FIG. 52. However, any type of filter factor can be employed as long as it permits edge emphasis.

Various Configuration Examples

Figure 55:
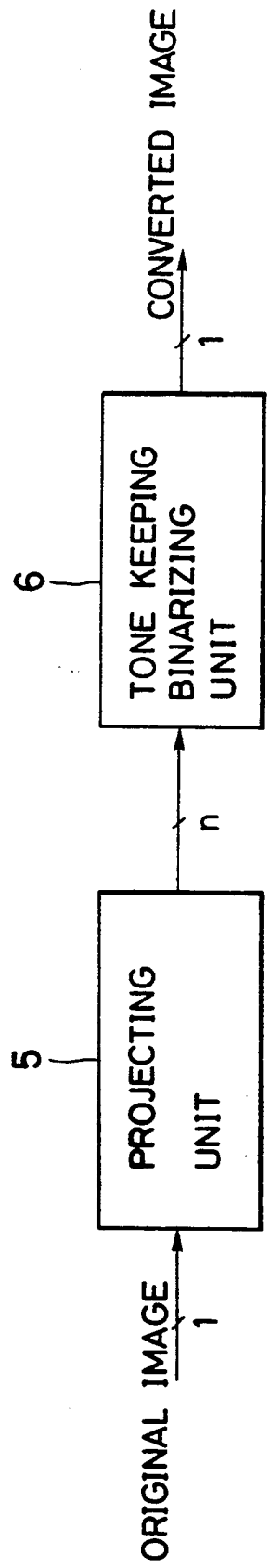
FIG. 55 shows the configuration of the projecting process and the tone keeping binarization process.

FIG. 55 is a block diagram showing the structure of the pixel density converting apparatus. The projecting unit 5 receives an original image (1 bit) and operates the tones of converted pixels. The operation results (n bits) are binarized by the tone keeping binarizing unit 6 to obtain a converted image (1 bit).

Figure 56:
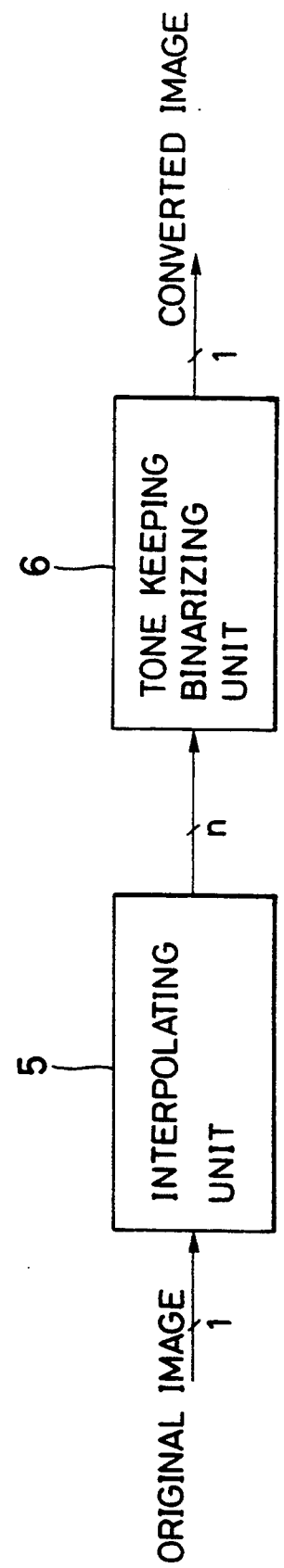
FIG. 56 shows the configuration of the interpolation process and the tone keeping binarization process.

FIG. 56 is a block diagram showing the structure of the pixel density converting apparatus. The interpolation unit 5 receives an original image (1 bit) and operates the tones of converted pixels. The operation results (n bits) are binarized by the tone keeping binarizing unit 6 to obtain a converted image (1 bit).

Figure 57:
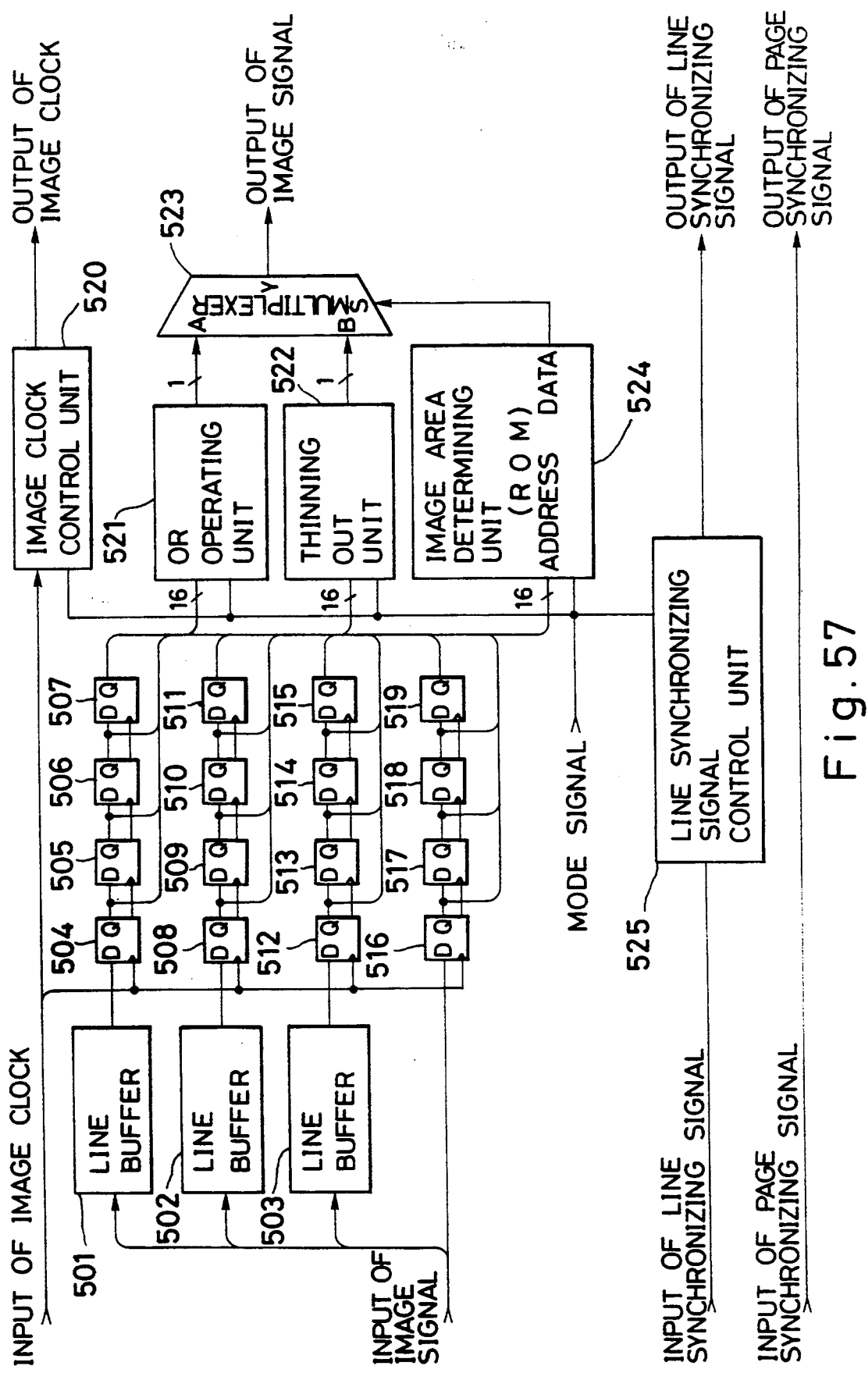
FIG. 57 shows a configuration which selects the logical OR process or the thinning out process.

FIG. 57 is a block diagram showing the structure of the pixel density converting apparatus. The image density converting apparatus includes line buffers 501 to 503 for storing image data corresponding to 1 page, D flip-flops 504 to 519, an image clock control unit 520 for converting image clocks, a logical OR unit 521 for converting a pixel density by the logical OR method, a thinning out unit 522 for converting a pixel density by the thinning out method, a multiplexer 523 for selecting a signal output from the logical OR processing unit 521 or that output from the thinning out unit 522, an image area determining unit 524 for outputting a selection signal for the multiplexer 523, and a line synchronizing signal control unit 525 for controlling a line synchronizing signal. Image data corresponding to 1 page is input in synchronizm with a page synchronizing signal, and pixels are input in synchronizm with the image clocks. The pixel density conversion factor is changed by changing the control in the image clock control unit 520, the logical OR processing unit 521, the thinning out unit 522, and the line synchronizing signal control unit 525 by means of a mode signal. In this example, reduction by a factor of 4 in both the horizontal and vertical scanning directions is possible. However, the present invention is not limited to this.

The logical OR processing unit 521 performs OR operation on the data corresponding to these 16 pixels. The thinning out unit 533 outputs the data in a D flip-flop located at a fixed position, e.g., that in the D flip-flop 504. Alternatively, the thinning out unit 522 may be constructed such that the position of the D flip-flop to be referred to changes cyclically or irregularly, for example, the data in the D flip-flop 504 is referred to for the first time, then that in D flip-flop 506 for the second time, then that in the D flip-flop 508 for the third time, and so on.

Selection between the logical OR process and the thinning out process is conducted on the basis of the determination results obtained by the image area determining unit. When the image data input is that obtained by reading a character original document, the logical OR process is selected. If the image data input represents a photograph, the thinning out process is selected.

Determination is conducted in the image area determining unit in the manner described with reference to FIGS. 40 to 43.

Next, the effects of the present invention will be described with reference to FIGS. 58 to 59.

Figure 58C:
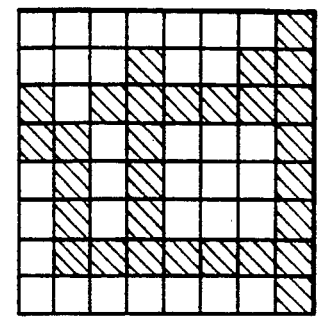
FIGS. 58A to 58C show a character document and conversion examples thereof.
Figure 59C:
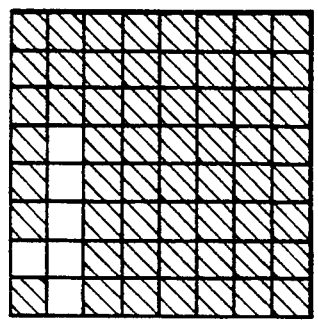
FIGS. 59A to 59C show a dither image and conversion examples thereof.
Figure 58B:
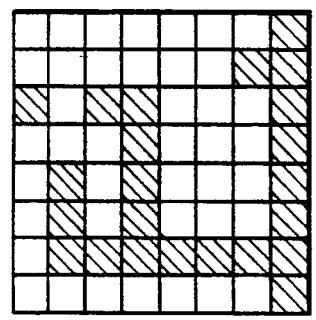
Figure 59B:
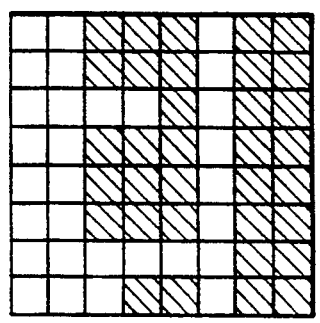
Figure 58A:
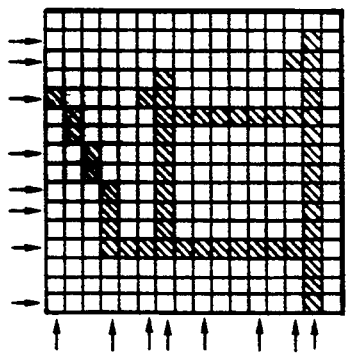
Figure 59A:
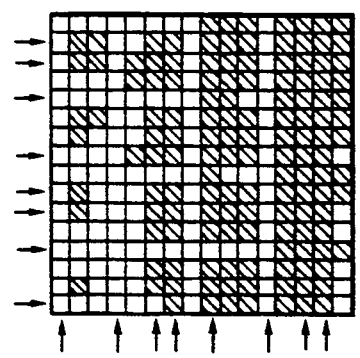

FIG. 58A shows an example of a character image, and FIG. 59A shows an example of a dither image. FIGS. 58B and 58C show the images obtained by decreasing the pixel density of the image shown in FIG. 58A by a factor of 2 in both the horizontal and vertical scanning directions by the thinning out process and the logical OR process, respectively. FIGS. 59B and 59C show the images obtained by decreasing the pixel density of the image shown in FIG. 59A by a factor of 2 in both the horizontal and vertical scanning directions by the thinning out process and the logical OR process, respectively. In the thinning out process employed for the examples shown in FIGS. 58B and 59B, the position of the data to be discarded is changed cyclically. The lines used in this thinning out process are indicated by the arrows in FIGS. 58A and 59A. In order to employ a pixel density conversion process which suits the property of an image of an original document, the logical OR process is conducted on the image data representing a character original document while the thinning out process is conducted on image data representing a photographic original document. For example, when the character document shown in FIG. 58A is subjected to the logical OR process, thin lines are restored, as shown in FIG. 58C. When the pixel density of the photographic original shown in FIG. 59A is converted by the thinning out process, the ratio of the area of the black portions to that of the white portions remains substantially the same, as shown in FIG. 59B.

Figure 60A:
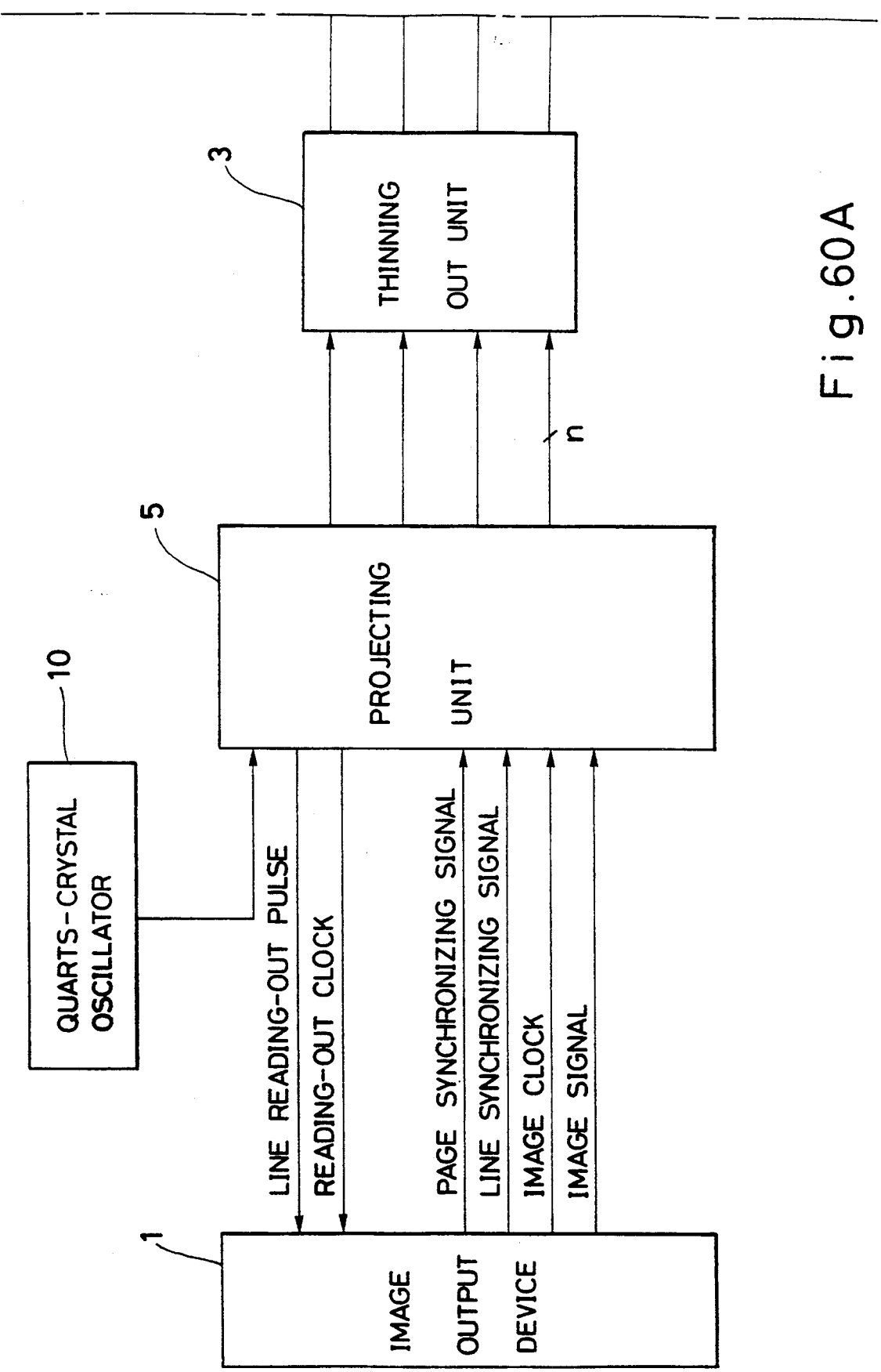
FIGS. 60 to 64 show modifications of the pixel density converting apparatus.
Figure 60B:
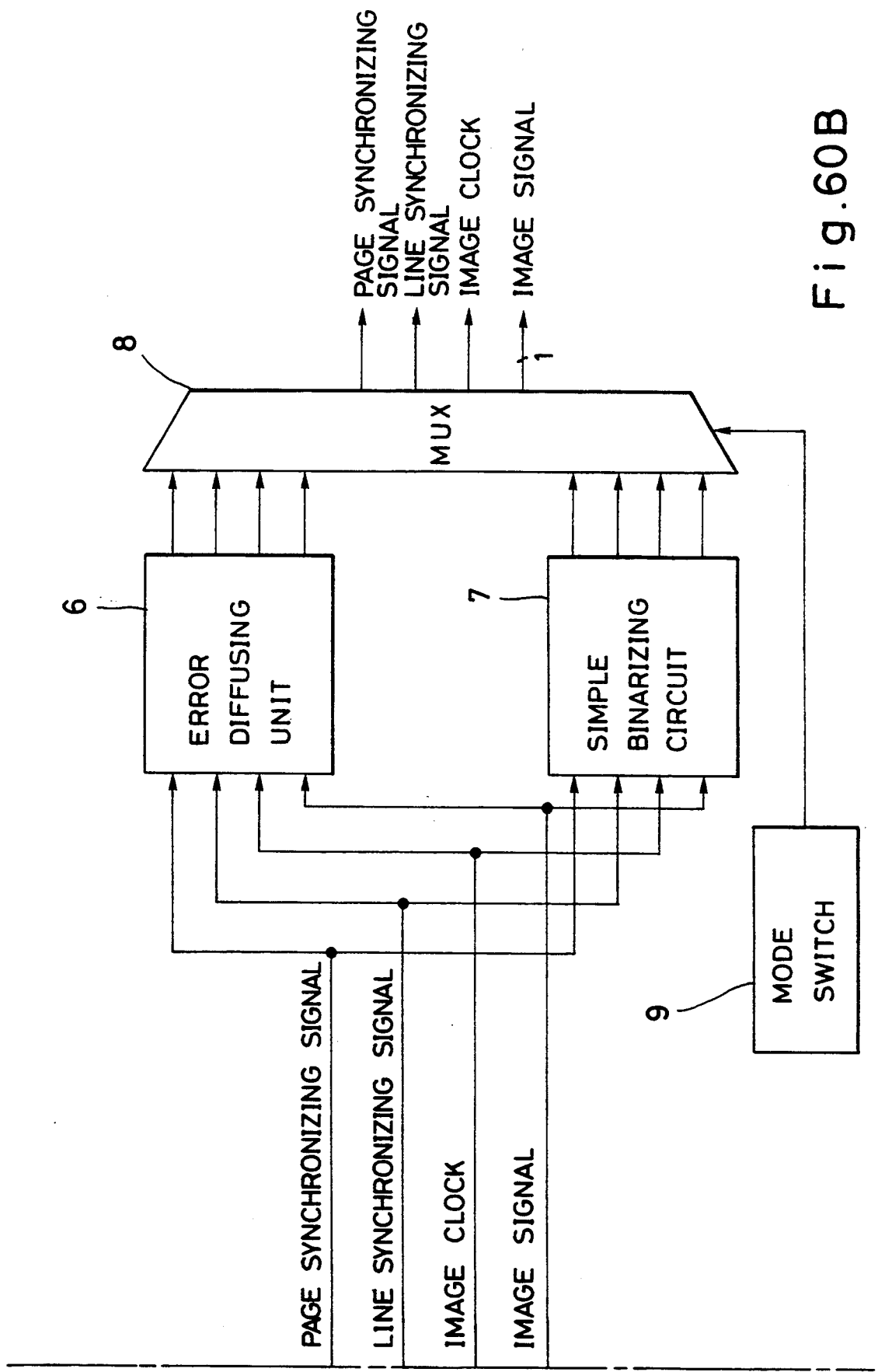

FIG. 60 is a block diagram, showing an example of the configuration of the pixel density converting apparatus. The pixel density converting apparatus includes an image output device 1' for storing and outputting a binary image in synchronizm with a synchronizing signal, the projecting unit 5 for increasing or decreasing a number of pixels by a factor of an arbitrary value by the projection method, the thinning out unit 3 for periodically conducting thinning out on a signal output from the projecting unit 5 and thereby decreasing the number of pixels thereof by a factor of an integer, the error diffusing unit 6 for performing the error diffusion process on the signal output from the thinning out unit 3, the simply binarizing unit 7 for conducting binarization on the signal output from the thinning out unit 3 using a fixed threshold level, the multiplexer 8 for selecting either of the signals output from the error diffusing unit 6 and the simply binarizing unit 7, the mode changeover switch 9 for outputting a selection signal to the multiplexer 8, and the quartz-crystal oscillator 10 for generating basic operation clocks.

Figure 61A:
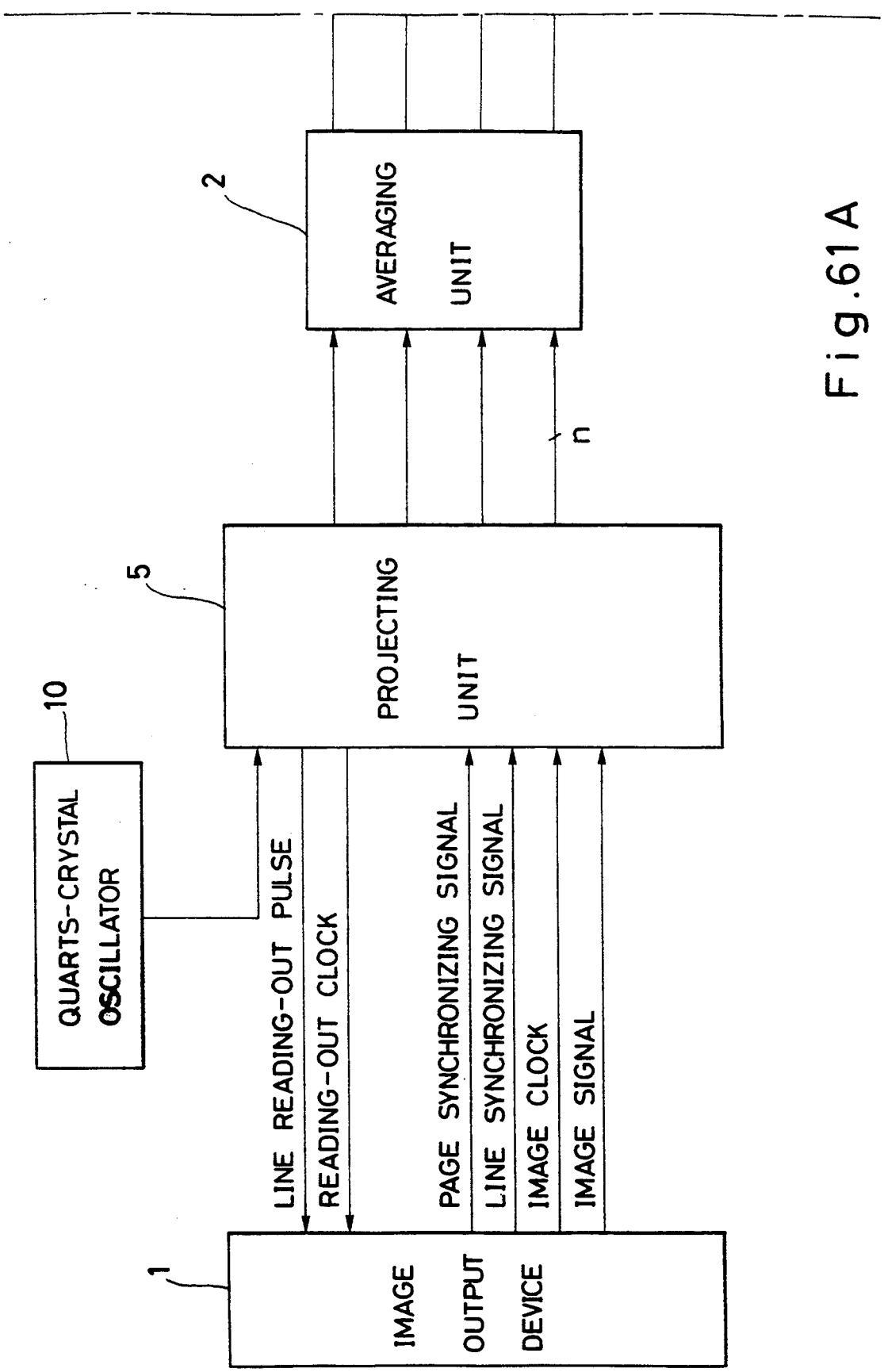
Figure 61B:
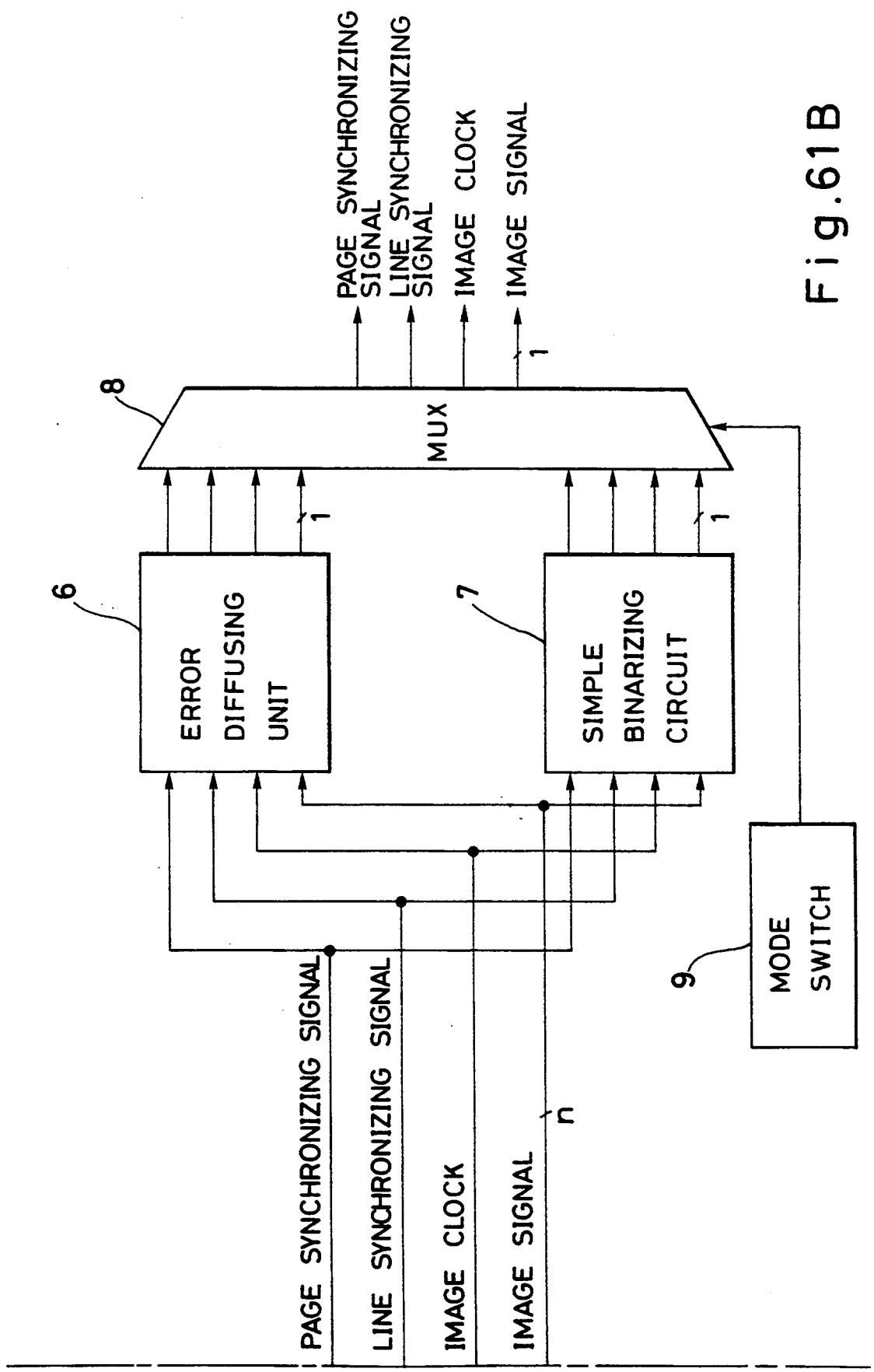

FIG. 61 is a block diagram, showing an example of the structure of the pixel density converting apparatus. In FIG. 61, the same reference numerals are used to denote parts which are the same as those shown in FIG. 60. In the configuration shown in FIG. 61, the thinning out unit 3 is replaced by the averaging unit 2 for conducting averaging on a signal output from the projecting unit 5 and thereby decreasing the number of pixels thereof by a factor of an integer.

Figure 62A:
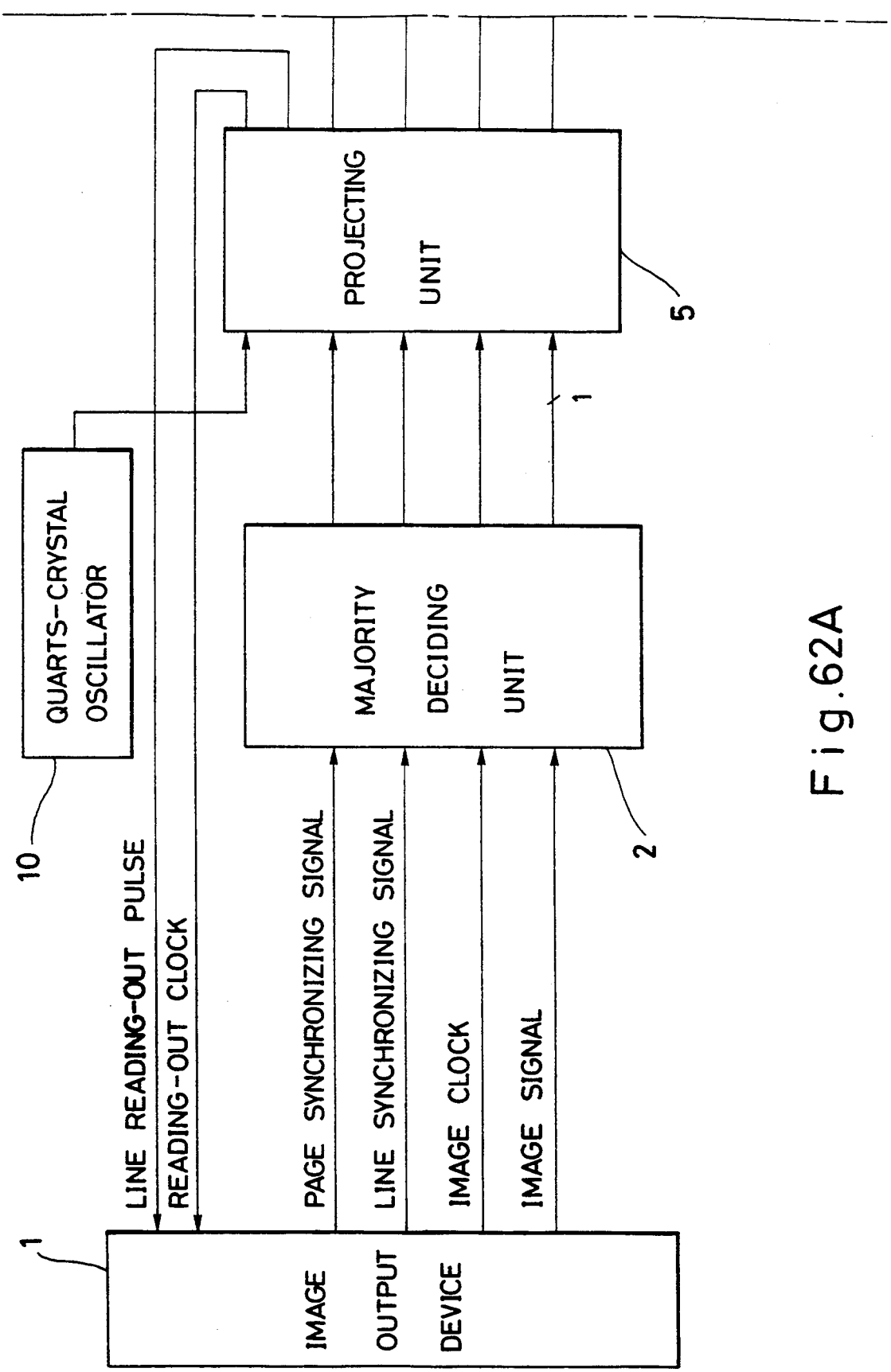
Figure 62B:
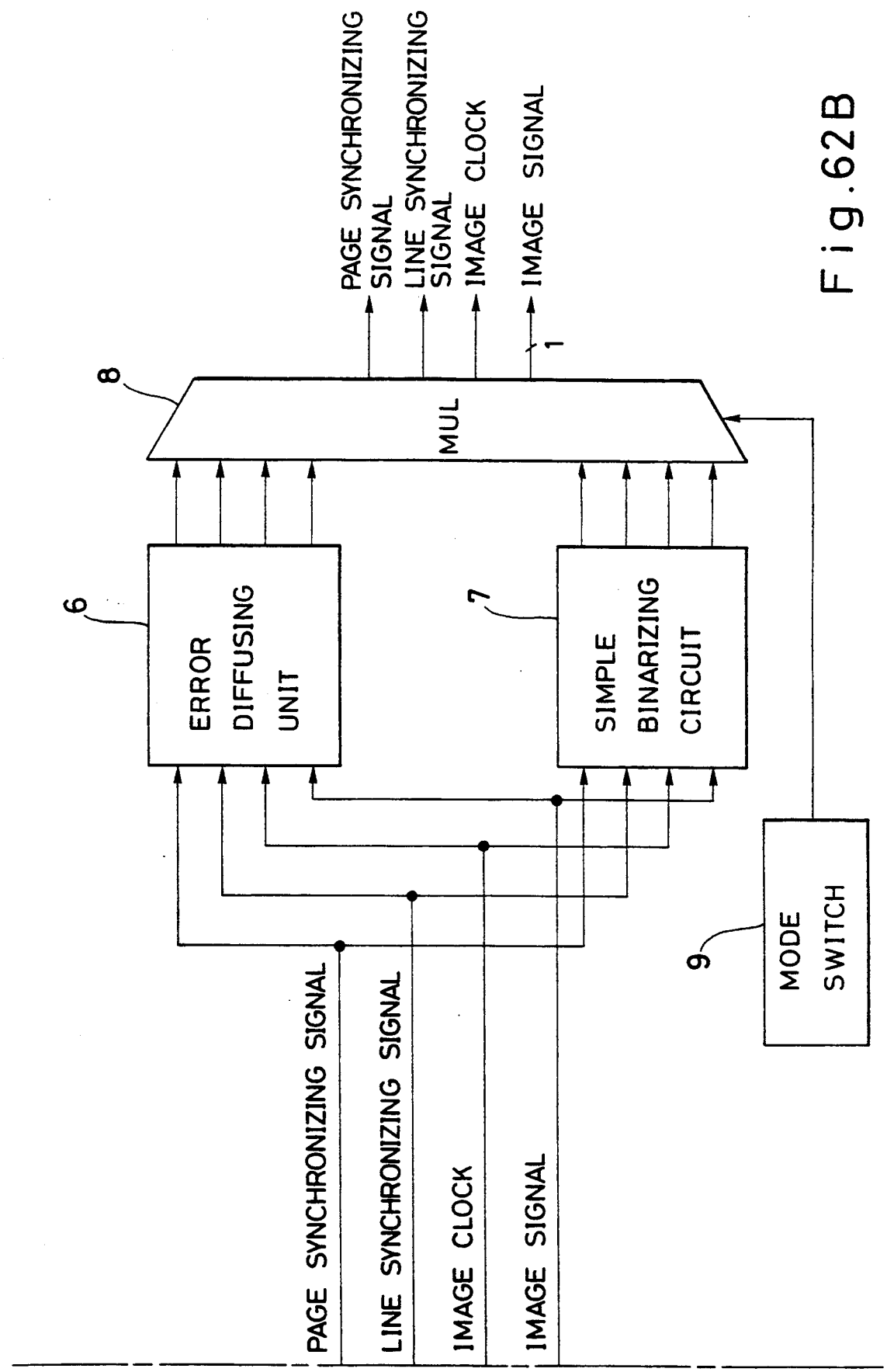

FIG. 62 is a block diagram, showing an example of the configuration of the pixel density converting apparatus. In FIG. 62, the same reference numerals are used to denote the same components which are the same shown in FIG. 60. In the example shown in FIG. 62, the thinning out unit 3 is replaced by the majority processing unit 2 for outputting a signal whose number of pixels has been decreased by a factor of an integer. The signal output from the majority processing unit 2 is input to the projecting unit 5 where the number of pixels thereof is further decreased.

Figure 63:
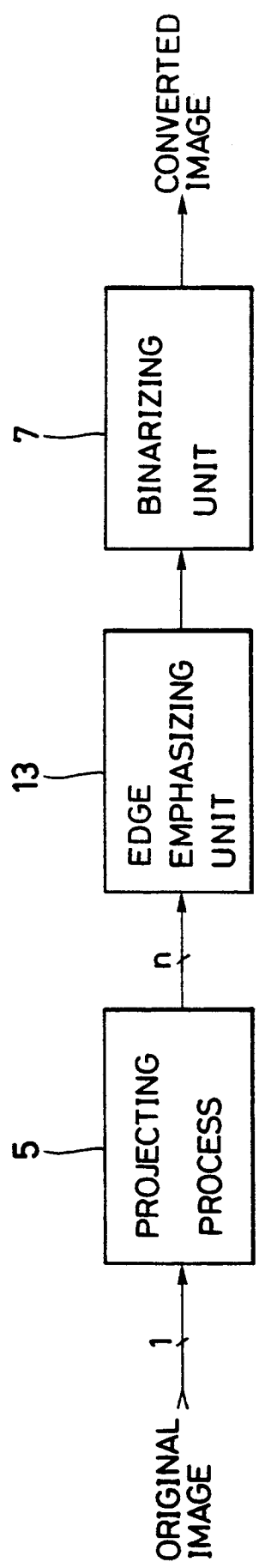

FIG. 63 is a block diagram, showing an example of the configuration of the pixel density converting apparatus.

The projecting unit 5 receives an input image (1 bit), and conducts the projection process on the input image to operate the tone (n bits) of a converted pixel. The edge emphasizing unit 13 conducts edge emphasis on the obtained operation results. The binarizing unit 7 binarizes the results of the edge emphasizing process to obtain a converted image (1 bit).

Figure 64A:
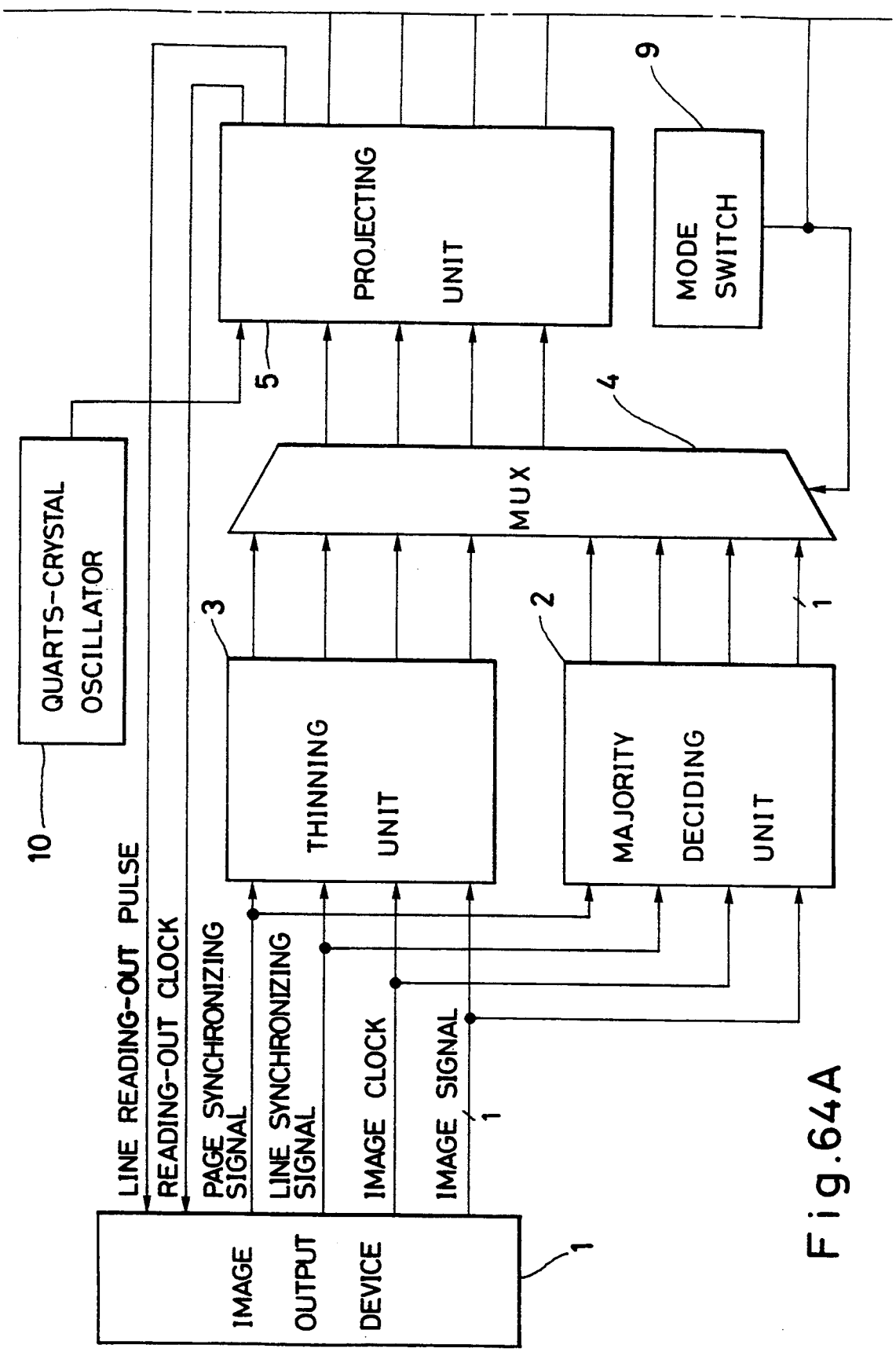
Figure 64B:
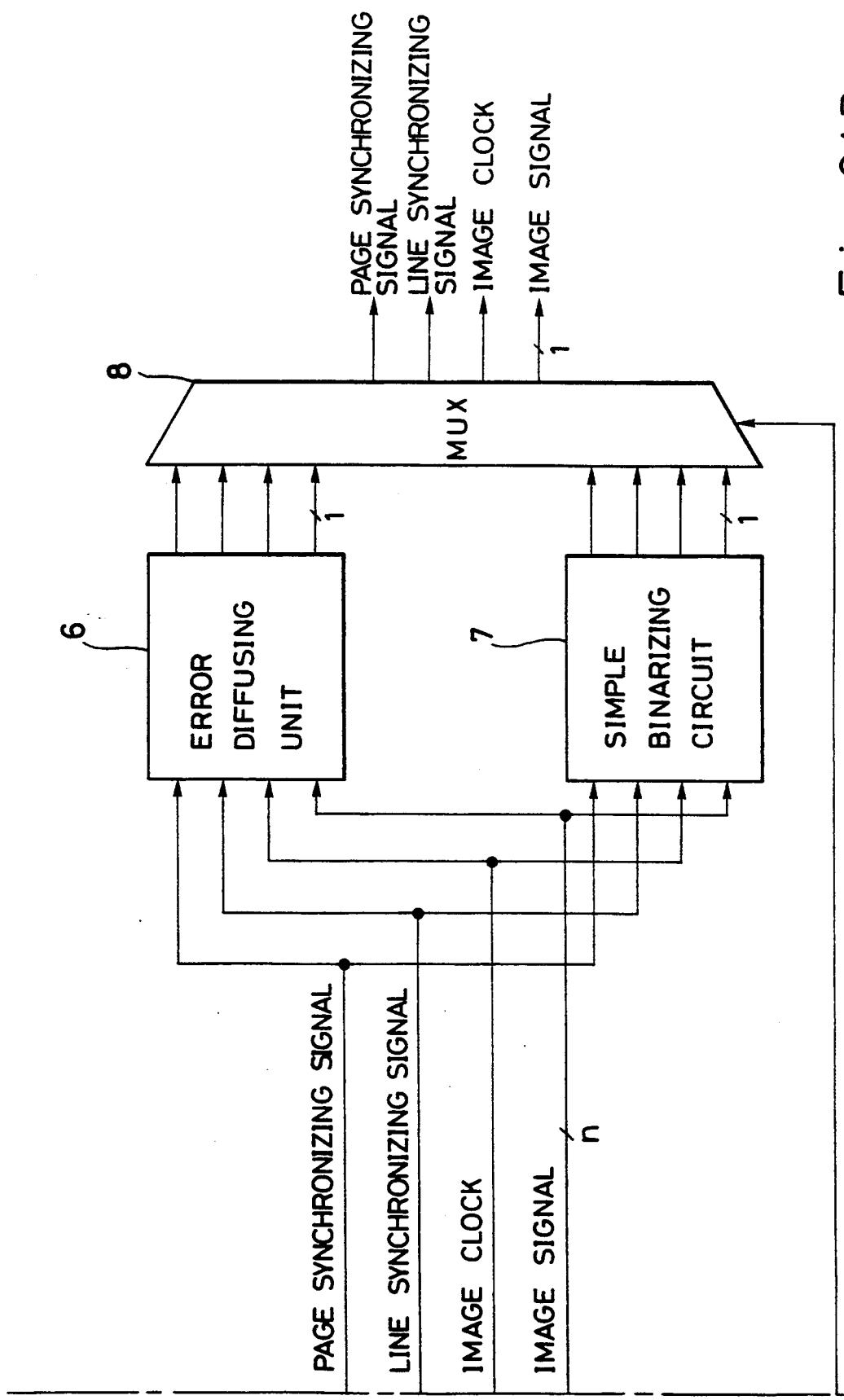

FIG. 64 is a block diagram, showing an example of the configuration of the pixel density converting apparatus. The pixel density converting apparatus includes the image output device 1' for storing and outputting a binary image in synchronizm with a predetermined synchronizing signal, the majority processing unit 2 for comparing the number of white pixels in an original image corresponding to a converted 1 pixel with that of black pixels when a number of pixels are to be decreased by a factor of an integer so as to make the tone of a converted pixel black when the number of black pixels is equal to or greater than that of white pixels, the thinning out unit 3 for periodically conducting thinning out on an original image when the number of pixels thereof is to be decreased by a factor of an integer and for thereby decreasing the number of pixels, the multiplexer 4 for selecting either of the output of the majority unit 2 and that of the thinning out unit 3, the projecting unit 5 for increasing or decreasing a number of pixels by a factor of an arbitrary value by the projection method and for outputting an obtained multi-level signal, the error diffusing unit 6 for performing the error diffusion process on the multi-level signal output from the projecting unit 5, the simply binarizing unit 7 for conducting binarization on the multi-level signal output from the projecting unit 5 using a fixed threshold level, the multiplexer 8 for selecting either of the binary signals output from the error diffusing unit 6 and the simply binarizing unit 7, the mode change-over switch 9 for outputting a selection signal to the multiplexers 4 and 8, and the quartz-crystal oscillator 10 for generating basic operation clocks.

Various changes, additions or modifications of the aforementioned embodiments may be made in the present invention without departing from the spirit and scope thereof.

What is claimed is:

1. A pixel density converting apparatus for converting a pixel density of a binary image in which a pseudo half-tone processed image and characters or line drawings are present in a mixed state, comprising:
   a converted pixel operation means for operating a tone or luminance of a converted pixel from a tone or luminance of a predetermined original pixel in said binary image and a positional relation between said original pixel and said converted pixel; and
   a binarization means for binarizing the tone or luminance of said converted pixel which is the operation results while correcting a quantizing error generated when surrounding pixels have been binarized.

2. A pixel density converting apparatus according to claim 1, wherein said binarization means corrects the quantizing error by the error diffusion method.

3. A pixel density converting apparatus according to claim 1, wherein said binarization means corrects the quantizing error by the average error minimizing method.

4. A pixel density converting apparatus according to claim 1, further comprising a threshold level setting means for setting a threshold level used for binarization by said binarization means in accordance with a conversion factor.

5. A pixel density converting apparatus according to claim 1, wherein said converted pixel operation means operates the converted pixel by the projection method.

6. A pixel density converting apparatus according to claim 1, wherein said converted pixel operation means operates the converted pixel by the linear interpolation method.

7. A pixel density converting apparatus according to claim 1, further comprising a integral conversion means for increasing or decreasing the pixel density by a factor of an integer, and a conversion factor setting means for setting a factor for said converted pixel operation means and that for said integral conversion means in accordance with a conversion factor.

8. A pixel density converting apparatus according to claim 7, wherein said integral conversion means performs a conversion by the thinning out process.

9. A pixel density converting apparatus according to claim 7, wherein said integral conversion means performs a conversion by the majority process.

10. A pixel density converting apparatus according to claim 7, wherein said integral conversion means performs a conversion by the averaging process.

11. A pixel density converting apparatus according to claim 7, wherein said integral conversion means performs a conversion by the logical OR process.

12. A pixel density converting apparatus according to claim 1, further comprising a plurality of integral conversion means for increasing or decreasing the pixel density by a factor of an integer, an integral conversion means selection means for selecting either of said plurality of integral conversion means on the basis of determination as to whether or not an image area is a pseudo half-tone processed area, and a conversion factor setting means for setting a factor for said converted pixel operation means and that for said integral conversion means in accordance with a conversion factor.

13. A pixel density converting apparatus according to claim 12, wherein said plurality of integral conversion means is a combination of a conversion means for conducting the thinning out process and a conversion means for conducting the majority process, and wherein the psuedo half-tone processed image area is processed by the thinning out method.

14. A pixel density converting apparatus according to claim 12, wherein said plurality of integral conversion means is a combination of a conversion means for conducting the thinning out process and a conversion means for conducting the averaging process, and wherein the psuedo half-tone processed image area is processed by the thinning out method.

15. A pixel density converting apparatus according to claim 12, wherein said plurality of integral conversion means is a combination of a conversion means for conducting the thinning out process and a conversion means for conducting the logical OR process, and wherein the psuedo half-tone processed image area is processed by the thinning out method.

16. A pixel density converting apparatus according to claim 1, further comprising an edge emphasis means which is interposed between said converted pixel operation means and said binarization means.

17. A pixel density converting apparatus for a binary image which employs the linear interpolation method, comprising:
- a pixel taking out means for taking out 4 original pixels surrounding a converted pixel on a projection surface formed by projecting a converted image onto an original image;
- a position operation means for operating a position of said converted pixel relative to said four original pixels;
- an area determination means for determining a predetermined area from said relative position obtained; and
- a converted pixel determination means for determining a value of said converted pixel from a logical expression determined by said determined area.

18. A pixel density converting apparatus for increasing or decreasing a number of pixels of a binary image by means of the projection means, comprising:
- an operation means for operating a tone or luminance of a converted pixel by limiting the number of pixels to be referred to which are to be subjected to conversion and which corresponds to 1 pixel obtained by the projecting method to a predetermined value and for approximating a tone of a pixel other than said limited pixels by tones of the adjacent reference pixels.

19. A pixel density converting apparatus for increasing or decreasing a number of pixels of a binary image by means of the projection means, comprising:
- an operation means for operating a tone or luminance of an objective pixel on the basis of overlapping of referred pixels on a pixel converted by the projection method whose one side has a length which is an integral power of 2.

20. A pixel density converting apparatus for converting a pixel density of binary image, comprising:
- an operation means for operating a tone or luminance of a pixel to be converted and converting a pixel density;
- a threshold level setting means for setting a threshold level used for binarization of the tone or luminance of a pixel in accordance with a conversion factor; and
- a binarization means for binarizing the tone or luminance of the converted pixel by the comparison results of the threshold level and the tone or luminance of the converted pixel.

21. A pixel density converting apparatus according to claim 20, wherein said operation means operates the tone or luminance of the pixel to be converted by the projection method.

22. A pixel density converting apparatus according to claim 20, wherein said operation means operates the tone or luminance of the pixel to be converted by the interpolation method.

23. A pixel density converting apparatus for converting a pixel density of binary image by a desired conversion factor, comprising:
- an operation means for operating an average tone or luminance of a pixel to be converted by the projection method;
- an edge emphasis means for emphasizing an edge of the image data converted by said operation means as multi-level image data; and
- a binarization means for binarizing the image data emphasized by said edge emphasis means.

24. A pixel density converting apparatus for converting a pixel of a binary image in accordance with the increase or decrease of the number of pixels, comprising:
- first conversion means for conducting a conversion process by the projection method; and
- second conversion means for changing the number of pixels by a predetermined amount of pixels.

25. A pixel density converting apparatus according to claim 24, wherein said second conversion means changes the number of pixels by a thinning out process.

26. A pixel density converting apparatus according to claim 24, wherein said second conversion means changes the number of pixels by an averaging process.

27. A pixel density converting apparatus according to claim 24, wherein said second conversion means changes the number of pixels by a majority process.

* * * * *

UNITED STATES PATENT AND TRADEMARK OFFICE
CERTIFICATE OF CORRECTION

PATENT NO. : 5,351,137
DATED : September 27, 1994
INVENTOR(S) : MASAMI KATO, ET AL.

It is certified that error appears in the above-identified patent and that said Letters Patent is hereby corrected as shown below:

ON TITLE PAGE

In [30] Foreign Application Priority Data:
"Jun. 8, 1989 [JP] Japan ........ 1-145479
Jun. 8, 1989 [JP] Japan ........ 1-145480"

should read --Jun. 9, 1989 [JP] Japan ...... 1-145479
Jun. 9, 1989 [JP] Japan ...... 1-145480--.

In [56] References Cited, under FOREIGN PATENT DOCUMENTS:
"216142A 1/1986 United Kingdom" should read
--2161042A 1/1986 United Kingdom--.

IN THE DRAWINGS

Sheet 1 of 63: "HIGE-SPEED" should read --HIGH-SPEED--.
Sheet 6 of 63: "IMAG" should read --IMAGE--.
Sheet 13 of 63: "DIRERCTION" should read --DIRECTION-- and "IMGE" should read --IMAGE--.
Sheet 23 of 63: "ARER ④" should read --AREA ④--.
Sheet 24 of 63: "SCANNIG" should read --SCANNING--.
Sheet 26 of 63: "IMPUT" should read --INPUT--.
Sheet 28 of 63: "CORDINATE" should read --COORDINATE--.
Sheet 41 of 63: "CHARACTOR" (both occurrences) should read --CHARACTER--.
Sheet 51 of 63: "HORIZONTL" should read --HORIZONTAL-- and "ORIGNAL" should read --ORIGINAL--.
Sheet 55 of 63: "QUARTS-CRYSTAL" should read --QUARTZ-CRYSTAL--.

UNITED STATES PATENT AND TRADEMARK OFFICE
CERTIFICATE OF CORRECTION

PATENT NO. : 5,351,137
DATED : September 27, 1994
INVENTOR(S) : MASAMI KATO, ET AL.

It is certified that error appears in the above-identified patent and that said Letters Patent is hereby corrected as shown below:

IN THE DRAWINGS

Sheet 57 of 63: "QUARTS-CRYSTAL" should read --QUARTZ-CRYSTAL--.
Sheet 59 of 63: "QUARTS-CRYSTAL" should read --QUARTZ-CRYSTAL--.
Sheet 60 of 63: "MUL" should read --MUX--.
Sheet 62 of 63: "QUARTS-CRYSTAL" should read --QUARTZ-CRYSTAL--.

COLUMN 1

Line 16, "Arts" should read --Art--.

COLUMN 3

Line 37, "an-area" should read --an area--.

COLUMN 7

Line 24, "shown" should read --shown in--.
Line 28, "buffering-of" should read --buffering of--.
Line 30, "responding" should read --responding to--.
Line 34, "4×4-16" should read --4×4=16--.

COLUMN 9

Line 44, insert: --($I_p$, $I_Q$, $I_R$, $I_S$: Tones of the pixel surfaces P, Q, R, S)--.
Line 50, "convertion" should read --conversion--.

UNITED STATES PATENT AND TRADEMARK OFFICE
CERTIFICATE OF CORRECTION

PATENT NO. : 5,351,137
DATED : September 27, 1994
INVENTOR(S) : MASAMI KATO, ET AL.

It is certified that error appears in the above-identified patent and that said Letters Patent is hereby corrected as shown below:

COLUMN 10

Line 55, "quarts-crystal" should read --quartz-crystal--.
Line 57, "quarts-crystal" should read --quartz-crystal--.

COLUMN 12

Line 21, "pixels-when" should read --pixels when--.

COLUMN 13

Line 5, "operation-for" should read --operation for--.

COLUMN 14

Line 37, "an" should read --a--.

COLUMN 15

Line 25, "and S" should read --and S.--.
TABLE 1, "and <0.5" should read --and y<0.5--.
TABLE 2, "$I_p*(I_o+I_R+I_s)+I_Q*I_R*I_s$" should read --$I_p*(I_Q+I_R+I_s)+I_Q*I_R*I_s$--.

COLUMN 16

Line 22, "the-algorithm" should read --the algorithm--.
Equation (3), "$(1/SA)^2+I_s$" should read --$(1/SA)^2 \cdot I_s$--.

UNITED STATES PATENT AND TRADEMARK OFFICE
CERTIFICATE OF CORRECTION

PATENT NO. : 5,351,137
DATED : September 27, 1994
INVENTOR(S) : MASAMI KATO, ET AL.

It is certified that error appears in the above-identified patent and that said Letters Patent is hereby corrected as shown below:

COLUMN 18

Line 10, "Yji" should read --Yij--.

COLUMN 19

Line 43, "chronizm" should read --chronism--.

COLUMN 21

Line 64, "shows" should read --show--.

COLUMN 24

Equation (7), "A-A+α(4A-P-Q-r-S)" should read --A=A+α(4A-P-Q-R-S)--.

COLUMN 25

Line 41, "synchronizm" should read --synchronism--.
Line 42, "synchronizm" should read --synchronism--.

COLUMN 26

Line 39, "synchronizm" should read --synchronism--.

COLUMN 27

Line 22, "synchronizm" should read --synchronism--.

UNITED STATES PATENT AND TRADEMARK OFFICE
CERTIFICATE OF CORRECTION

PATENT NO. : 5,351,137
DATED : September 27, 1994
INVENTOR(S) : MASAMI KATO, ET AL.

It is certified that error appears in the above-identified patent and that said Letters Patent is hereby corrected as shown below:

<u>COLUMN 28</u>

Line 21, "a" should read --an--.

Signed and Sealed this

Twenty-eight Day of February, 1995

Attest:

BRUCE LEHMAN

*Attesting Officer*   *Commissioner of Patents and Trademarks*